US011505061B2

(12) United States Patent
Mepham et al.

(10) Patent No.: US 11,505,061 B2
(45) Date of Patent: Nov. 22, 2022

(54) AXLE ASSEMBLY FOR LOW FLOOR VEHICLE

(71) Applicant: ALLISON TRANSMISSION, INC., Indianapolis, IN (US)

(72) Inventors: Shaun Mepham, Clarkston, MI (US); Christopher G. Baillie, Lake Orion, MI (US)

(73) Assignee: Allison Transmission, Inc., Indianapolis, IN (US)

( * ) Notice: Subject to any disclaimer, the term of this patent is extended or adjusted under 35 U.S.C. 154(b) by 64 days.

(21) Appl. No.: 17/054,027

(22) PCT Filed: May 10, 2019

(86) PCT No.: PCT/US2019/031786
§ 371 (c)(1),
(2) Date: Nov. 9, 2020

(87) PCT Pub. No.: WO2019/217861
PCT Pub. Date: Nov. 14, 2019

(65) Prior Publication Data
US 2021/0245599 A1    Aug. 12, 2021

Related U.S. Application Data

(60) Provisional application No. 62/669,743, filed on May 10, 2018.

(51) Int. Cl.
*B60K 17/04* (2006.01)
*B60B 35/12* (2006.01)
(Continued)

(52) U.S. Cl.
CPC .......... *B60K 17/046* (2013.01); *B60B 35/125* (2013.01); *B60B 35/16* (2013.01);
(Continued)

(58) Field of Classification Search
CPC ...... B60K 17/046; B60K 7/0007; B60K 1/02; B60K 2001/001; B60K 2007/0038; B60B 35/125; B60B 35/16; B60Y 2400/73
See application file for complete search history.

(56) References Cited

U.S. PATENT DOCUMENTS 2,047,050 A   7/1936  Armington
3,862,667 A   1/1975  Wolansky
(Continued)

FOREIGN PATENT DOCUMENTS

CN      107284214 A   10/2017
DE      29800582 U1    4/1998
(Continued)

OTHER PUBLICATIONS

UK combined Search and Examination Report, Application No. GB2112058.9, dated Sep. 20, 2021, 2 pages.
(Continued)

*Primary Examiner* — Erez Gurari
(74) *Attorney, Agent, or Firm* — Barnes & Thornburg LLP

(57) ABSTRACT

An axle assembly for a low floor vehicle is described herein. The axle assembly includes an axle housing and a drive unit for driving a wheel assembly. The axle housing including a first gearbox, a second gearbox and a cradle assembly coupling the first gear box to the second gear box. The axle assembly includes first and second hub assemblies that form a first axis of rotation. The first gearbox includes an electric motor that is coupled to a transmission used to rotate an output shaft. The first gearbox also includes a differential mounted for rotation with the transmission and a first drop box mounted for rotation with the differential. The axle assembly also includes a portal axle mounted for rotation with the first drop box and extends from the first gearbox to the second gearbox wherein the portal axle forms a second
(Continued)

axis of rotation that is offset from the first axis of rotation of the hub assemblies. The second gearbox includes a second drop box mounted for rotation with the portal axle and is adapted to drive the second hub assembly.

12 Claims, 60 Drawing Sheets

(51) Int. Cl.
*B60B 35/16* (2006.01)
*B60K 7/00* (2006.01)
*B60K 1/02* (2006.01)
*B60K 1/00* (2006.01)

(52) U.S. Cl.
CPC .............. *B60K 7/0007* (2013.01); *B60K 1/02* (2013.01); *B60K 2001/001* (2013.01); *B60K 2007/0038* (2013.01); *B60Y 2400/73* (2013.01)

(56) References Cited

U.S. PATENT DOCUMENTS

| | | | |
|---|---|---|---|
| 5,762,154 A * | 6/1998 | Hsu | A61G 5/047 |
| | | | 180/907 |
| 6,964,317 B2 | 11/2005 | Groves et al. | |
| 7,048,087 B2 | 5/2006 | Brill | |
| 9,283,837 B1 | 3/2016 | Rawlinson | |
| 9,302,723 B1 | 4/2016 | Pollitzer et al. | |
| 9,630,482 B2 | 4/2017 | Raymond | |
| 9,821,650 B2 * | 11/2017 | Falls | B60K 11/02 |
| 10,029,551 B2 * | 7/2018 | Ito | A01D 34/82 |
| 10,724,618 B2 * | 7/2020 | Brown | B60K 1/00 |
| 10,800,254 B2 | 10/2020 | Remboski et al. | |
| 2003/0111280 A1 | 6/2003 | Planter et al. | |
| 2004/0200660 A1 | 10/2004 | Szalai et al. | |
| 2005/0045412 A1 | 3/2005 | Brill | |
| 2012/0103708 A1 * | 5/2012 | Hennings | B60K 7/0007 |
| | | | 180/65.6 |
| 2014/0000970 A1 * | 1/2014 | Munster | B60K 17/046 |
| | | | 475/149 |
| 2014/0262588 A1 * | 9/2014 | Bruns | B60K 1/00 |
| | | | 180/291 |
| 2015/0096823 A1 | 4/2015 | Raymond | |
| 2016/0039277 A1 * | 2/2016 | Falls | B60K 1/02 |
| | | | 310/58 |
| 2017/0122408 A1 * | 5/2017 | Chung | B60K 17/046 |
| 2018/0105027 A1 * | 4/2018 | Langhoff | B60K 17/043 |
| 2018/0297469 A1 * | 10/2018 | Liu | B60G 5/053 |
| 2018/0345786 A1 * | 12/2018 | Kucharski | B60K 17/165 |
| 2019/0120357 A1 | 4/2019 | Han | |
| 2019/0283522 A1 * | 9/2019 | Battaglia | B60G 21/005 |
| 2019/0366834 A1 * | 12/2019 | Nagpal | B60G 21/055 |
| 2020/0180426 A1 * | 6/2020 | Chopra | B60K 17/043 |
| 2020/0384806 A1 * | 12/2020 | Falls | B60K 1/00 |
| 2021/0086600 A1 * | 3/2021 | Brock | B60K 1/00 |
| 2021/0129664 A1 * | 5/2021 | Mepham | B60K 17/36 |
| 2021/0146776 A1 * | 5/2021 | Bollinger | H01M 10/425 |
| 2021/0245599 A1 * | 8/2021 | Mepham | B60B 35/002 |

FOREIGN PATENT DOCUMENTS

| | | |
|---|---|---|
| EP | 1266784 A1 | 12/2002 |
| EP | 1503481 A2 | 2/2005 |
| EP | 3795402 A1 | 3/2021 |
| WO | 2019014479 A1 | 1/2019 |
| WO | 2019217861 A1 | 11/2019 |

OTHER PUBLICATIONS

International Preliminary Report on Patentability and Written Opinion of the International Searching Authority for Application No. PCT/US2019/031786, dated Nov. 10, 2020, 7 pages.
PCT Search Report and Written Opinion prepared for PCT/US2019/031786, completed Jul. 12, 2018.

* cited by examiner

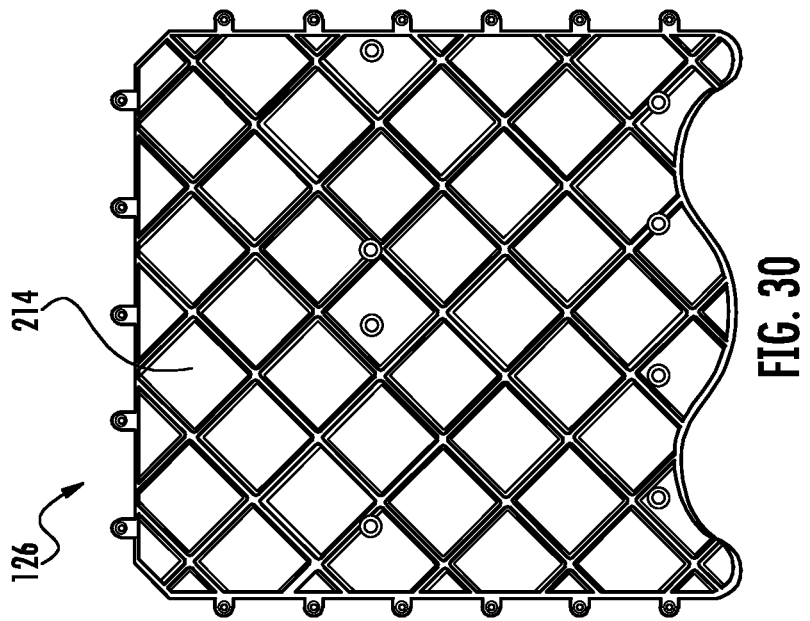
FIG. 30
FIG. 29
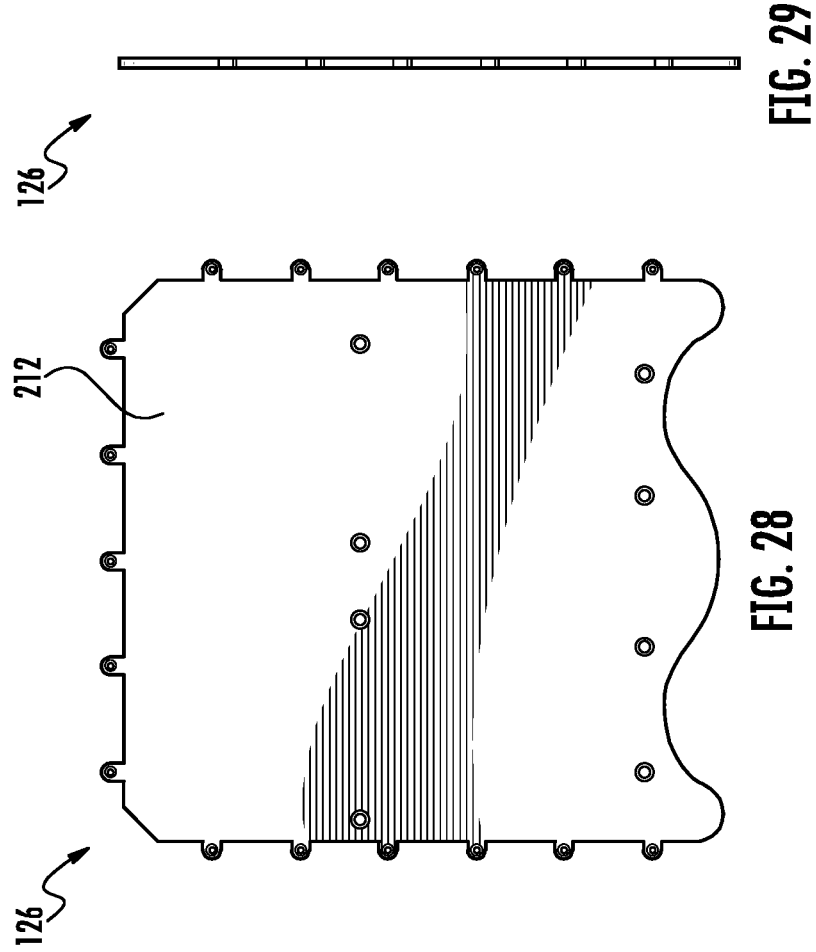
FIG. 28

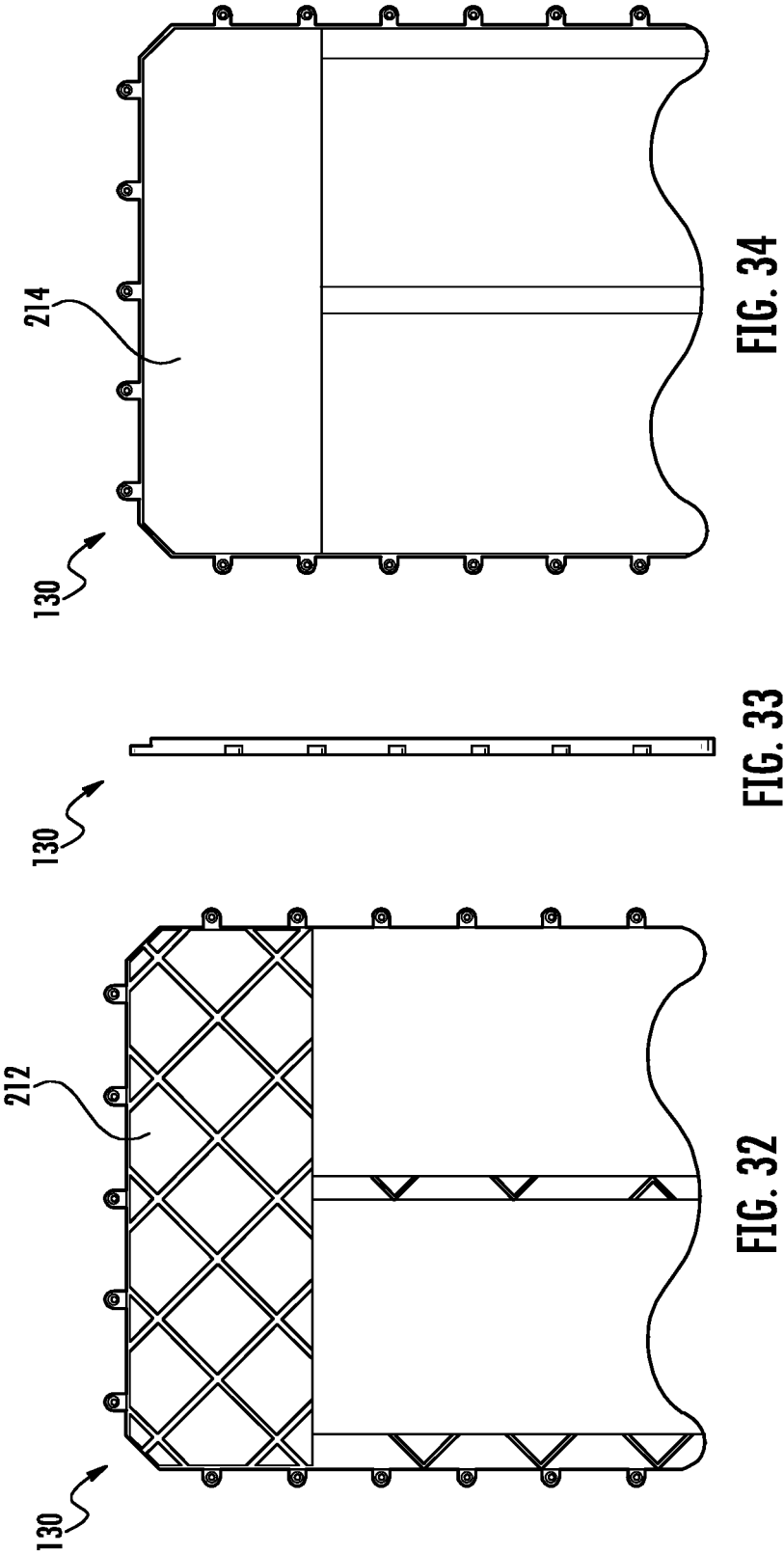

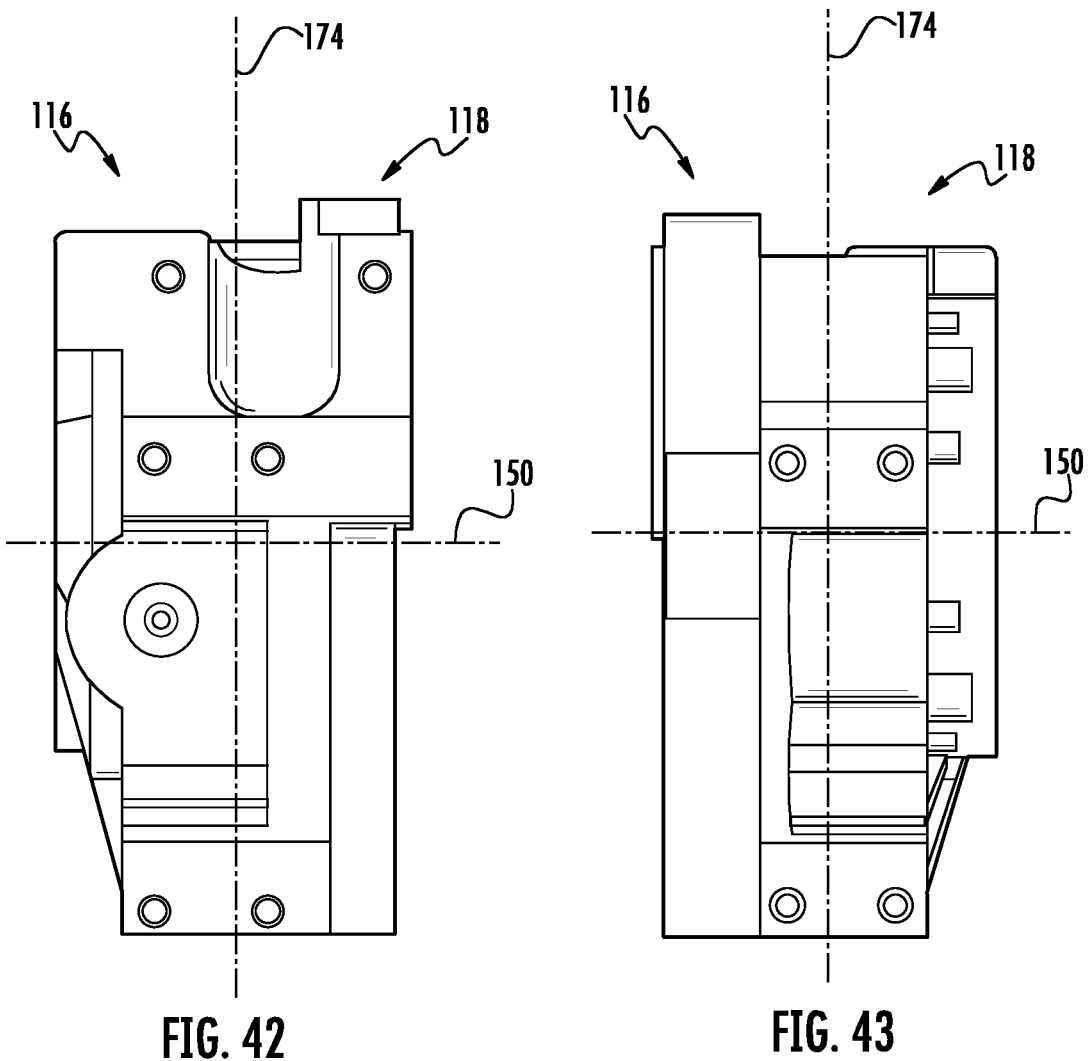

AXLE ASSEMBLY FOR LOW FLOOR VEHICLE

CROSS-REFERENCE TO RELATED APPLICATION

This application is the U.S. national phase of PCT/US2019/031786, filed on May 10, 2019, which claims the benefit of priority to U.S. Provisional Application No. 62/669,743, filed May 10, 2018. The disclosures set forth in the above-referenced applications are incorporated herein by reference in their entireties.

BACKGROUND

In order to aid ingress and egress, it is desirable for a motor vehicle to have a floor that is as low to the ground as possible. Busses and people carriers, commonly called low floor vehicles, are examples of vehicles that benefit from a low floor height. By minimizing the floor height, a step at a door of the vehicle may be eliminated, which in turn allows easier ingress and egress for vehicle passengers. Elimination of steps is especially beneficial to disabled passengers, and passengers carrying items, such as strollers. Increasingly, manufacturers have turned to electric and hybrid propulsion systems for low floor vehicles for increased performance and efficiency. In order to have the floor of the vehicle as low as possible, the drivetrain components are relocated so as to reduce intrusions into the vehicle floor.

SUMMARY

Accordingly, the present disclosure provides an axle assembly for a low floor vehicle with increased performance and efficiency.

BRIEF DESCRIPTION OF THE DRAWINGS

Advantages of the present disclosure will be readily appreciated as the same becomes better understood by reference to the following detailed description when considered in connection with the accompanying drawings.

FIG. 28 is a view of a top surface of the top cover shown in FIG. 27;

FIG. 29 is a side view of the top cover shown in FIG. 27;

FIG. 30 is a view of a bottom surface of the top cover shown in FIG. 27;

FIG. 32 is a view of a top surface of the bottom cover shown in FIG. 31;

FIG. 33 is a side view of the bottom cover shown in FIG. 31;

FIG. 34 is a view of a bottom surface of the bottom cover shown in FIG. 31;

FIGS. 42 and 43 are side views of the gearbox housing shown in FIG. 37;

DETAILED DESCRIPTION

Figure 1:
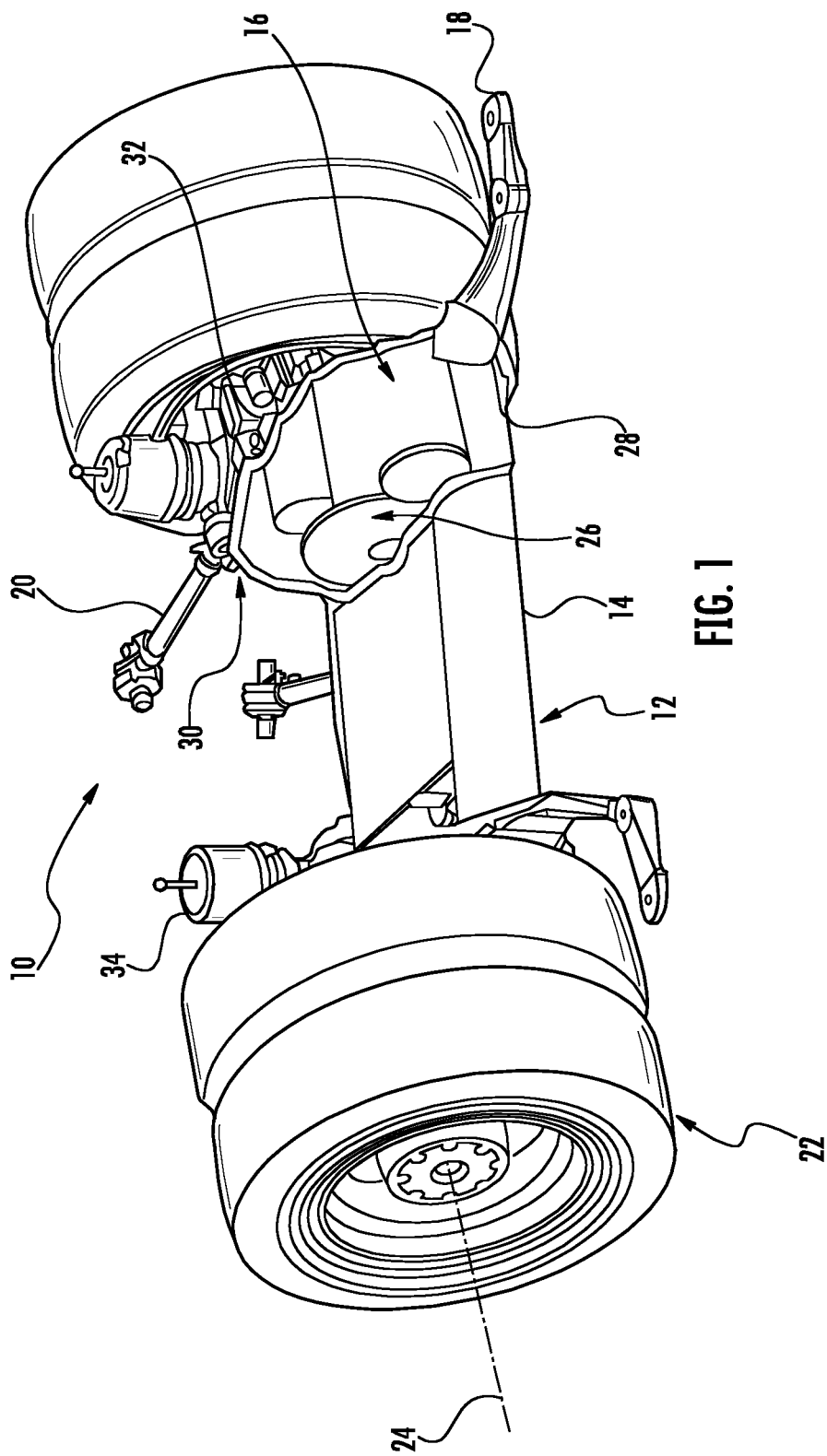
FIG. 1 is a perspective view of an axle assembly for a low floor vehicle.
Figure 2:
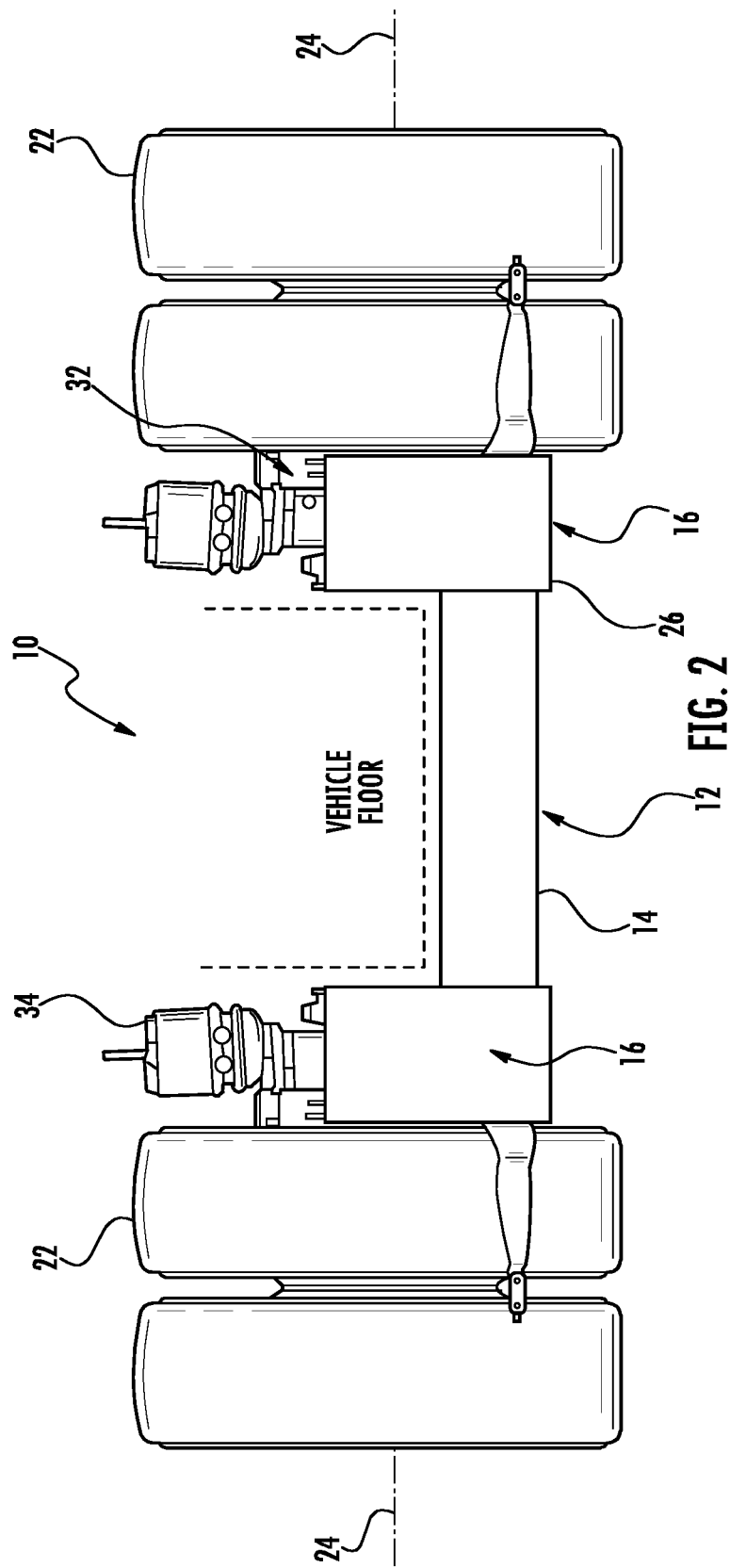
FIG. 2 is an elevation view of an axle assembly for a low floor vehicle.

With reference to the figures, wherein like numerals indicate like parts throughout the several views, an axle assembly 10 for a low floor vehicle is shown in FIGS. 1 and 2. The axle assembly 10 includes an axle housing 12 having a bridge section 14 and outer sections 16 arranged at opposite ends of the bridge section 14. Each outer section 16 is spaced laterally from the other relative to the vehicle. The axle assembly 10 further includes mounts 18 coupled to the axle housing 12, which may be used to attach the axle assembly 10 to the vehicle. Additionally, suspension control arms 20 may be coupled to the mounts 18 to movably attach the axle assembly 10 to the vehicle. The vehicle may be an electric vehicle or a hybrid vehicle with an electric motor and internal combustion generator/motor. Advantageously, the mounts 18 may be configured to allow the axle assembly 10 to be retrofitted into an existing vehicle. For example, a low floor bus originally equipped with a traditional axle assembly may be upgraded to include the axle assembly 10 in place of the traditional axle assembly.

A wheel 22 is coupled to each end of the axle assembly 10 to support the vehicle and transfer motive power to a road surface, as shown, for example, in FIGS. 1 and 2. In the embodiment shown, the axle assembly 10 is a dual wheel configuration with a pair of wheels 22 coupled to each end of the axle assembly 10. Each wheel 22 defines an axis of rotation 24. The axis of rotation 24 of each wheel 22 is generally aligned.

Figure 3:
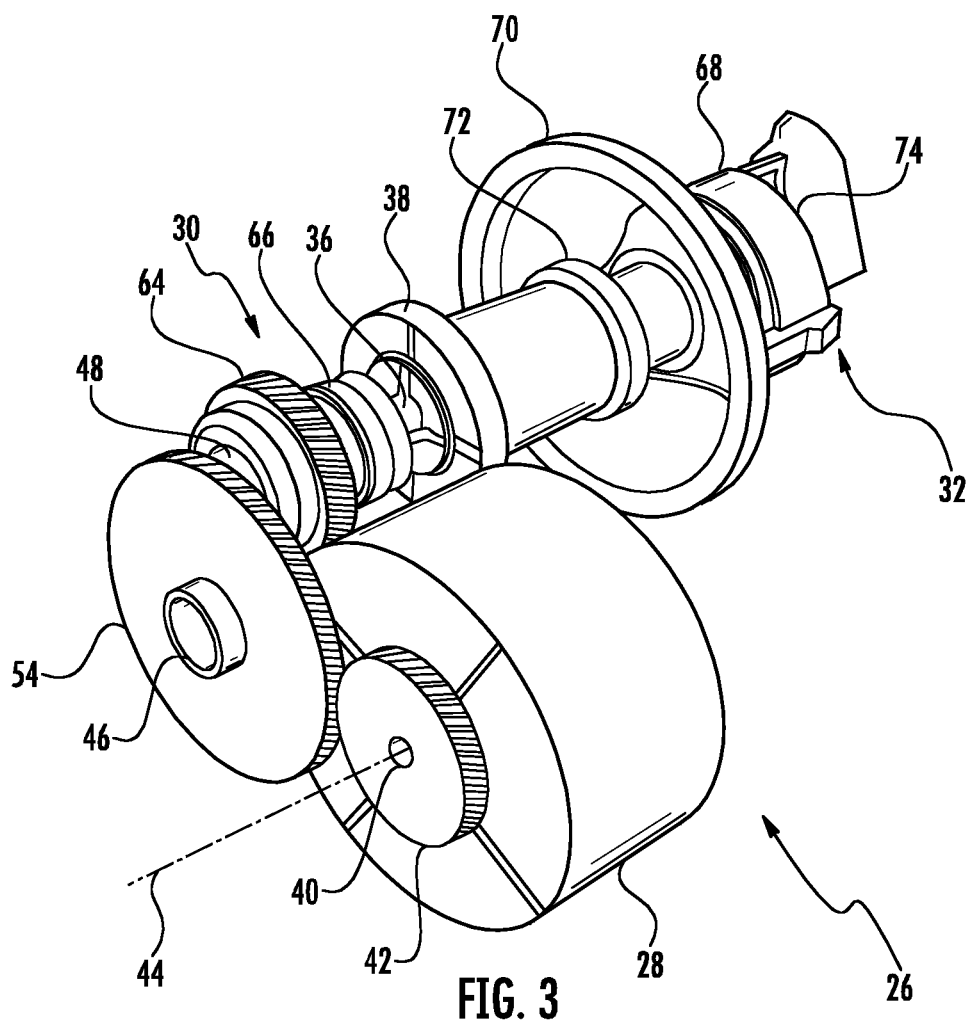
FIG. 3 is a cutaway perspective view of a drive unit for an axle assembly for a low floor vehicle.
Figure 4:
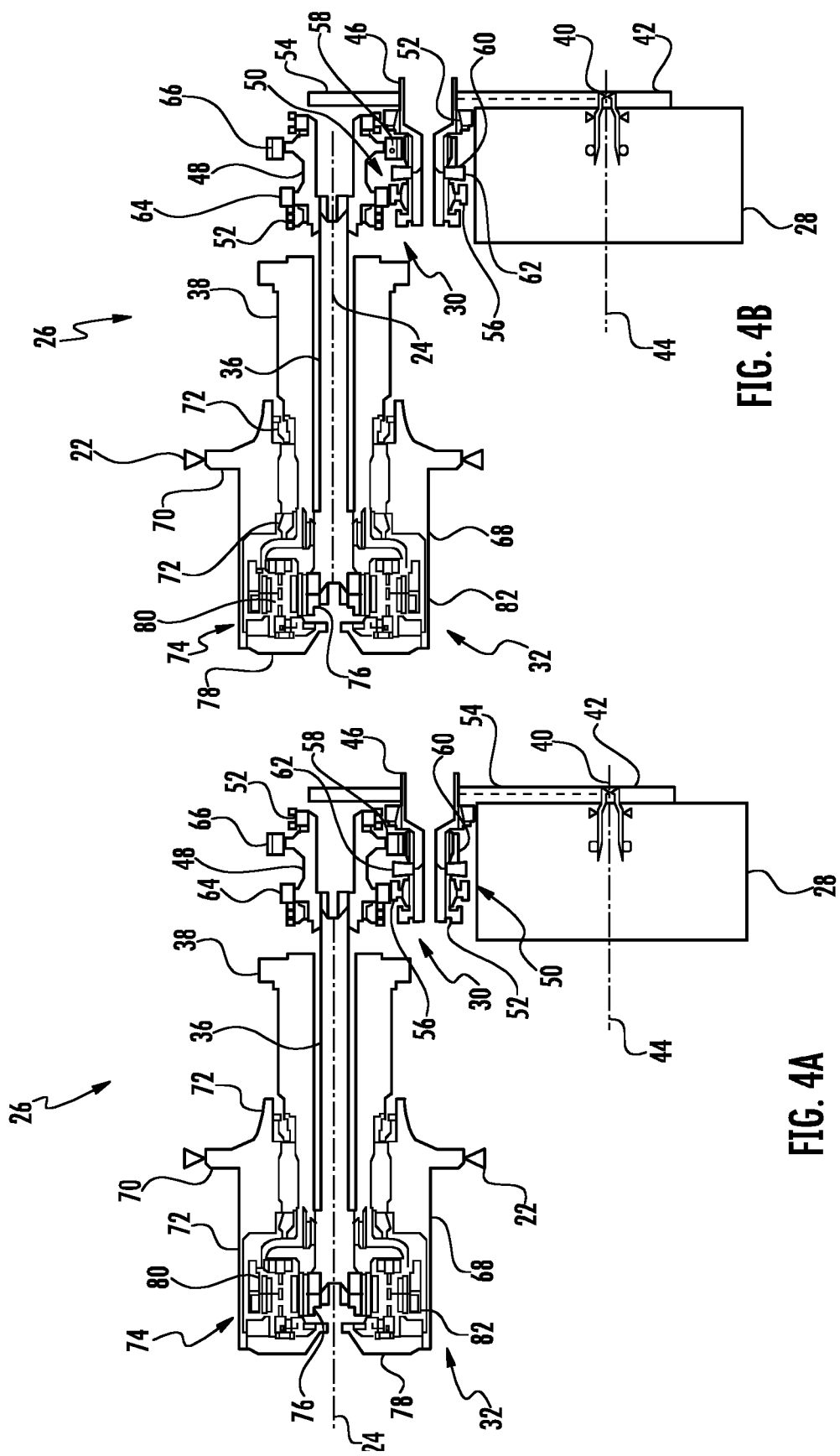
FIG. 4A is a cross-sectional view of the drive unit of FIG. 3 shown in a first reduction ratio.
FIG. 4B is a cross-sectional view of the drive unit of FIG. 3 shown in a second reduction ratio.

The axle assembly 10 further includes a wheel drive unit 26 housed within each outer section 16 of the axle housing 12, as shown in FIGS. 3, 4a and 4b. Each of the wheel drive units 26 is configured to operate independently of the other drive unit 26 so the wheels on opposite sides of the axle can rotate independently of the other side. Each wheel drive unit 26 may operate at a different speed during a turning maneuver of the vehicle, or in response to available traction at each wheel 22. Each wheel drive unit 26 includes an electric motor 28, a transmission 30, and a hub assembly 32 for mounting one or more wheels 22. The axle housing 12 integrates the electric motor 28 and transmission 30 compactly, increases cooling for heat dissipation, and supports vehicle loads through the suspension control arms 20 and mounts 18. The transmission 30 allows the vehicle to have an increased top speed while operating more efficiently at low speeds.

As shown in FIG. 2, the bridge section 14 is arranged between each outer section 16 of the axle housing 12. It is desirable for a height of a low floor to be both as low as possible, and a width to be as wide as possible in order to maximize capacity of the vehicle. As such, the bridge section 14 is offset from the axis of rotation 24 of the wheels 22 in order to decrease the height of the low floor of the vehicle. The outer sections 16 are configured to house the wheel drive units 26 within the axle housing. Each outer section 16 has a width, which is decreased in order to increase the width of the low floor of the vehicle. The bridge section 14 may be integrally formed with the outer sections 16 or may be coupled to the outer sections 16 using methods commonly used in the art. For example, the bridge section 14 may be welded, pressed, or bolted to the outer sections 16. The bridge section 14 may be hollow or solid.

The axle assembly 10 may further include a braking system for the vehicle. The braking system may include air cylinders, brake hoses, brake drums, brake rotors 35, brake calipers 37, and the like. In the embodiment shown, brake rotors 35 and brake calipers 37 are adjacent hub assembly 32.

Referring now to FIGS. 3-4B and 48-54, the wheel drive unit 26 is shown with the axle housing 12 removed. The drive unit 26 includes an axle shaft 36 coupled to the transmission 30 and the hub assembly 32. The transmission 30 is coupled to both the electric motor 28 and the axle shaft 36, and the hub assembly 32 is coupled to the wheel 22. As such, torque generated by the electric motor 28 is transferred through the transmission 30 to the hub assembly 32, and then to the wheel 22. The drive unit 26 further includes an elongated axle support 38 coupled to the axle housing 12. The axle shaft 36 is disposed in the axle support 38 between the hub assembly 32 and the transmission 30. As will be discussed in further detail below, the transmission 30 has two reduction ratios, which may be selectively engaged by an operator of the vehicle, or by use of a transmission controller.

Figure 48:
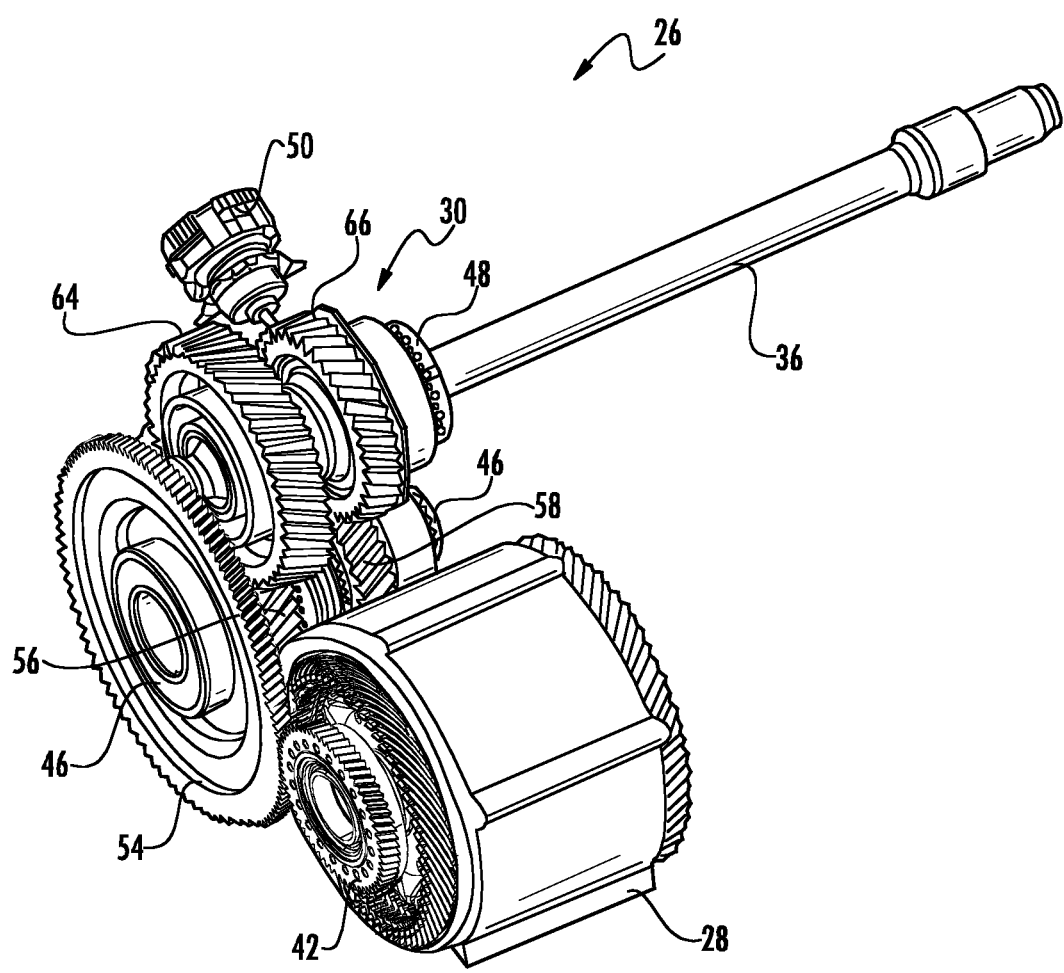
FIG. 48 is another cutaway perspective view of the drive unit for an axle assembly for a low floor vehicle.
Figure 49:
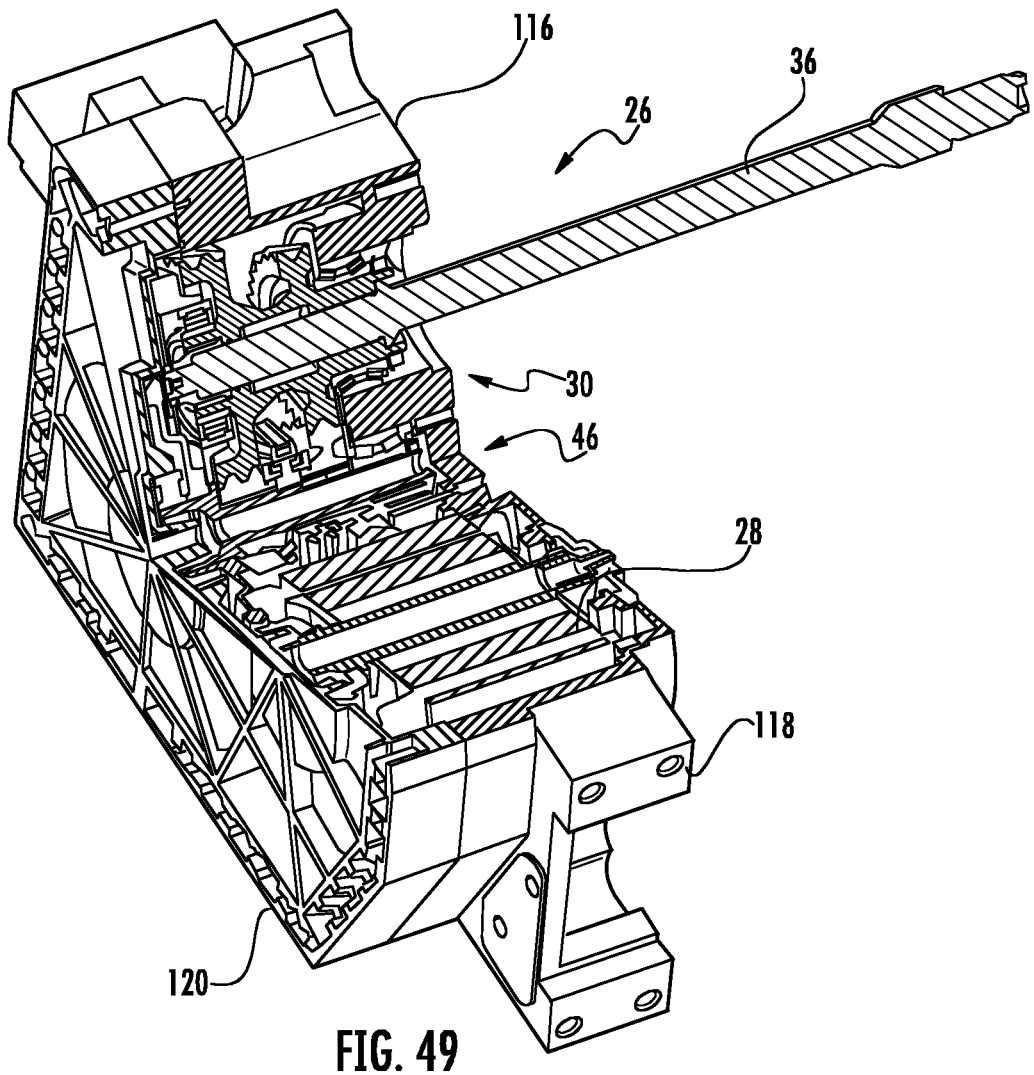
FIGS. 49-52 are cross-sectional views of the drive unit shown in FIG. 48, according to an embodiment of the present disclosure.
Figure 50:
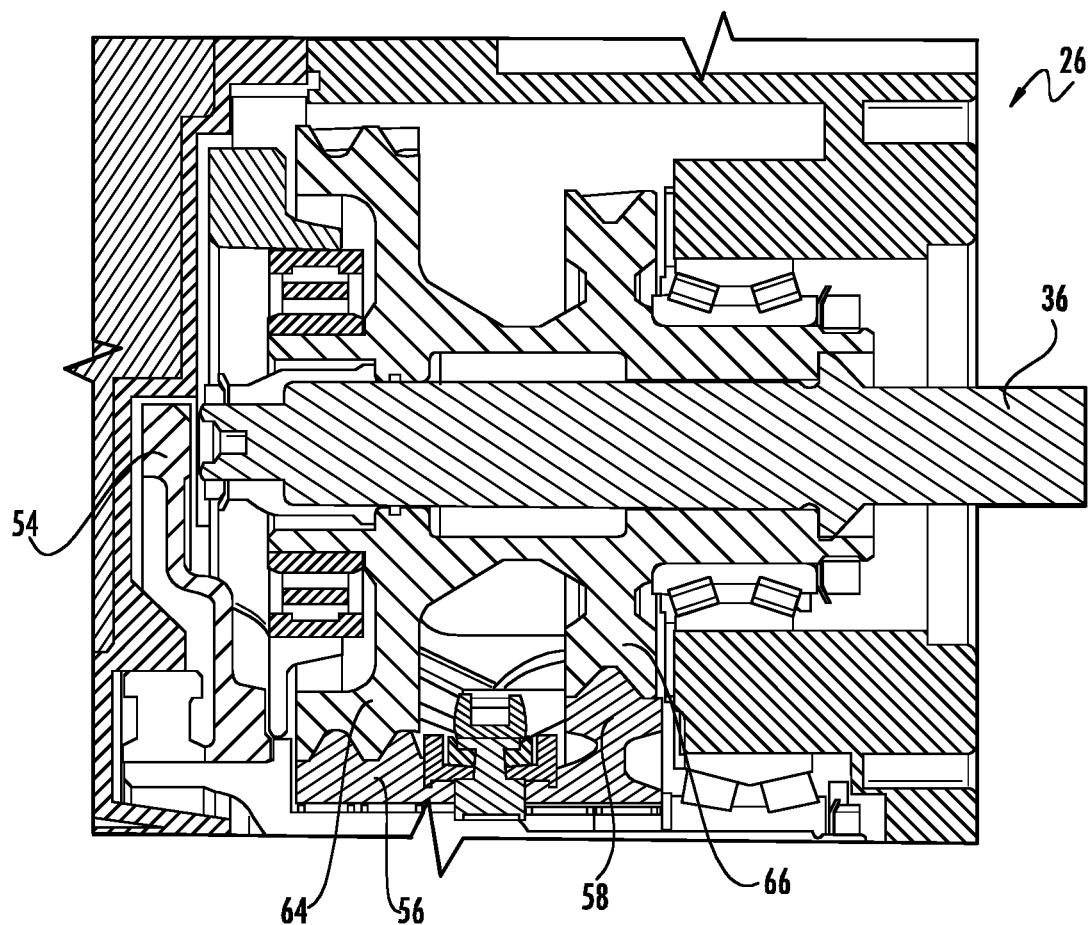
Figure 51:
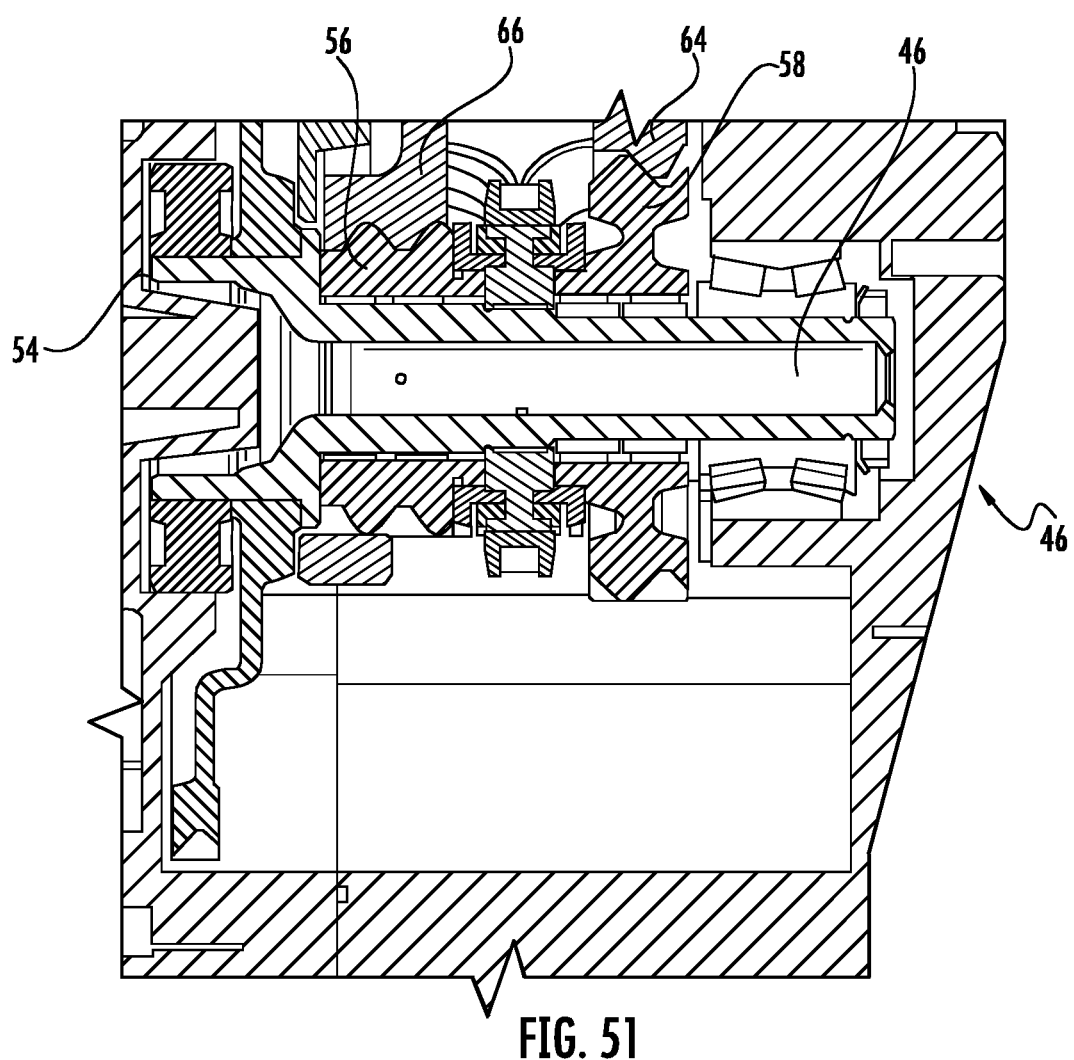
Figure 52:
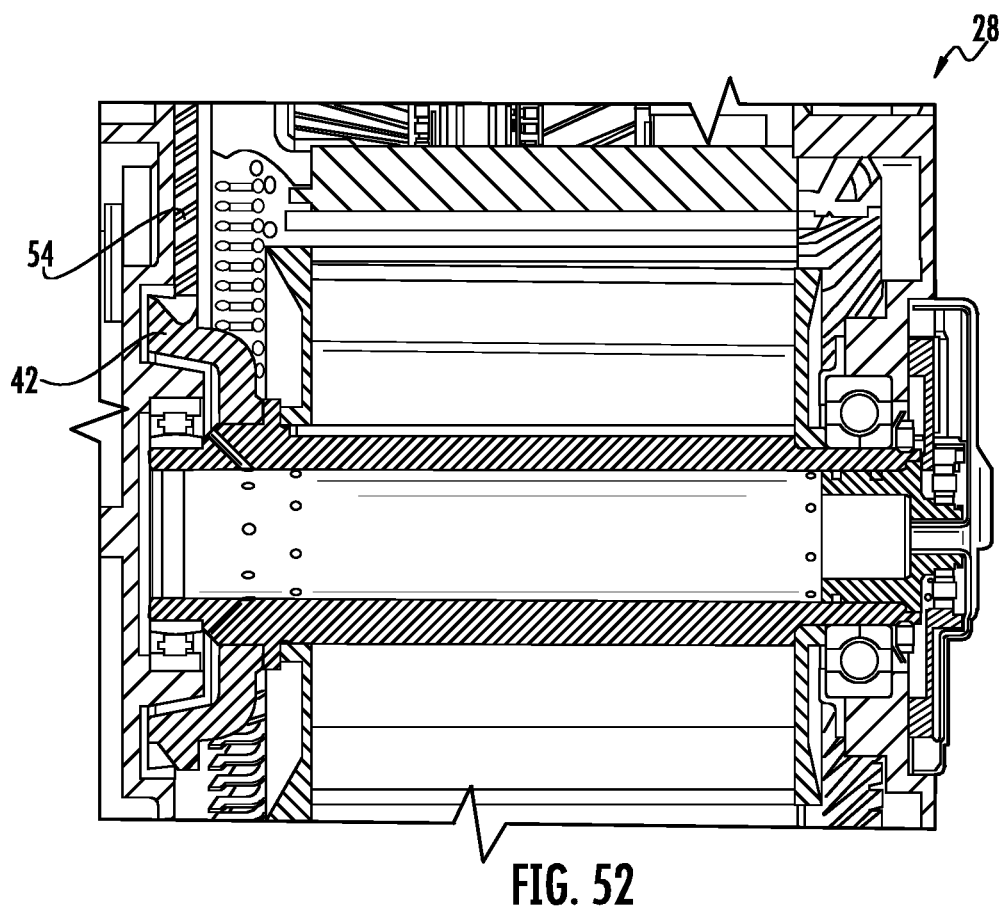
Figure 53:
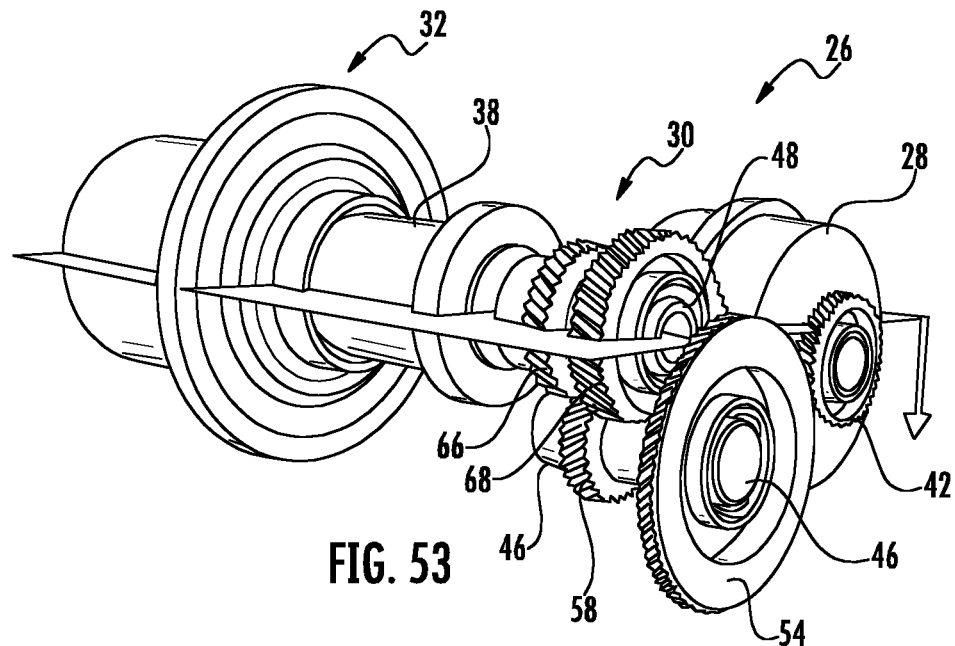
FIG. 53 is a cutaway perspective view of the drive unit shown in FIG. 48.

The electric motor 28 generates torque to drive the wheels 22, as shown in FIGS. 4a, 4b and 48. The electric motor 28 includes a motor shaft 40 that protrudes from the electric motor 28. A drive gear 42 is fixed to the motor shaft 40. The motor shaft 40 defines a rotational axis 44 that extends through the electric motor 28. The electric motor 28 may be a DC or AC motor, brushed or brushless, or other types of motors commonly known in the art. The electric motor 28 is oriented such that the motor shaft 40 protrudes away from the respective wheel 22 with the rotational axis 44 of the motor shaft 40 arranged parallel to the axis of rotation 24 of the wheels 22. Relative to the vehicle, the electric motor 28 is spaced longitudinally from the axis of rotation 24 of the wheels 22.

By orienting the electric motor 28 such that the motor shaft 40 protrudes away from, and is longitudinally spaced from the axis of rotation 24 the respective wheel 22, packaging space within the outer sections 16 of the axle housing 12 is conserved without the need to increase the width of the outer sections 16, as shown in FIGS. 4a, 4b. The additional packaging space within the outer sections 16 allows the transmission 30 to be arranged adjacent to the electric motor 28. Preferably, the overall width of the electric motor 28 is substantially similar to the overall width of the transmission 30. As such, the width of the outer sections 16 is not materially affected by the introduction of the electric motor 28. Stated another way, with the transmission 30 arranged adjacent to the electric motor 28 the width of the low floor may be wider than if the transmission 30 was arranged otherwise. Furthermore, the increased packaging space within the outer sections 16 allows for the transmission 30 to be configured with multiple reduction ratios. Aligning each of the axes of rotation 24, 44 in a parallel manner increases the efficiency of the transmission 30.

Figure 54:
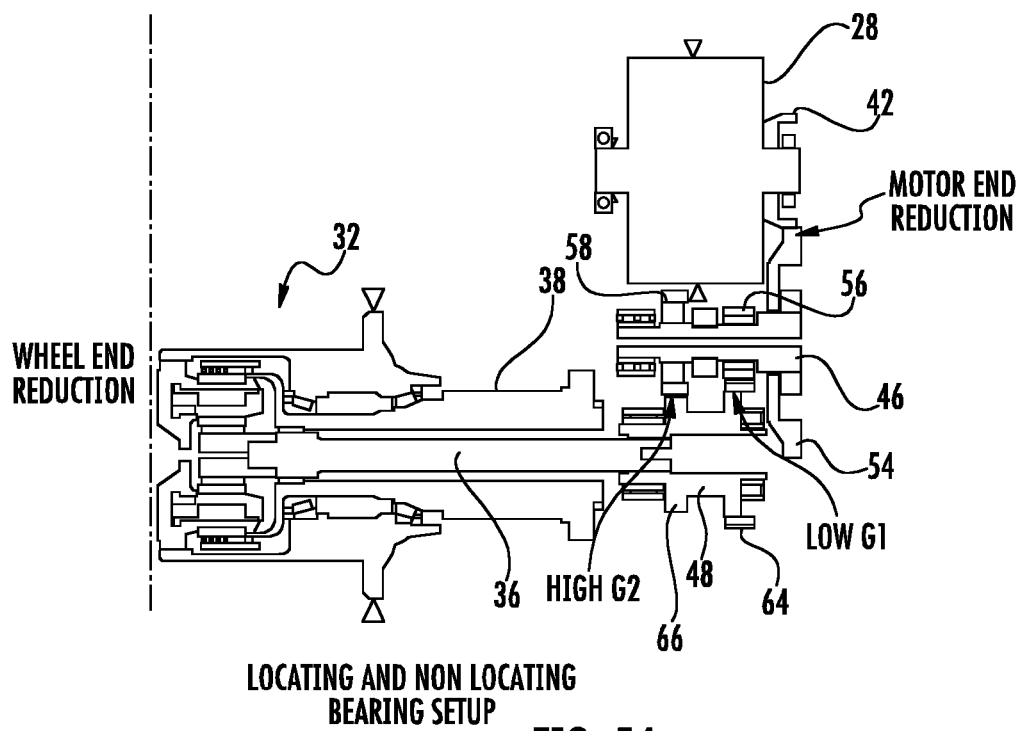
FIG. 54 is a sectional view of the drive unit of FIG. 53.

As mentioned above, the drive unit 26 includes the transmission 30, as shown in FIGS. 4a, 4b and 54. The transmission 30 has a first reduction ratio and a second reduction ratio. The transmission 30 includes an input idler shaft 46, an output shaft 48, and a shift mechanism 50. The idler shaft 46 and the output shaft 48 each have two ends rotatably supported by bearings 52 in the drive unit 26. A driven gear 54 is fixed to the idler shaft 46 and meshes with the drive gear 42. The driven gear 54 transfers torque to the idler shaft 46 from the drive gear 42.

In addition to the driven gear 54, two idler gears 56, 58 are rotatably supported on the idler shaft 46. A first idler gear 56 corresponds to the first reduction ratio of the transmission 30, and a second idler gear 58 corresponds to the second reduction ratio of the transmission 30. Each of the idler gears 56, 58 can spin freely on the idler shaft 46 such that when the corresponding reduction ratio is not engaged, no torque is transferred between the idler shaft 46 and the idler gear 56, 58. As will be discussed in further detail below, each idler gear 56, 58 includes a splined portion engageable with the shift mechanism 50 to rotatably couple the idler gear 56, 58 to the idler shaft 46.

The shift mechanism 50 of the transmission 30 includes a shift ring 60, a shift fork (not shown), and an actuator (not shown). The shift ring 60 is slideable along the idler shaft 46 between the first idler gear 56 and the second idler gear 58. The shift ring 60 is rotatably coupled to the idler shaft 46 such that the shift ring 60 and the idler shaft 46 rotate at the same speed. The shift ring 60 includes at least one splined portion engageable with the splined portion of either of the idler gears 56, 58. Additionally, the shift ring 60 defines a groove 62 configured to engage the shift fork.

The shift fork is coupled to the actuator and movable to select the first reduction ratio and the second reduction ratio. The shift fork is engaged with the shift ring 60 such that the shift fork is capable of moving the shift ring 60 into engagement with one of the idler gears 56, 58. Additionally, the shift fork may be movable into a neutral position where neither of the idler gears 56, 58 are engaged with the shift ring. The shift mechanism 50 may further include a synchronizer to aid shifting. The actuator may be controlled manually or automatically. The actuator may be responsive to hydraulic pressure, pneumatic pressure, or electronic signals generated by a transmission control module. Alternatively, the actuator may include a mechanical linkage controlled by the vehicle operator.

The transmission 30 further includes two output gears 64, 66, as shown in FIGS. 4a, 4b and 48. Each of the output gears 64, 66 is coupled to the output shaft 48, a first output gear 64 engaged with the first idler gear 56, and a second output gear 66 engaged with the second idler gear 58. The output gears 64, 66 are rotatably fixed to the output shaft 48 such that the output gears 64, 66 and the output shaft 48 rotate at the same speed. The output shaft 48 is formed to include a bore 49 that is configured to receive the axle shaft 36. Bore 49 may be splined or keyed such that the axle shaft 36 and the output shaft 48 rotate together. As mentioned above, the axle shaft 36 is disposed in the axle support 38 and coupled between the hub assembly 32 and the transmission 30.

The hub assembly 32 is arranged at an end of the axle support 38 opposite the transmission 30, as shown in FIGS. 4a and 4b. The hub assembly 32 includes a wheel hub 68 having a wheel flange 70. The wheel hub 68 is rotatably supported on the axle support 38 by a pair of hub bearings 72. The wheels 22 may be secured to the wheel flange 70 using bolts, nuts, and other fasteners known in the art.

Each hub assembly 32 further includes a planetary gear assembly 74, which increases torque to drive the wheels 22. The planetary gear assembly 74 includes a sun gear 76, a planet carrier 78, a plurality of planet gears 80, and a ring gear 82. The ring gear 82 is coupled to the axle support 38. The sun gear 76 is coupled to the end of the axle shaft 36 and disposed in the ring gear 82. The ring gear 82 is fixed relative to the sun gear 76.

The plurality of planet gears 80 are rotatably coupled to the planet carrier 78. The planet carrier 78 is arranged adjacent to the ring gear 82 with each planet gear 80 disposed in the ring gear 82. Each planet gear 80 engages both the ring gear 82 and the sun gear 76. When the axle shaft 36 rotates the sun gear 76, the sun gear 76 rotates each planet gear 80, which in turn rotates the planet carrier 78. The planet carrier 78 is coupled to the wheel hub 68 such that the planet carrier 78 and the wheel hub 68 rotate at the same speed.

Referring specifically to FIG. 4A, the drive unit 26 is shown with the transmission 30 in the first reduction ratio and a torque path showing torque transfer through the drive unit 26. Torque generated by the electric motor 28 rotates the drive gear 42. The drive gear 42 rotates the driven gear 54 coupled to the idler shaft 46. The idler shaft 46 rotates the shift ring 60, which is engaged with the first idler gear 56. The first idler gear 56 is engaged with the first output gear 64 to transfer rotation to the output shaft 48 and axle shaft 36. Rotation of the axle shaft 36 is further transferred through the planetary gear assembly 74 to the wheels 22.

Referring now to FIG. 4B, the drive unit 26 is shown with the transmission 30 in the second reduction ratio and a torque path showing torque transfer through the drive unit 26. Torque is generated in the electric motor 28 to rotate the motor shaft 40 and the drive gear 42. The drive gear 42 rotates the driven gear 54 coupled to the idler shaft 46. The idler shaft 46 rotates the shift ring 60, which is engaged with the second idler gear 58. The second idler gear 58 is engaged with the second output gear 66 to transfer rotation to the output shaft 48 and axle shaft 36. Rotation of the axle shaft 36 is further transferred through the planetary gear assembly 74 to the wheels 22.

Figure 55:
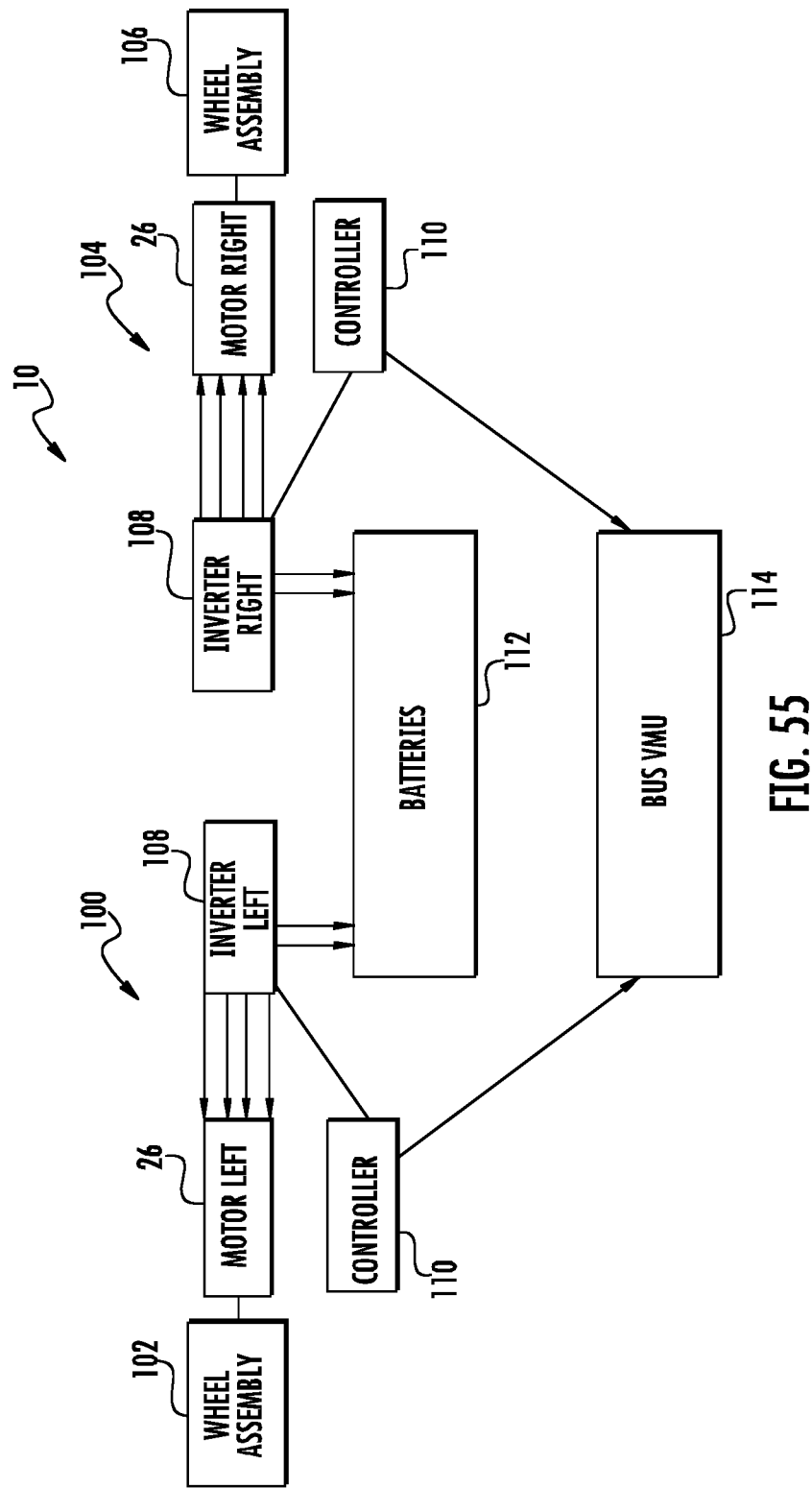
FIG. 55 is a block diagram of axle assembly shown in FIGS. 5-8.
Figure 56:
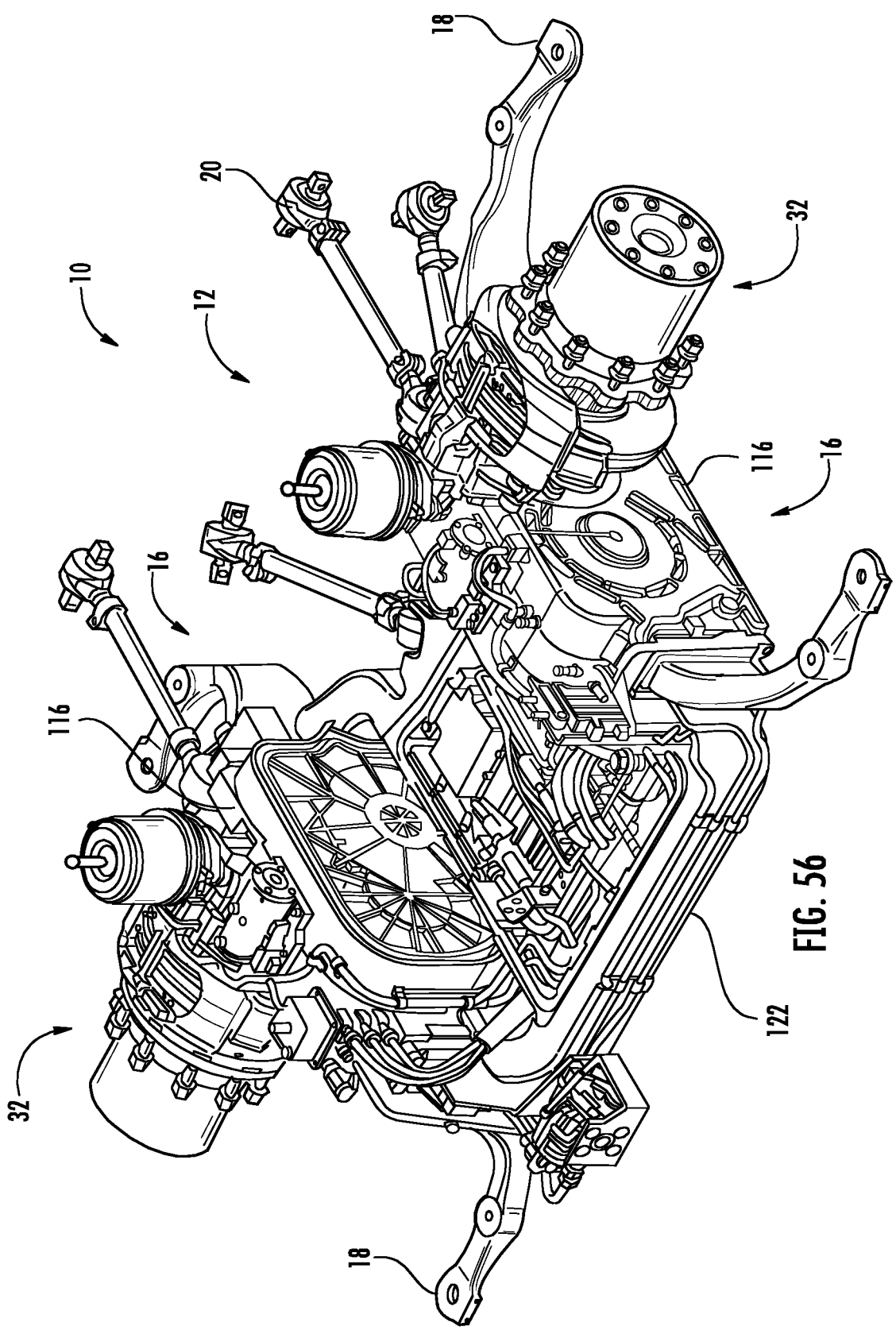
FIG. 56 is another perspective view of the axle assembly for a low floor vehicle shown in FIG. 1, according to embodiments of the present disclosure.
Figure 57:
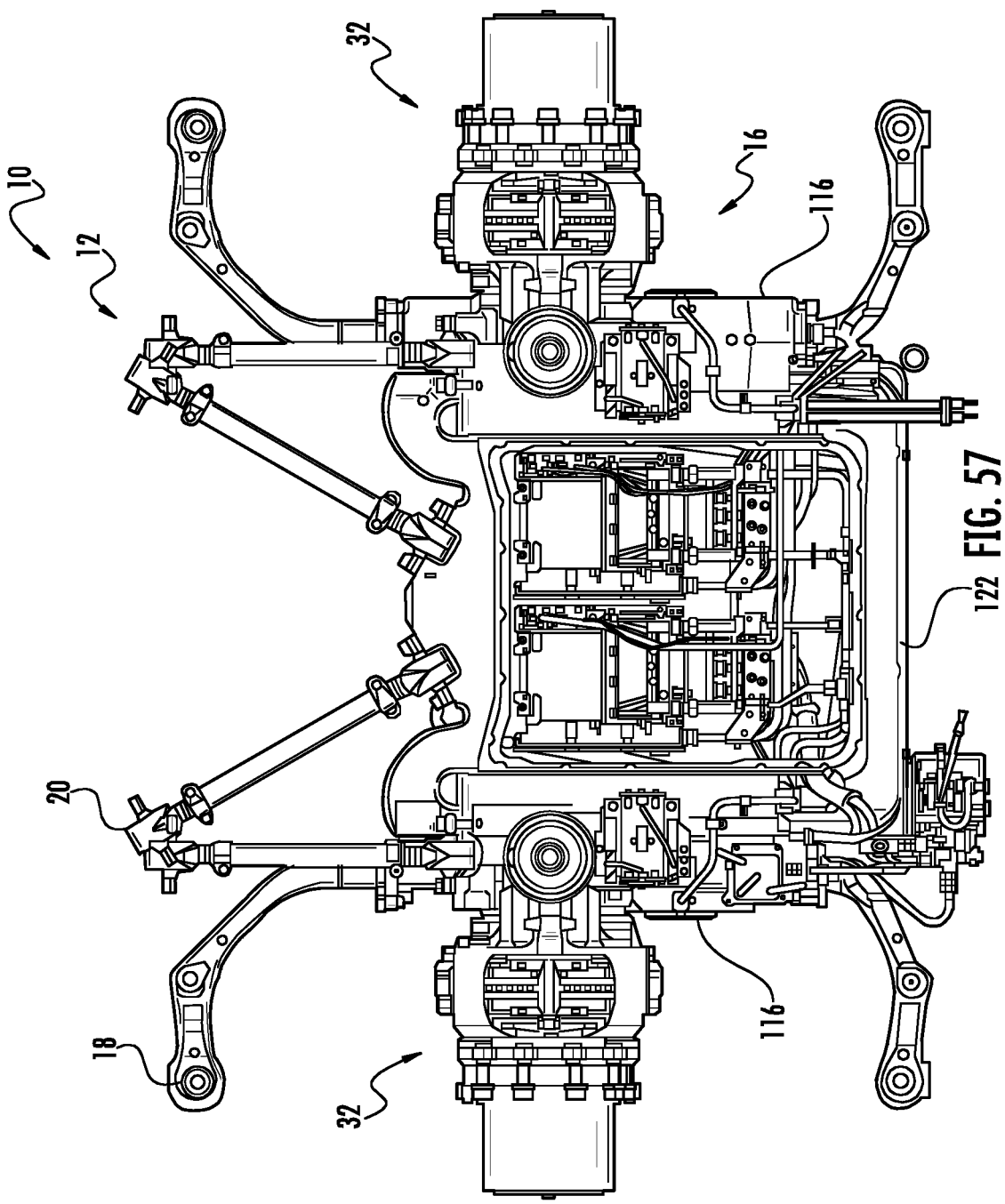
FIG. 57 is a top view of axle assembly shown in FIG. 56.
Figure 58:
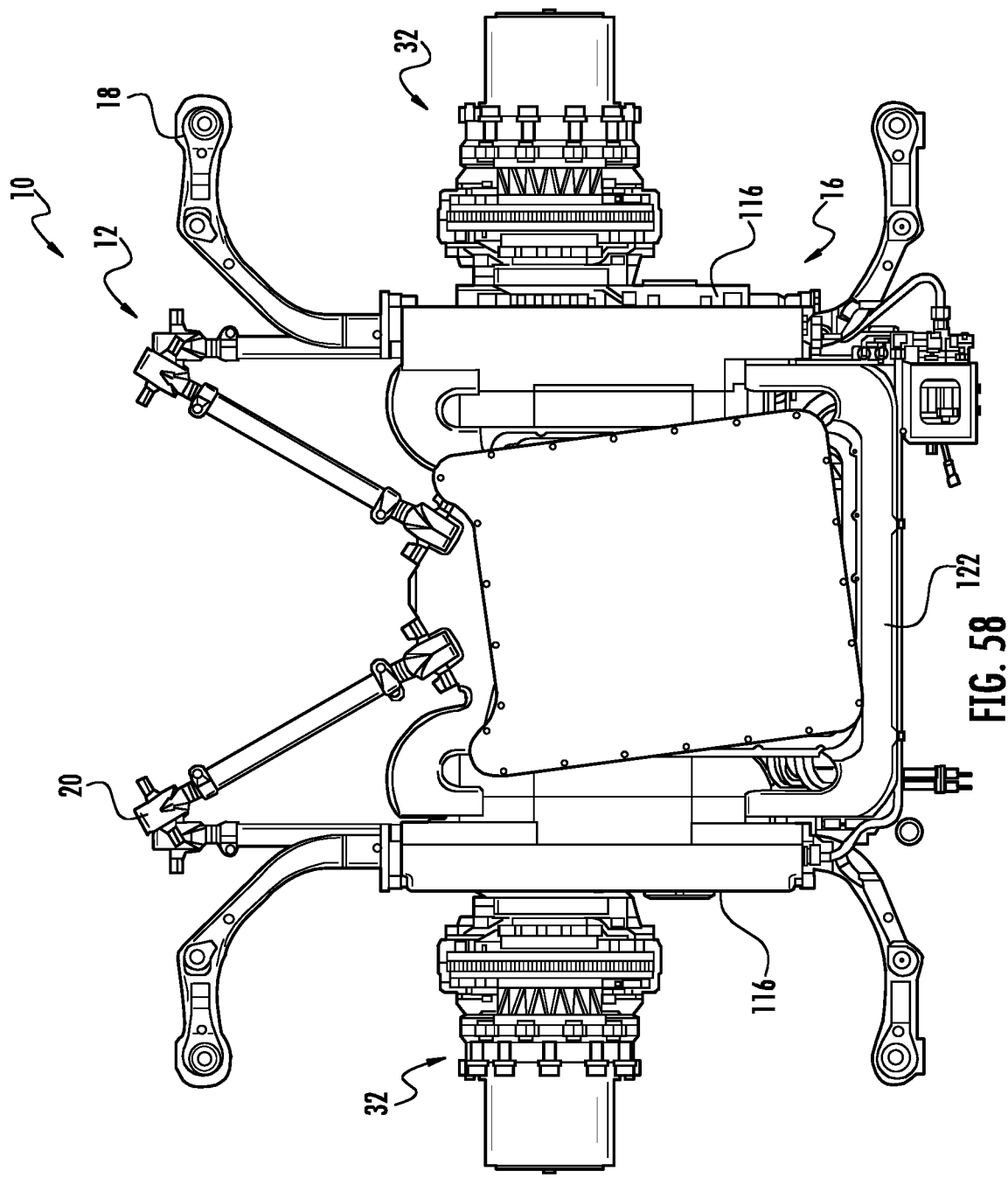
FIG. 58 is a bottom view of the axle assembly shown in FIG. 56.
Figure 59:
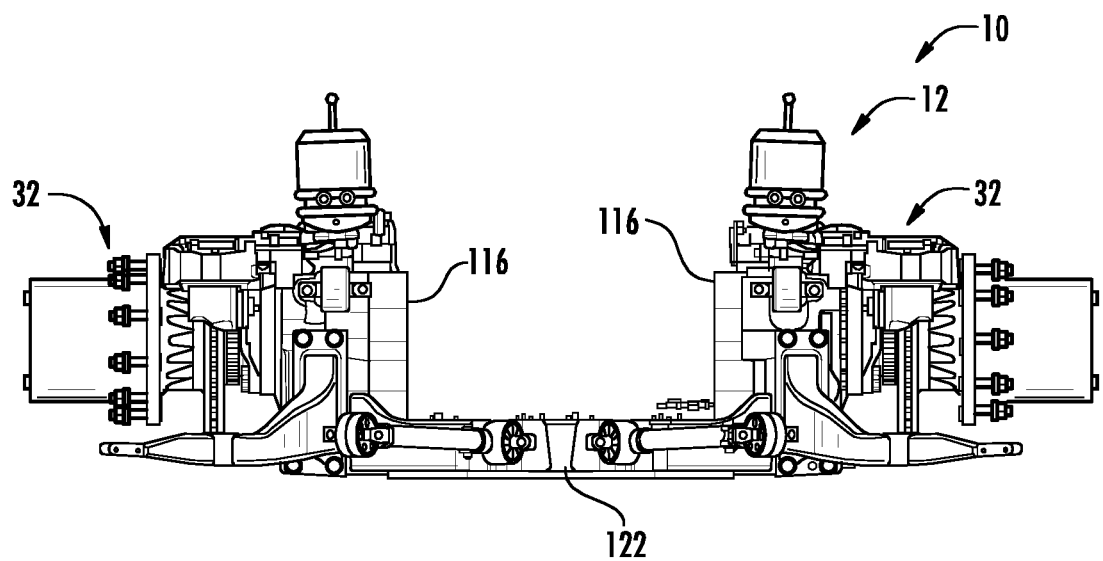
FIG. 59 is a front view of the axle assembly shown in FIG. 56.
Figure 60:
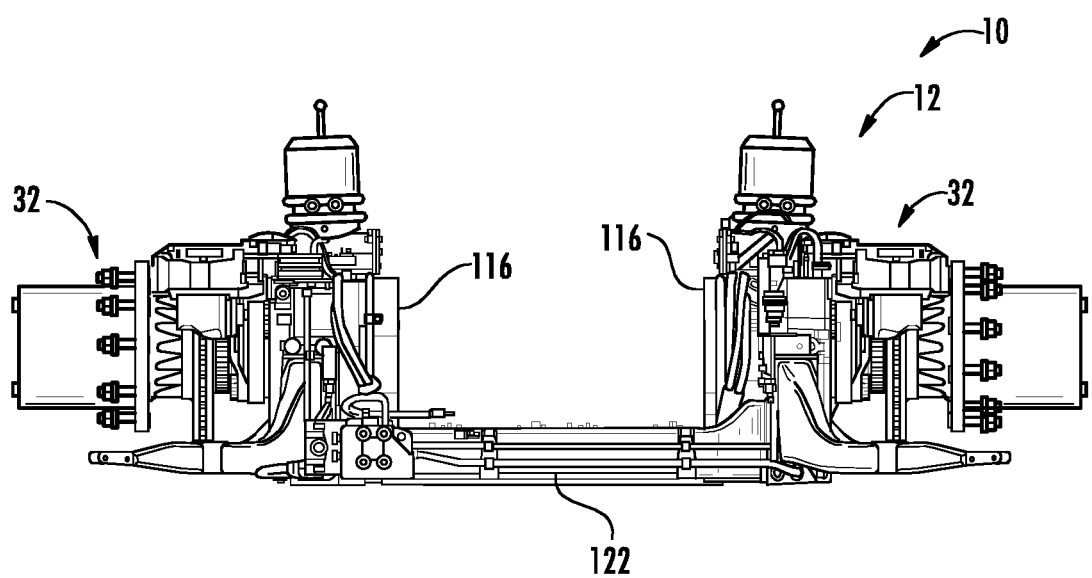
FIG. 60 is a rear view of the axle assembly shown in FIG. 56.
Figure 61:
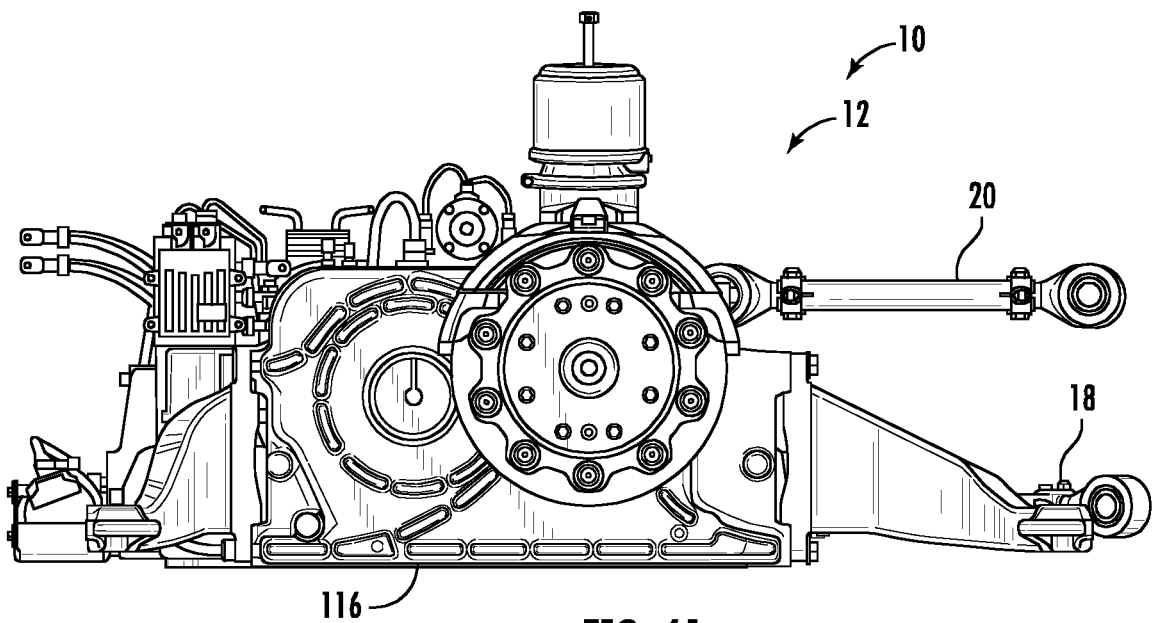
FIG. 61 is a right side view of the axle assembly shown in FIG. 56.
Figure 62:
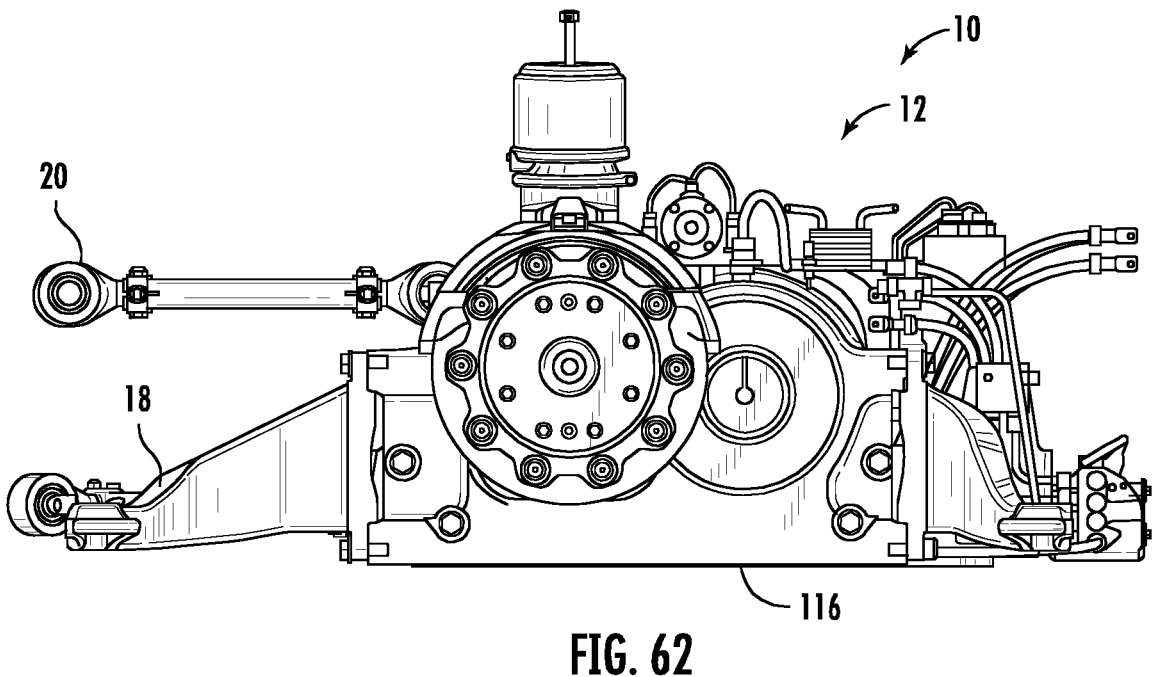
FIG. 62 is a left side view of the axle assembly shown in FIG. 56.
Figure 63:
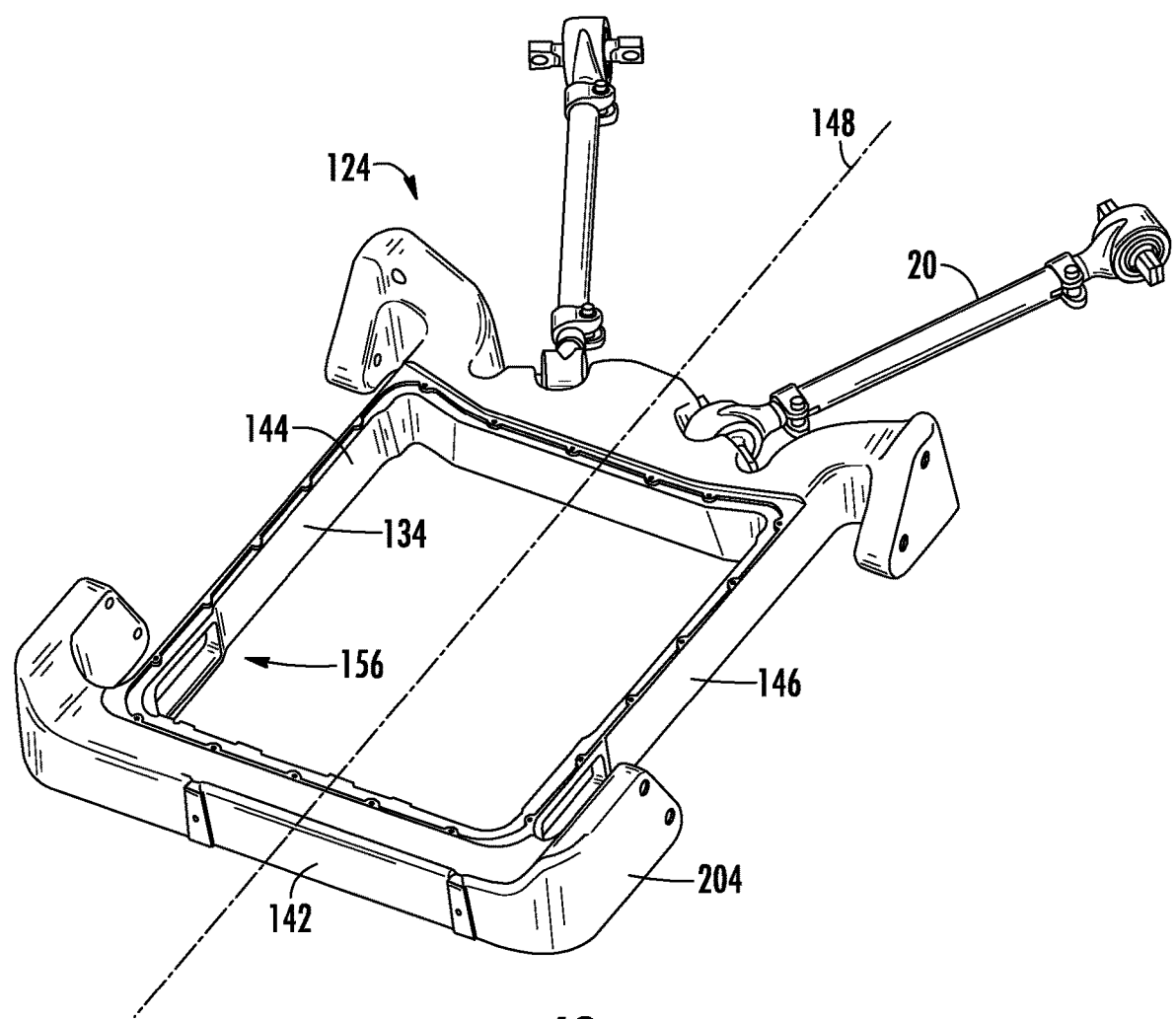
FIG. 63 is a perspective view of the cradle assembly shown in FIG. 56.
Figure 64:
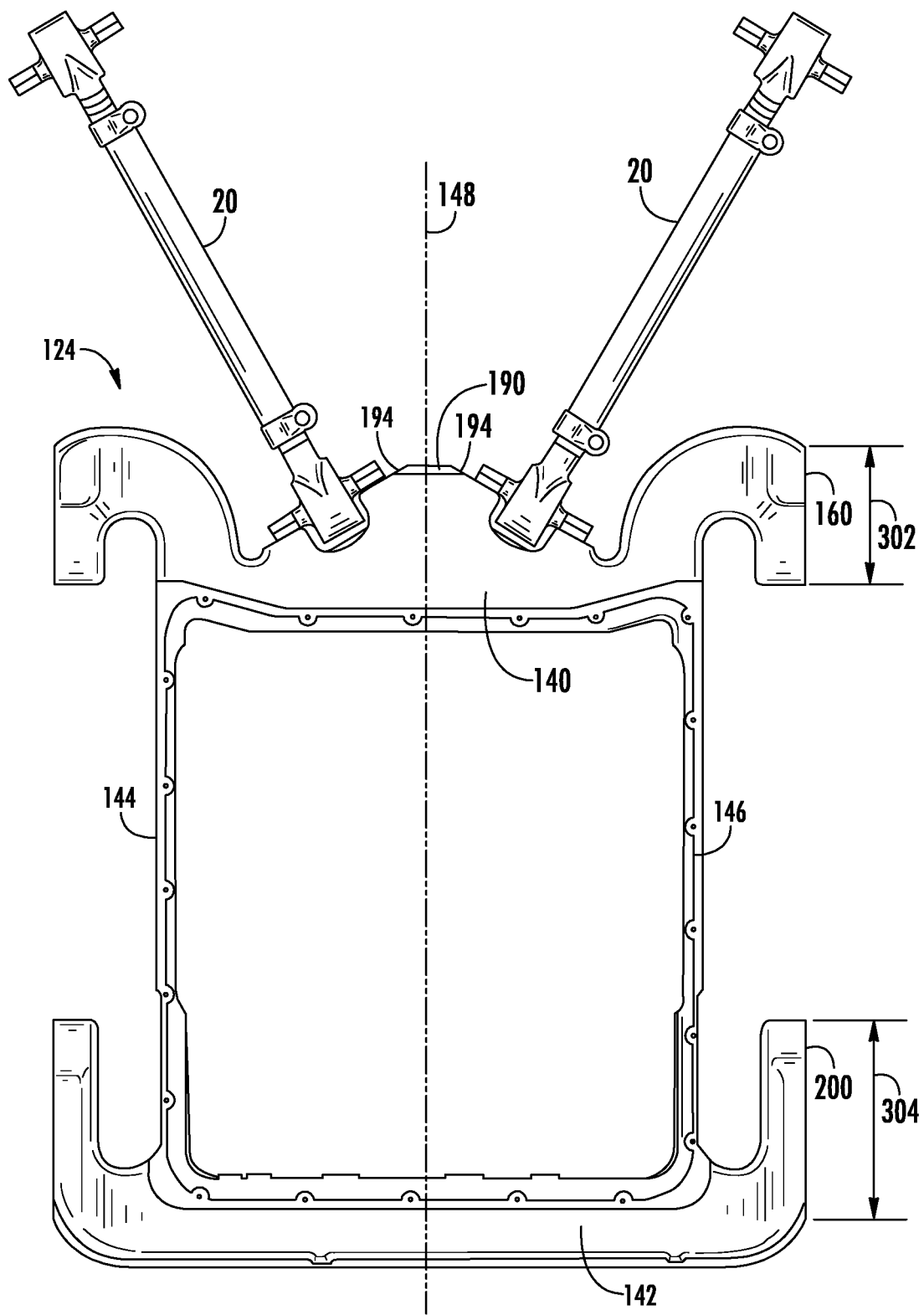
FIG. 64 is a top view of the cradle assembly shown in FIG. 63.
Figure 65:
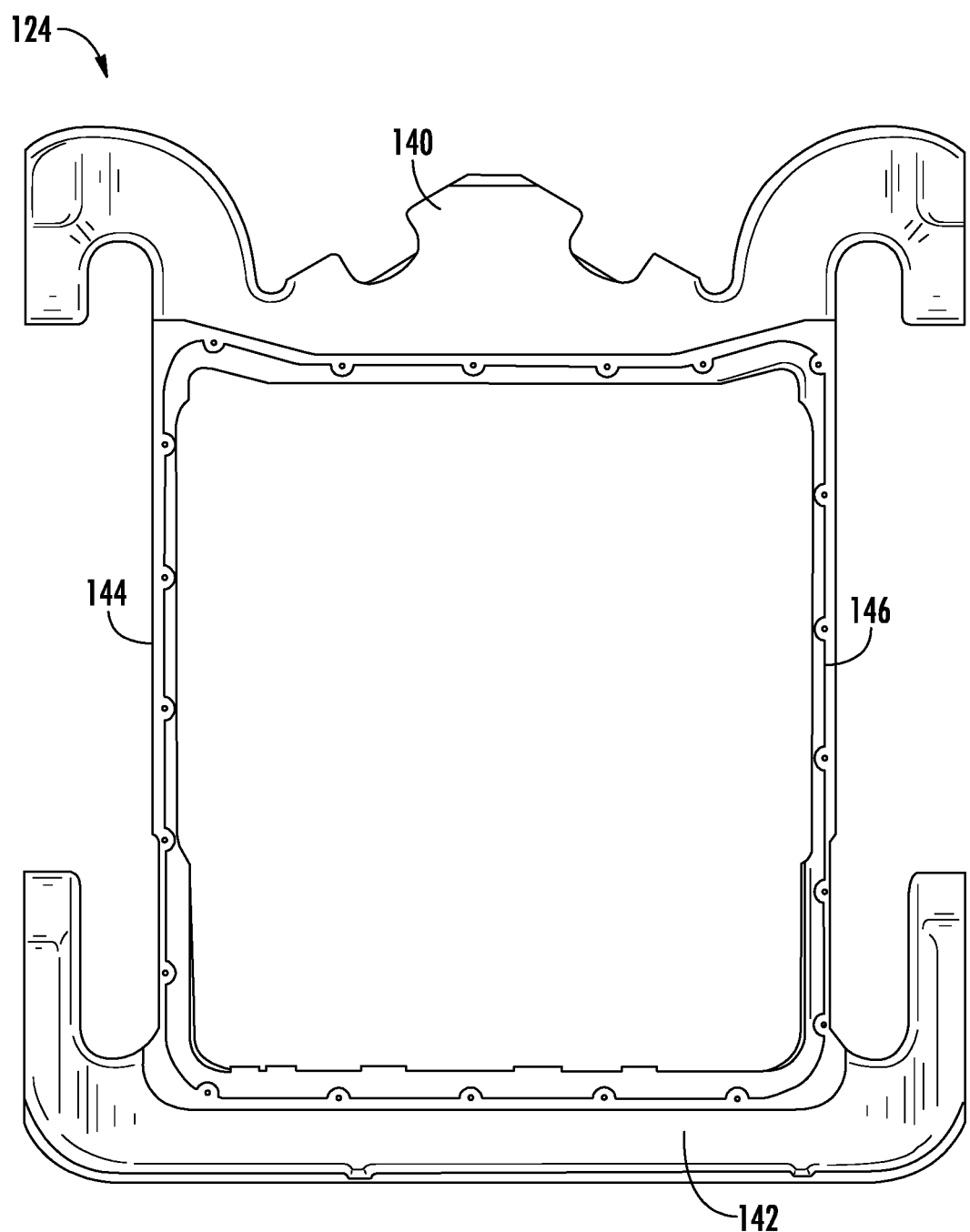
FIG. 65 is another top view of the cradle assembly shown in FIG. 63.
Figure 66:
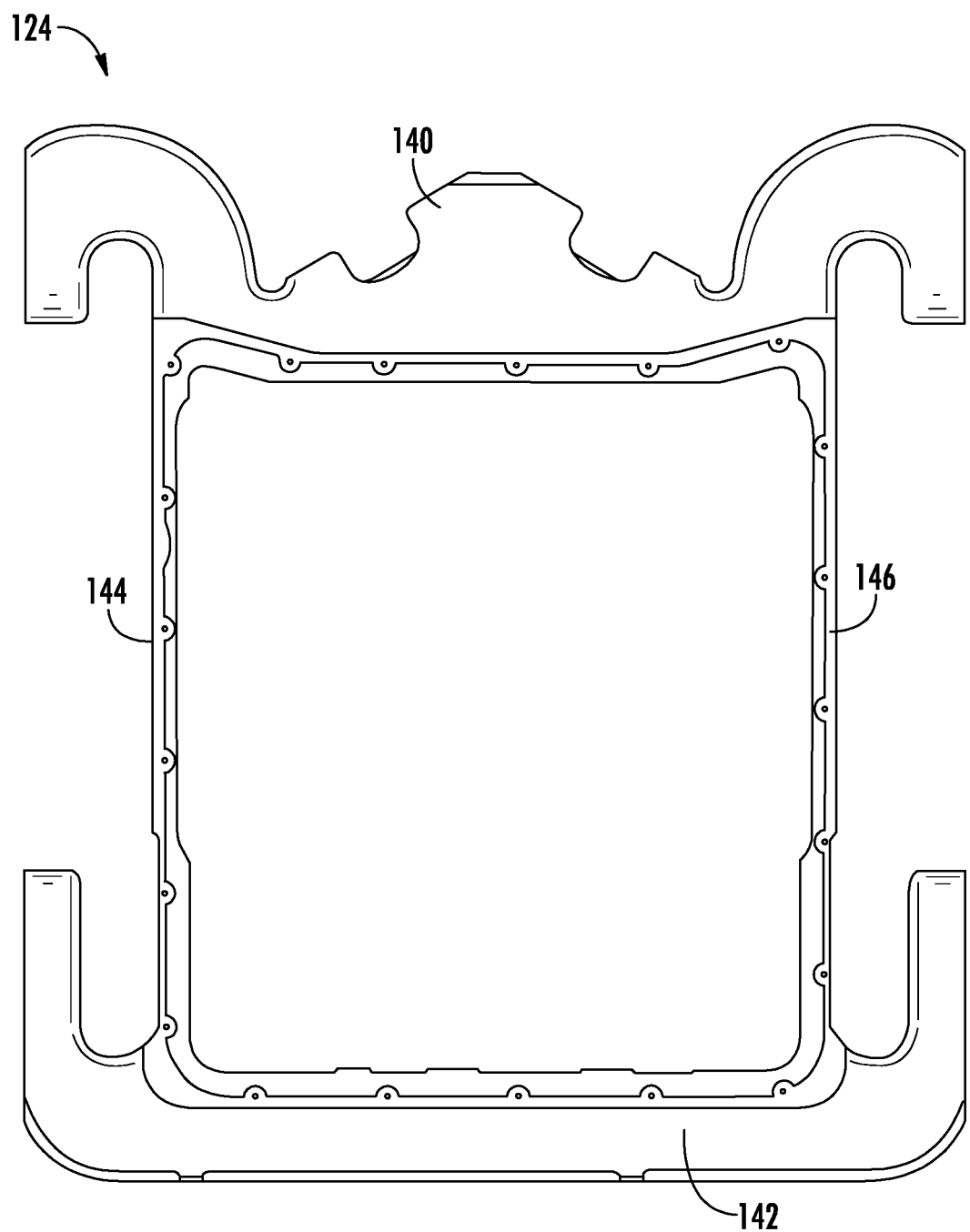
FIG. 66 is bottom view of the cradle assembly shown in FIG. 63.
Figure 67:
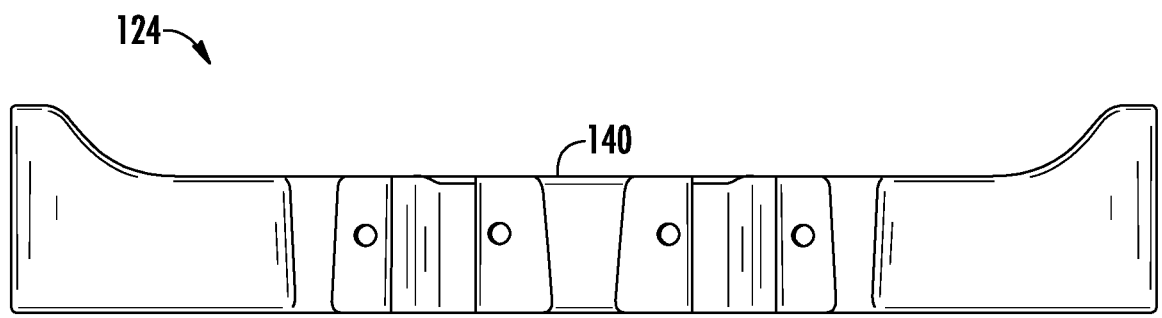
FIG. 67 is front view of the cradle assembly shown in FIG. 63.
Figure 68:
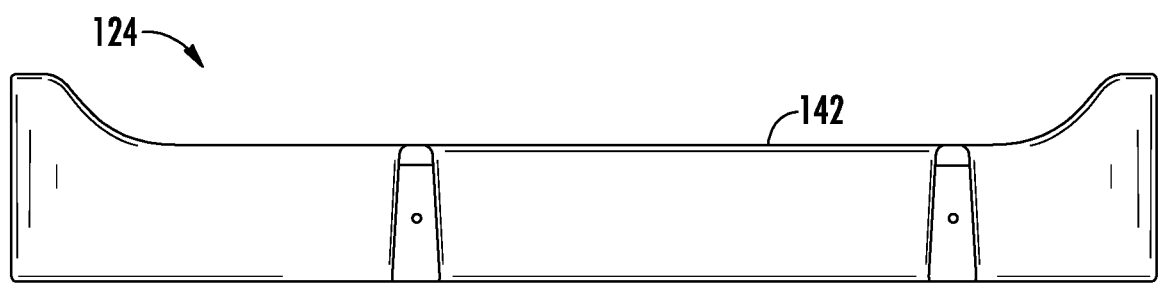
FIG. 68 is rear view of the cradle assembly shown in FIG. 63.
Figure 69:
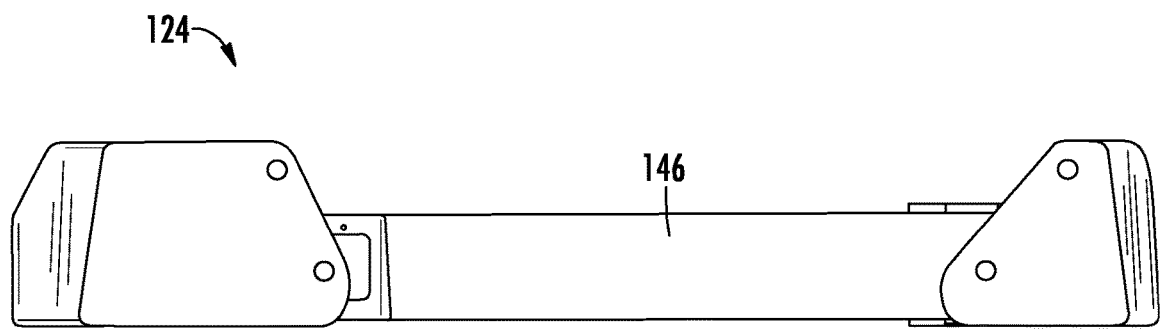
FIGS. 69 and 70 are side views of the cradle assembly shown in FIG. 63.
Figure 70:
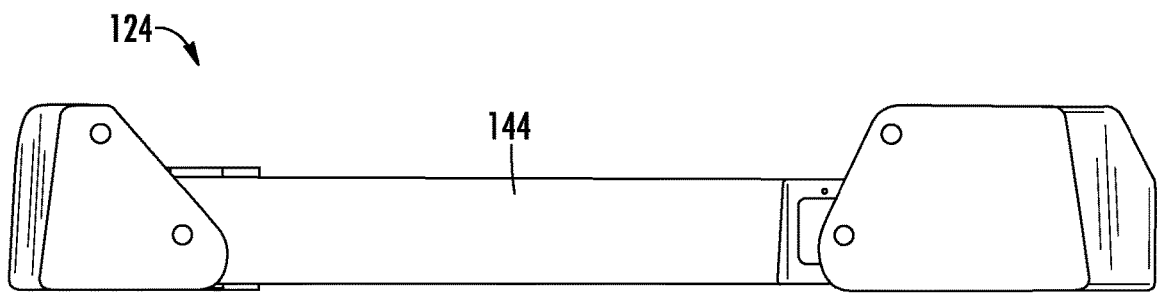
Figure 71:
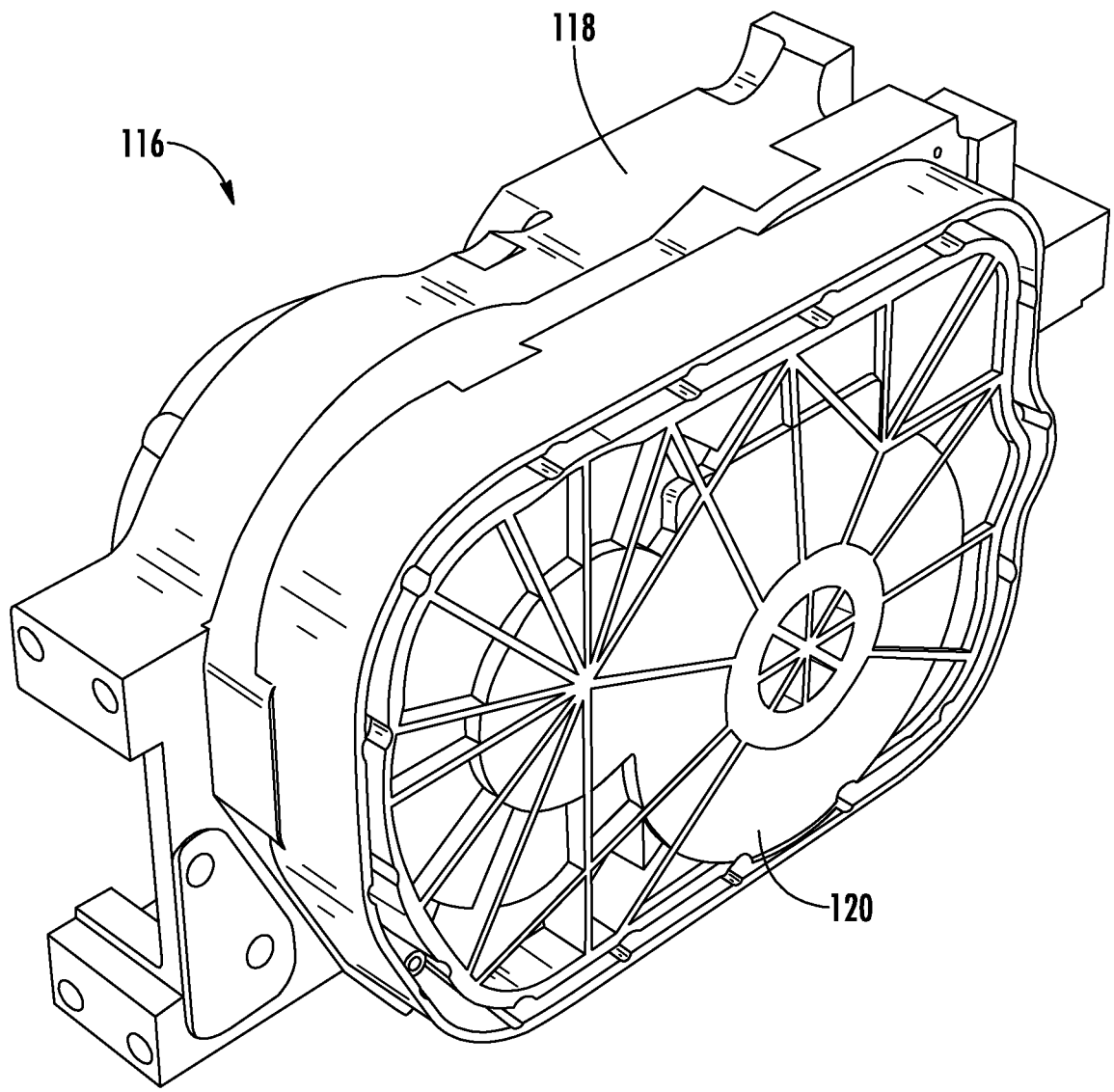
FIG. 71 is a perspective view of the gearbox assembly shown in FIG. 56.
Figure 72:
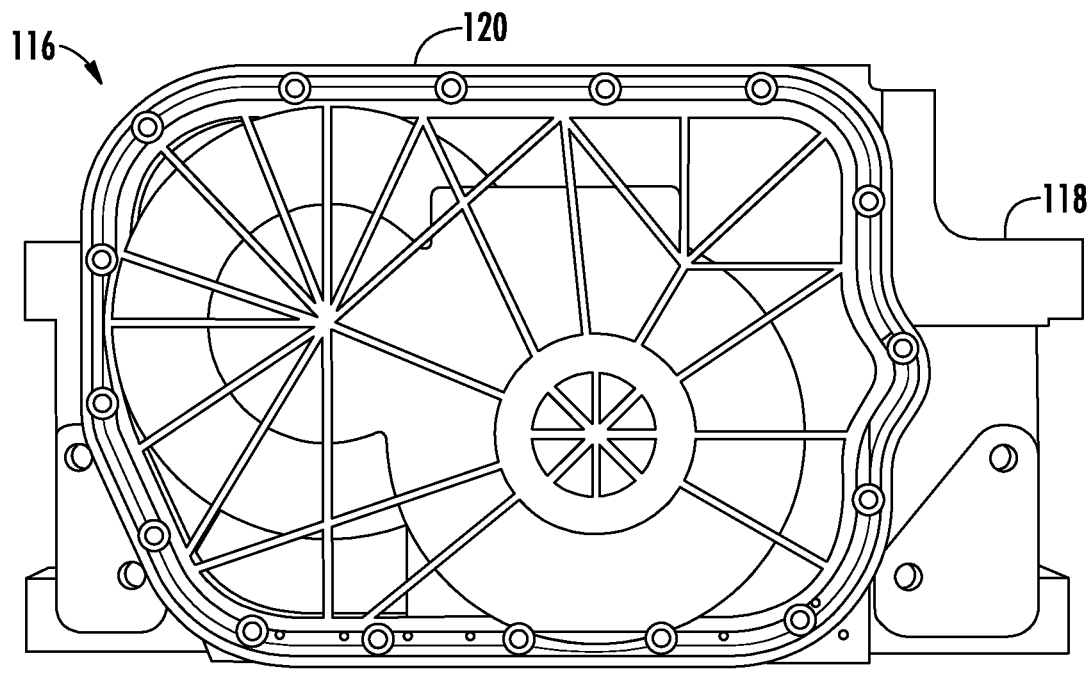
FIG. 72 is a front view of the gearbox housing shown in FIG. 56.
Figure 73:
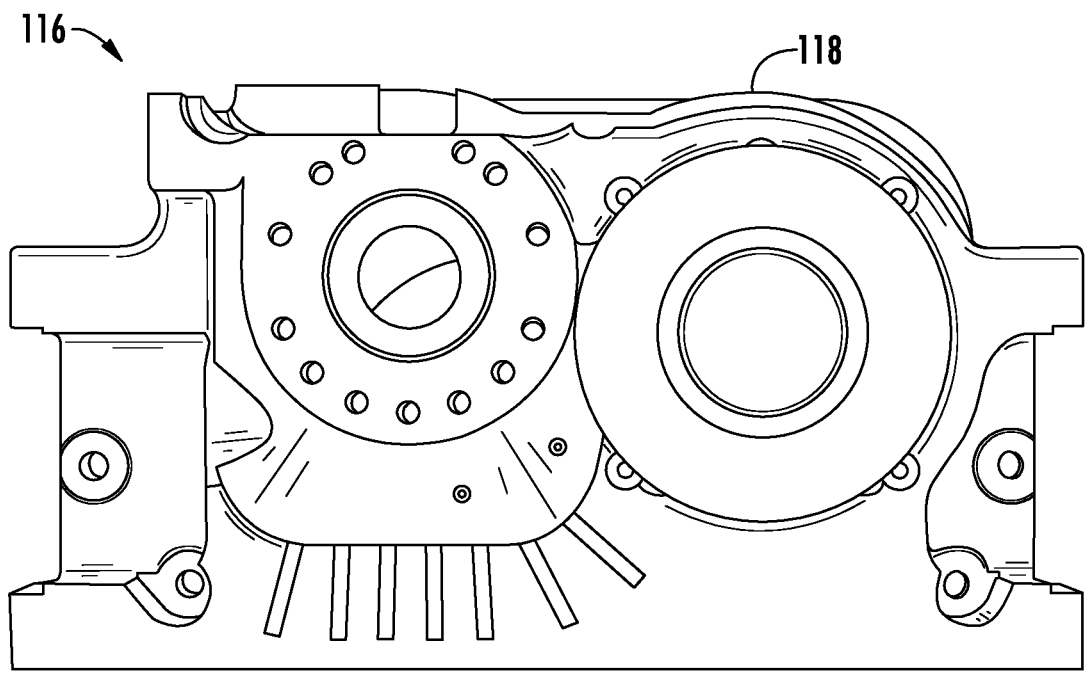
FIG. 73 is a rear view of the gearbox housing shown in FIG. 56.
Figure 74:
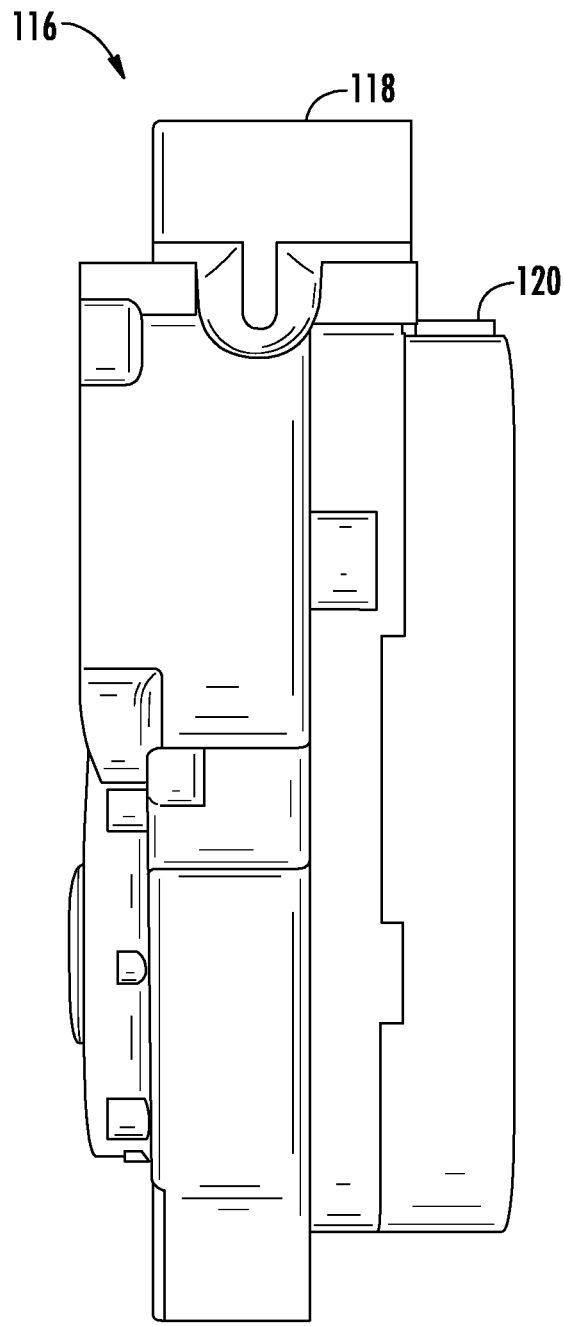
FIG. 74 is a top view of the gearbox housing shown in FIG. 56.
Figure 75:
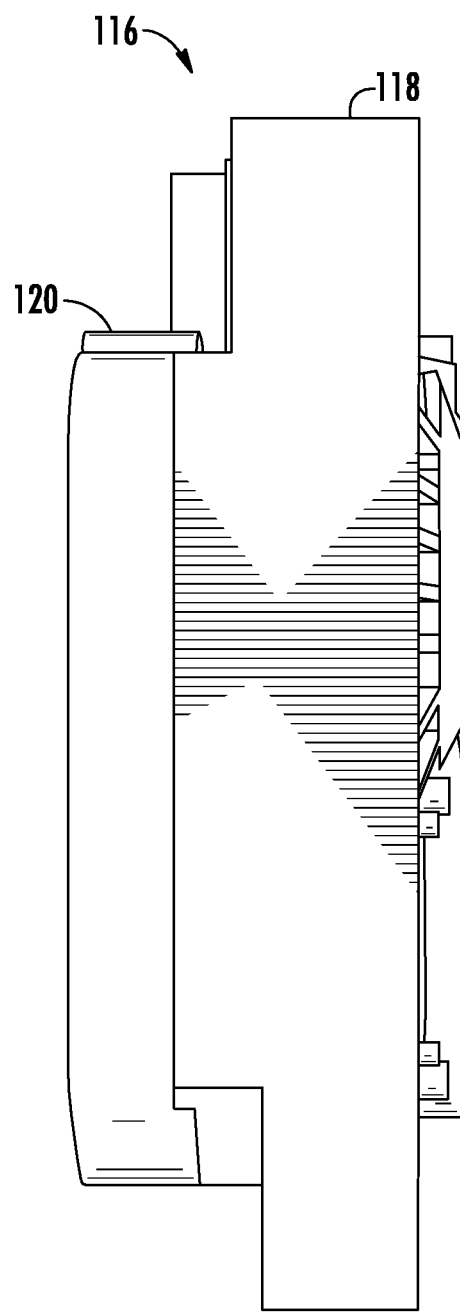
FIG. 75 is a bottom view of the gearbox housing shown in FIG. 56.
Figure 76:
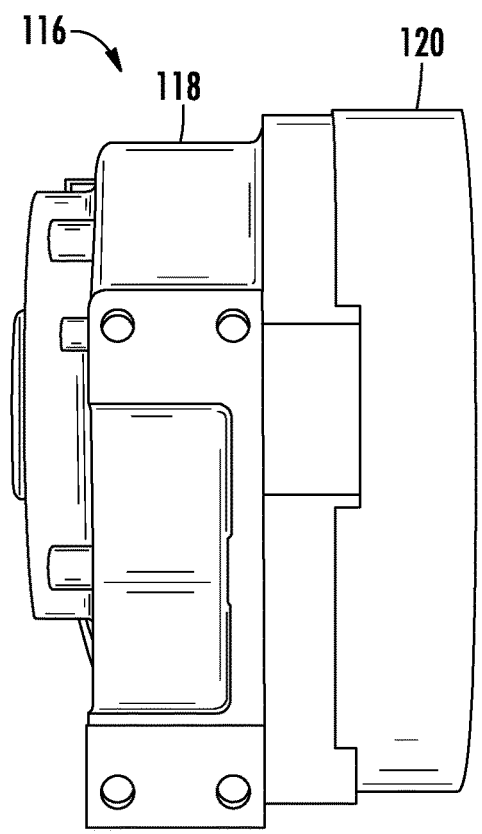
FIGS. 76 and 77 are side views of the gearbox housing shown in FIG. 56.
Figure 77:
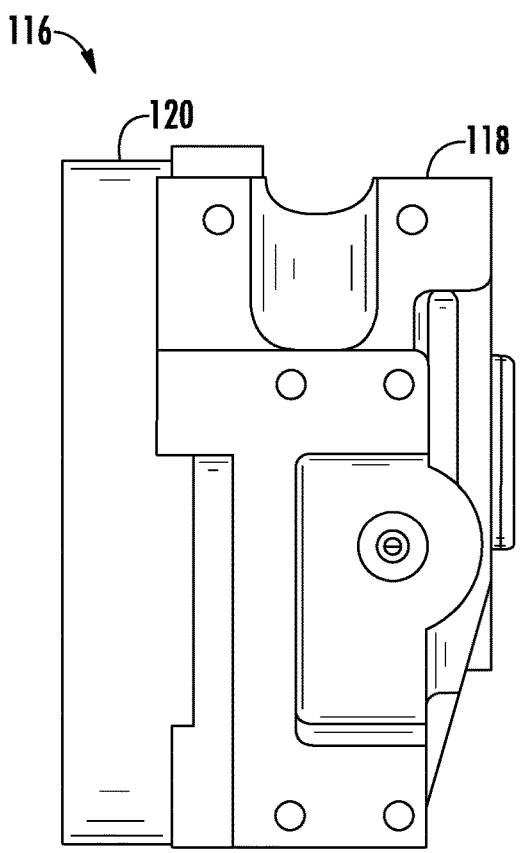

In one embodiment, as shown in FIG. 55, the axle assembly 10 may include a first motor assembly 100 for driving a first wheel assembly 102, and a second motor assembly 104 for driving a second wheel assembly 106. Each motor assembly 100 and 104 includes a drive unit 26, and inverter device 108 coupled to the drive unit 26, and a controller 110 for operating the electrical inverter device 108 and the drive unit 26. Each inverter device 108 is coupled to one or more batteries 112 for supplying electrical power to the inverter electrical inverter 108. Each controller 110 is coupled to a VMU unit 114. In one embodiment, the first motor assembly 100 is configured to operate independently from the second motor assembly 104. In addition, each controller 110 is programmed to operate the corresponding motor assemblies at a variable speed. For example, in one embodiment, the VMU 114 may be programmed to transmit signals to each controller 110 such that, during operation, the controller 110 of the first motor assembly 100 may operate the drive unit of the first motor assembly 100 at a first rotational speed, and the controller 110 of the second motor assembly 100 may operate the drive unit of the second motor assembly 104 at a second rotational speed that is different than the first rotational speed of the first motor assembly 100. In addition, during operation, only one of the motor assemblies may be operated to drive the corresponding wheel assembly with the other motor assembly allowing the corresponding wheel assembly to spin freely. This provides the axle assembly 10 with the capability of not driving one of the electric motors when the load requirements are low. This can be done through the controller that doesn't send power to one of the motors, or can be done mechanically to disconnect the motor. Disconnection can be through a neutral position as part of a speed change mechanism, or through a clutch or the like. When in this mode, the axle assembly 10 operates to drive only one wheel on one side of the vehicle. For example, in a tandem axle configuration (four wheels), the axle assembly 10 may operate to generate power that can be alternated between different motors based on needs and loads.

Figure 5:
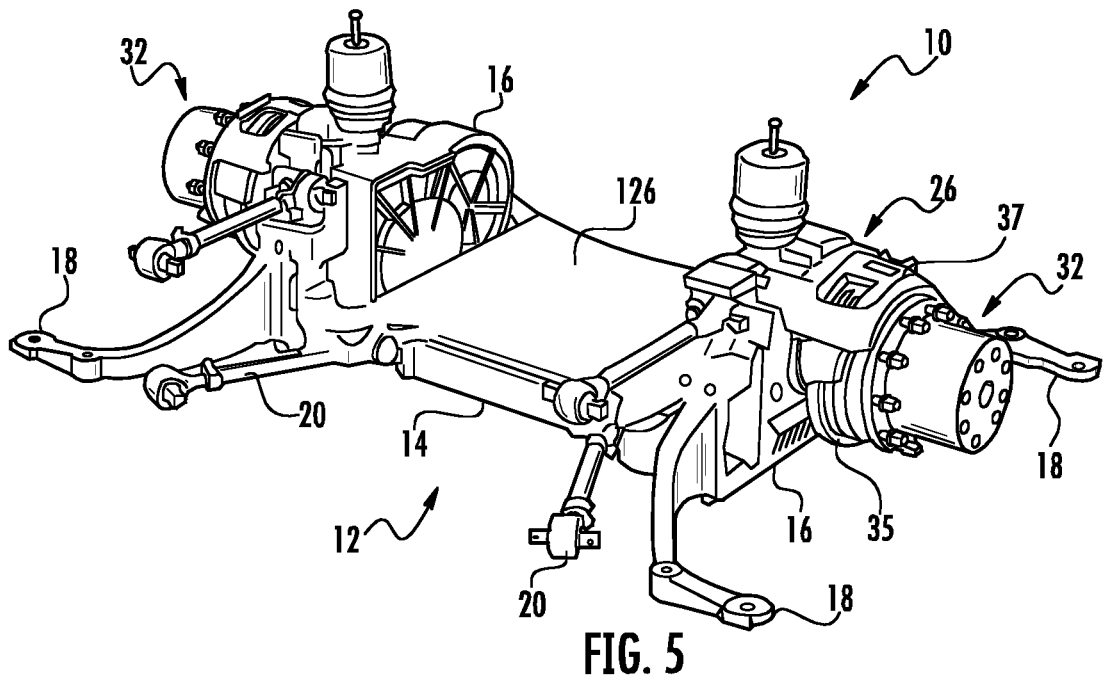
FIGS. 5-8 are perspective views of the axle assembly for a low floor vehicle shown in FIG. 1, according to embodiments of the present disclosure.
Figure 6:
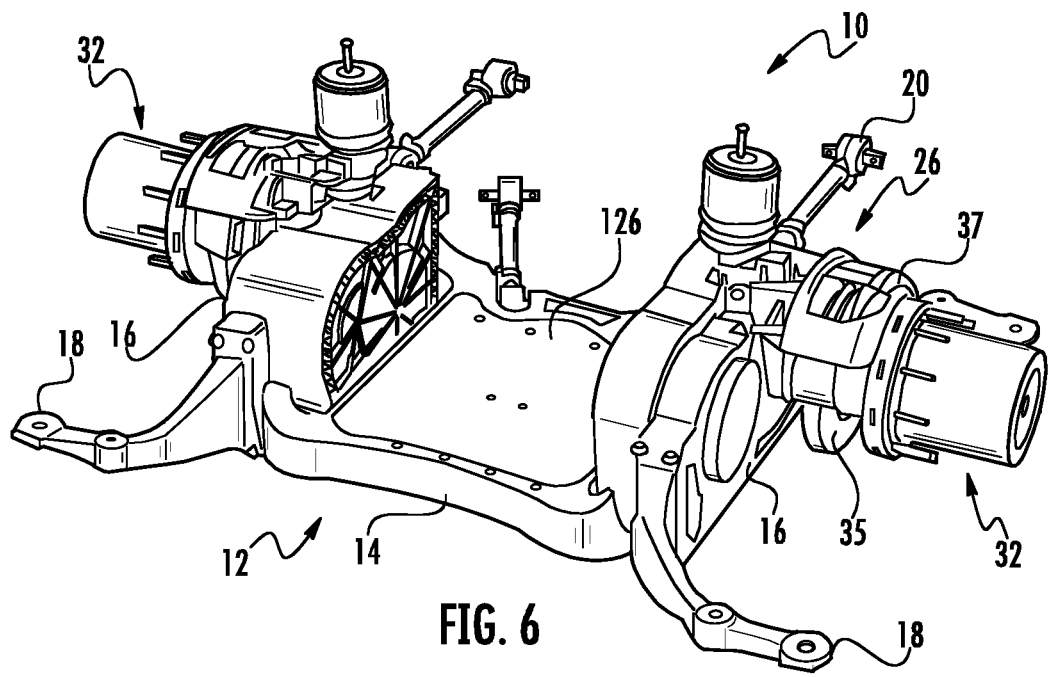
Figure 7:
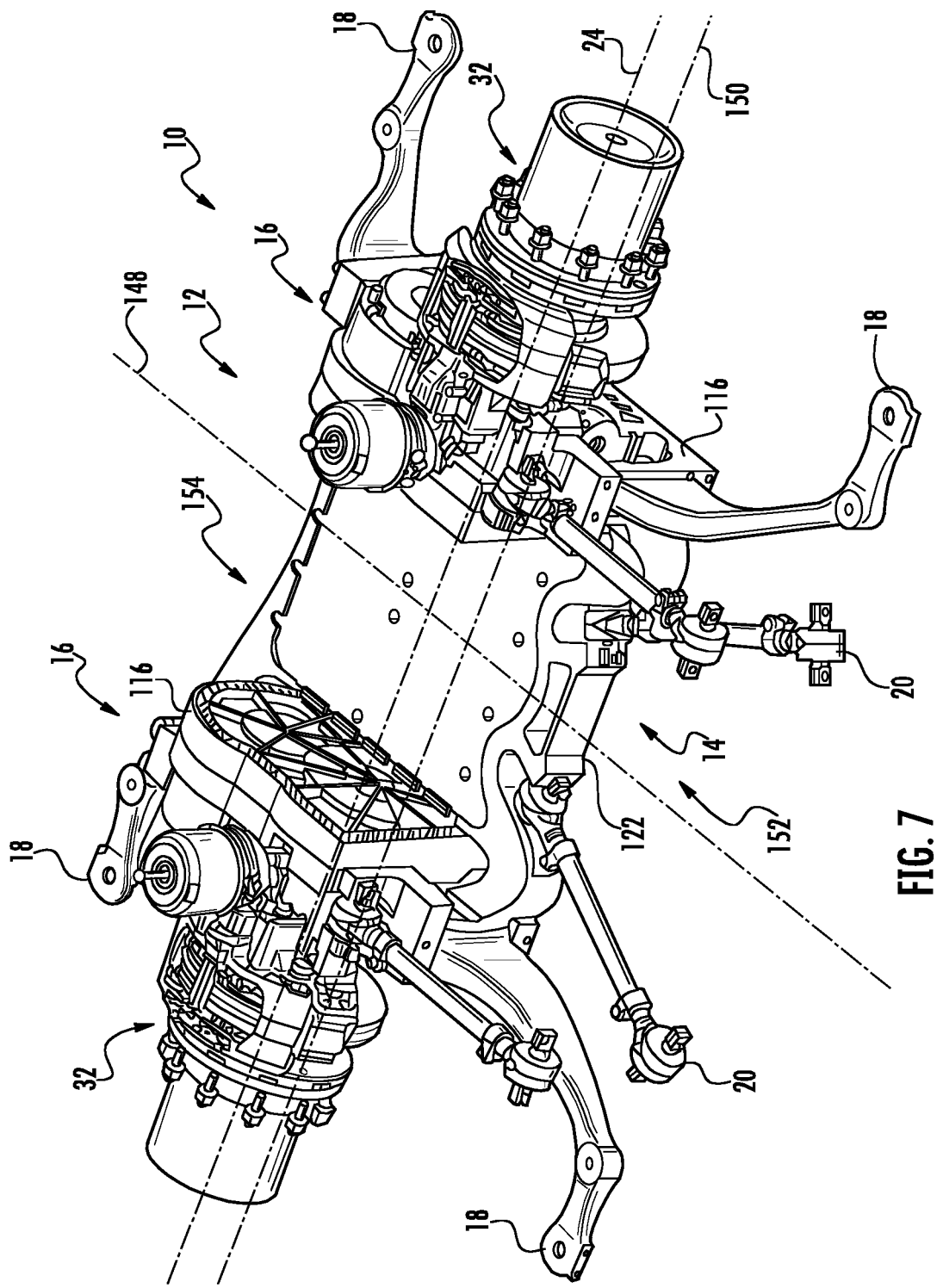
Figure 8:
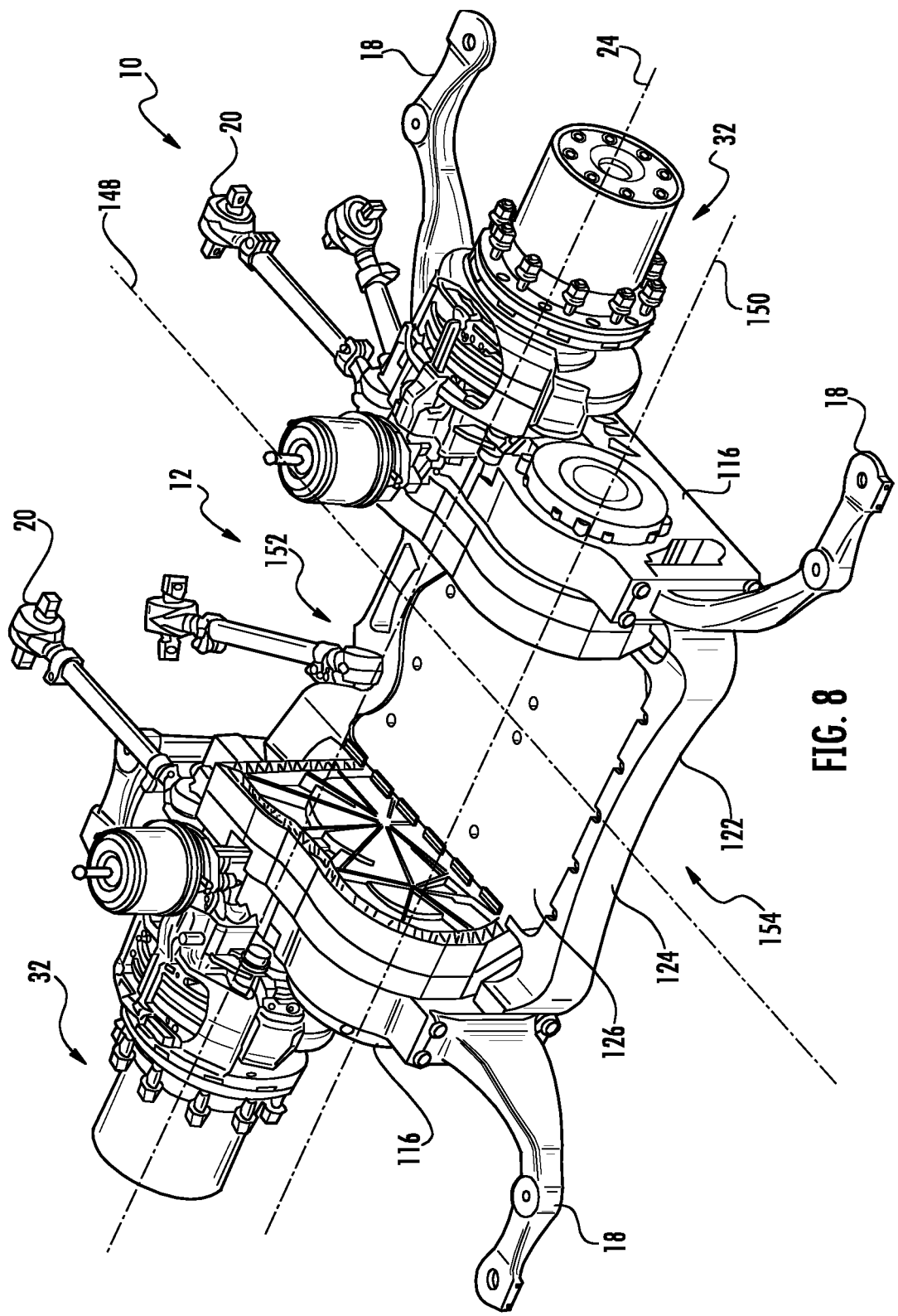
Figure 9:
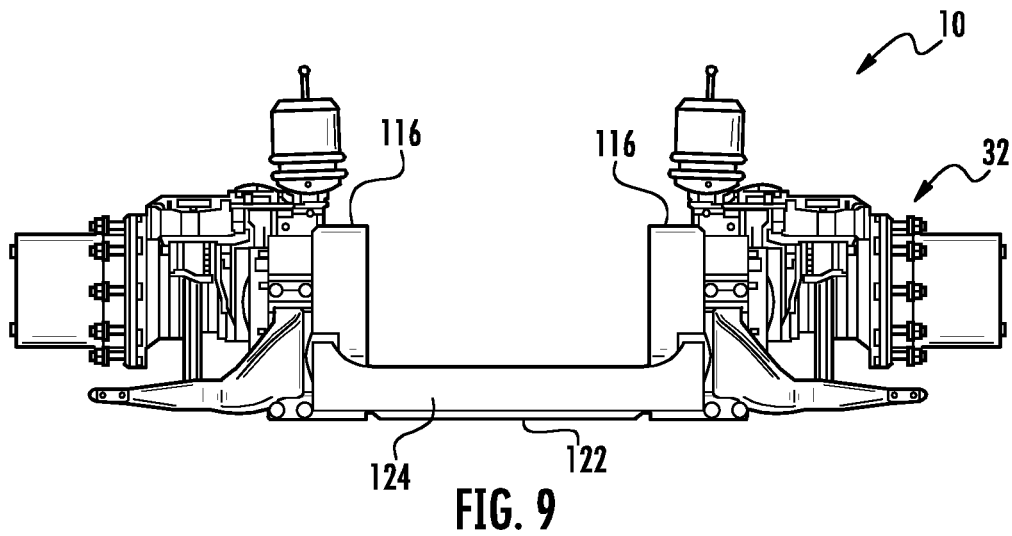
FIG. 9 is an elevation view of a rear portion of the axle assembly shown in FIGS. 5-8.
Figure 10:
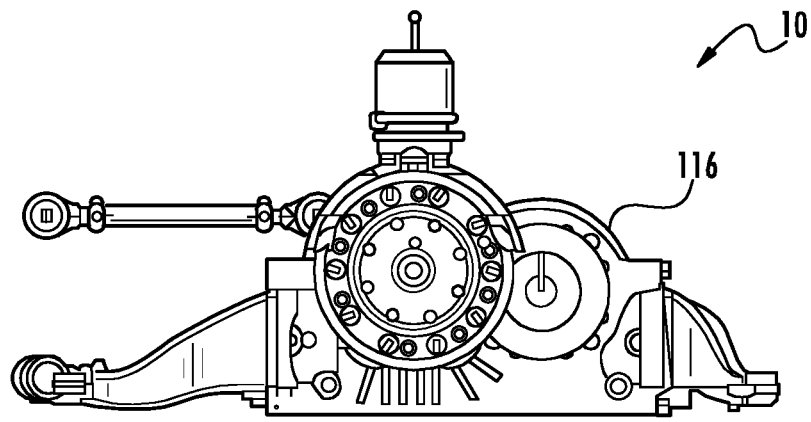
FIG. 10 is an elevation view of a left side of the axle assembly shown in FIGS. 5-8.
Figure 11:
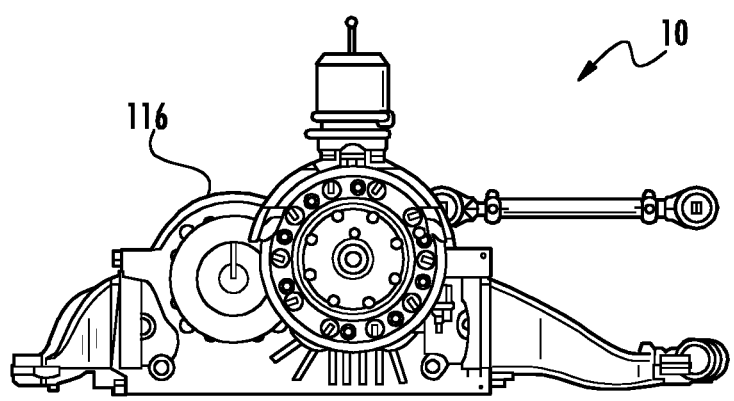
FIG. 11 is an elevation view of a right side of the axle assembly shown in FIGS. 5-8.
Figure 12:
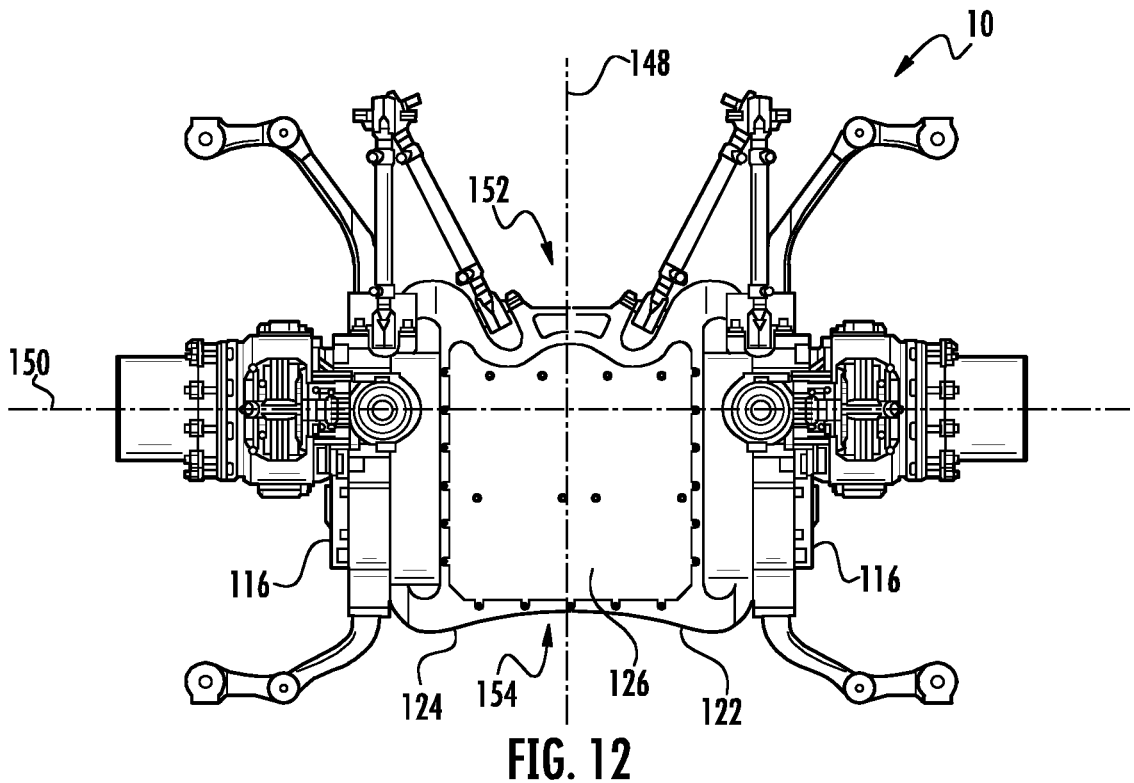
FIG. 12 is a top view of the axle assembly shown in FIGS. 5-8.
Figure 13:
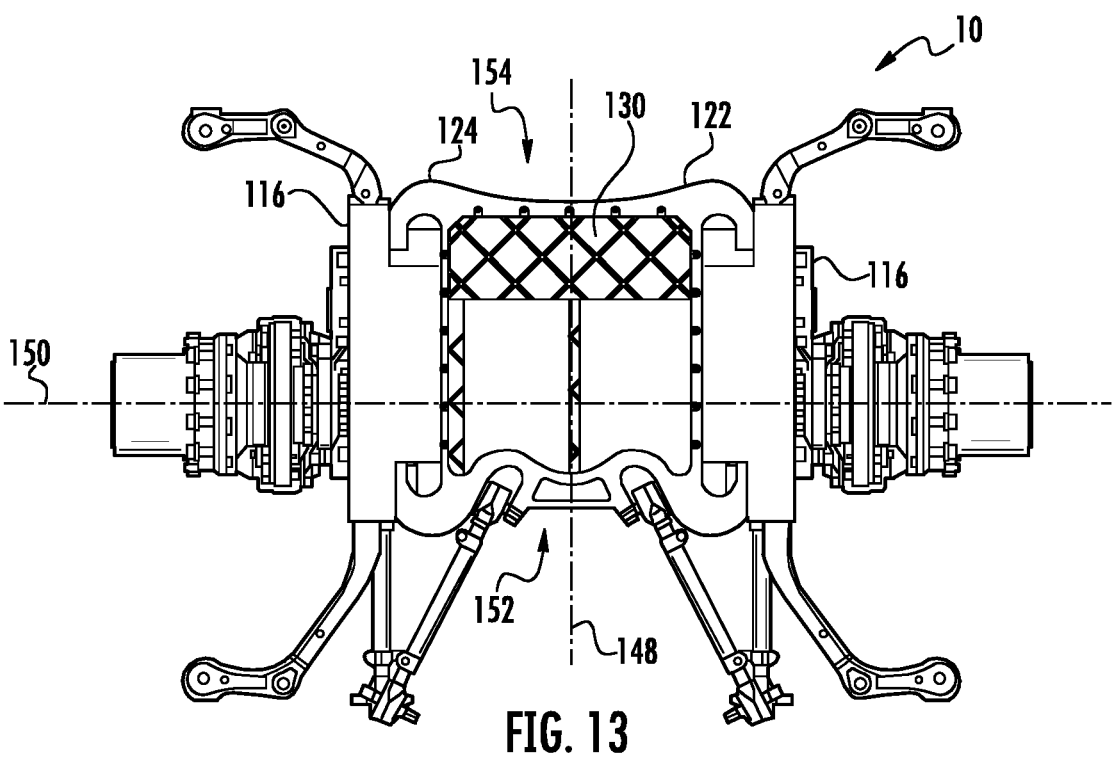
FIG. 13 is a bottom view of the axle assembly shown in FIGS. 5-8.
Figure 14:
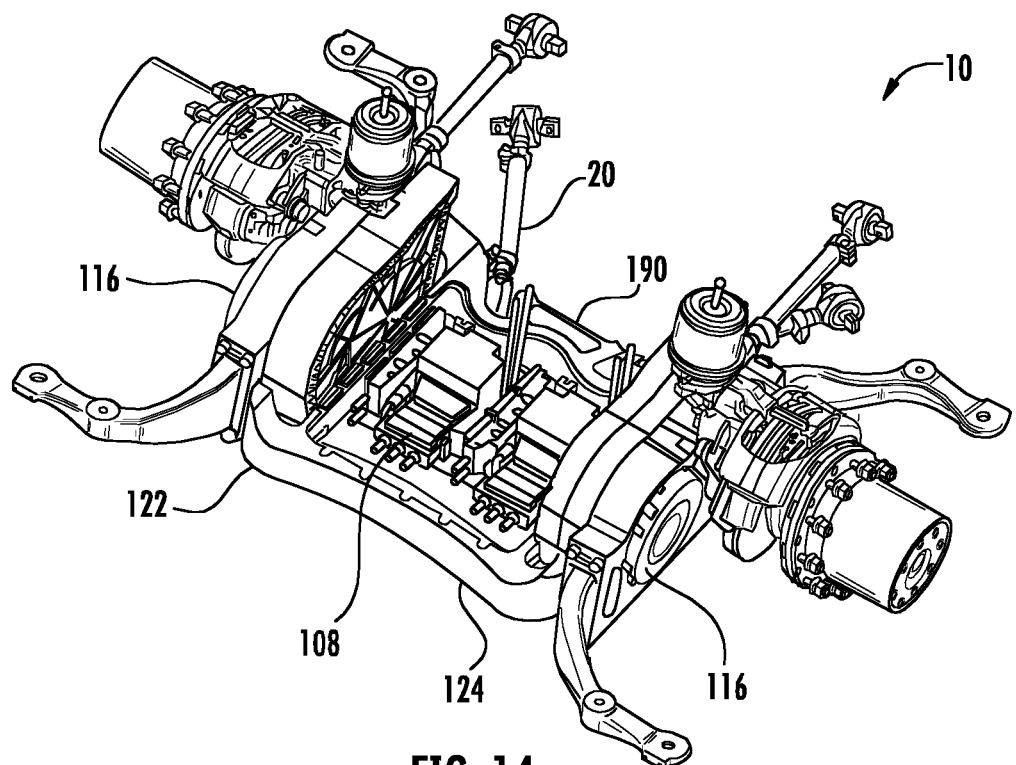
FIGS. 14 and 15 are perspective views of the axle assembly shown in FIGS. 5-8.
Figure 15:
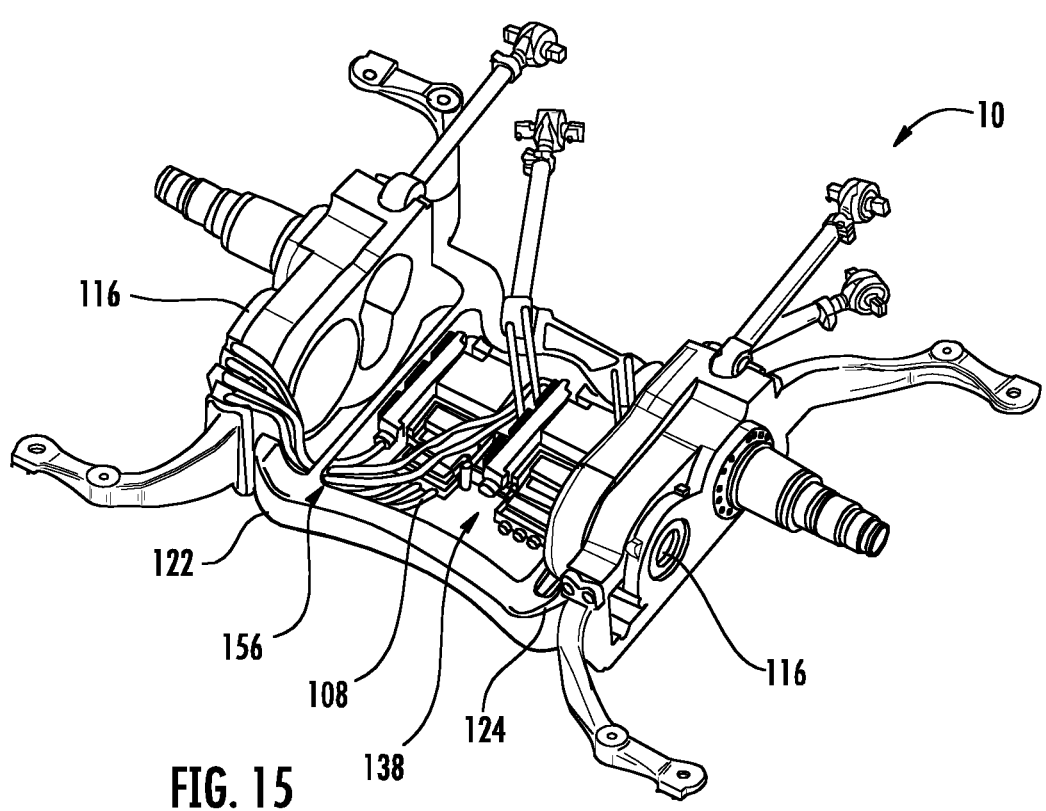
Figure 78:
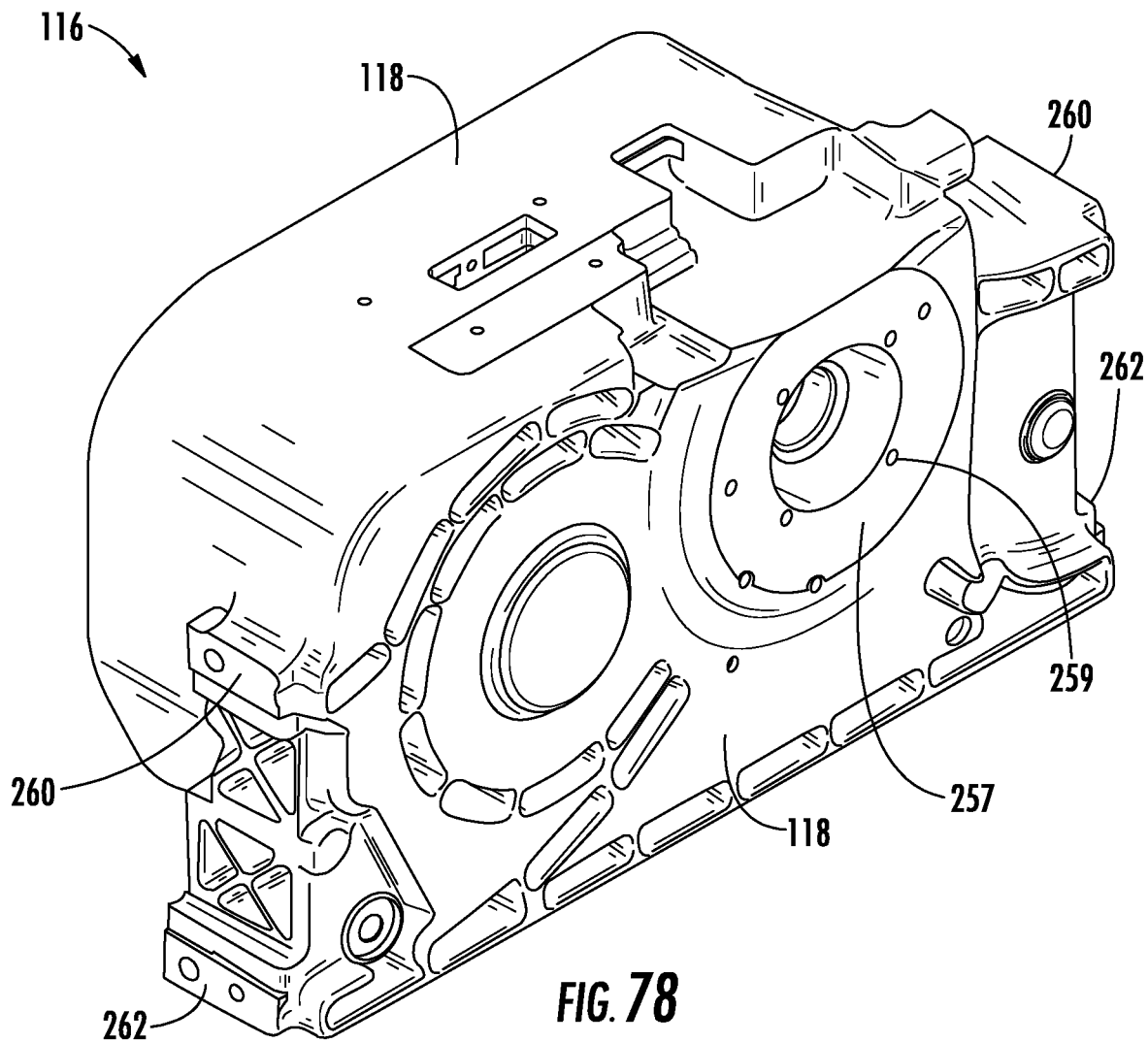
FIG. 78 is another perspective view of the gearbox assembly shown in FIG. 56.
Figure 79:
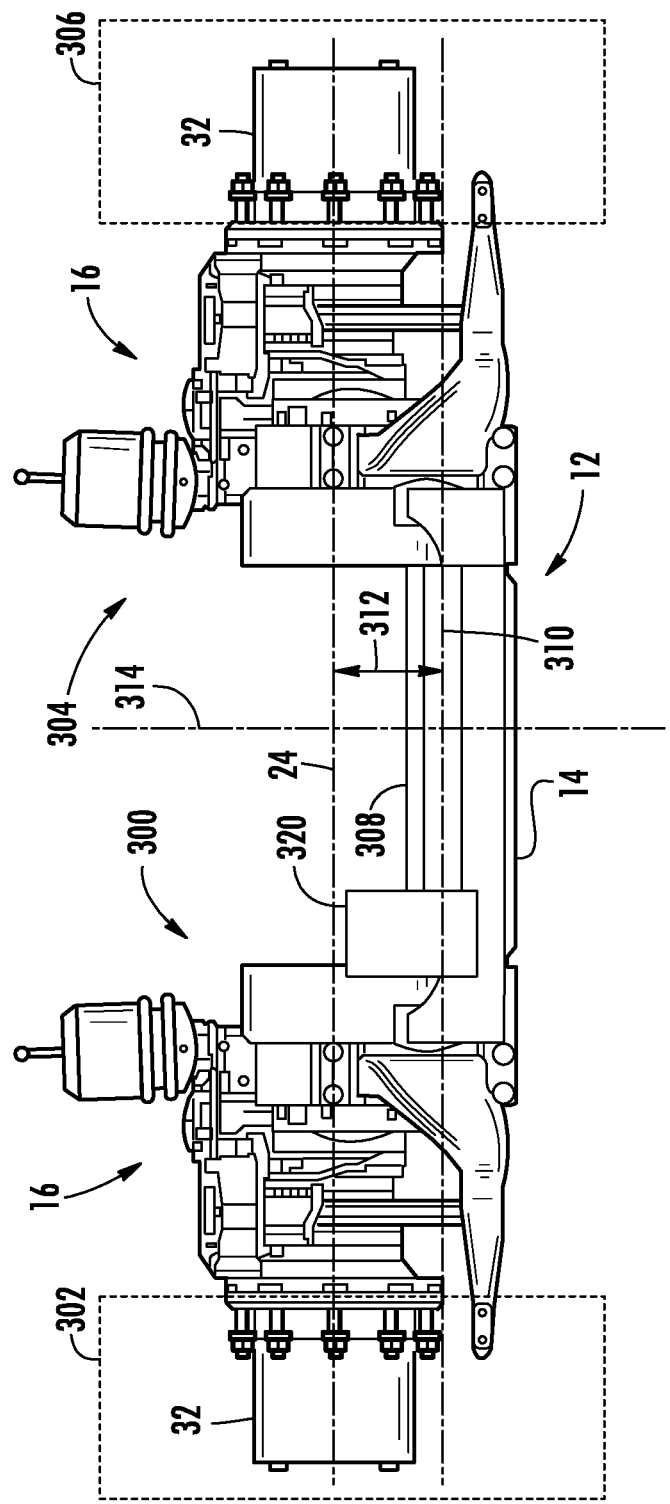
FIG. 79 is an elevation view of an axle assembly for a low floor vehicle, according to another embodiment of the present disclosure.

Referring to FIGS. 5-78, of the illustrated embodiment, each outer section 16 includes a gearbox 116 that includes a gearbox housing 118 and a gearbox cover 120. The bridge section 14 includes a cradle assembly 122 that is coupled to each gearbox housing 118. The cradle assembly 122 includes a cradle frame 124, a top cover 126 that is removably coupled to a top portion 128 of the cradle frame 124, and a bottom cover 130 that is removably coupled to a bottom portion 132 of the cradle frame 124. The cradle frame 124 includes an inner surface 134 that defines a cavity 136 that extends through the cradle frame 124. The top cover 126 extends across the top portion 128 of the cradle frame 124 and the bottom cover 130 extends across the bottom portion 132 of the cradle frame 124 to enclose the cavity 136 to form a cradle chamber 138. The cradle chamber 138 is sized and shaped to receive one or more electrical inverter devices 108 that are positioned within the cradle chamber 138.

The cradle frame 124 includes a forward member 140, a rear member 142, a first side member 144 and an opposite second side member 146. The first side member 144 and the second side member 146 extend along a longitudinal axis 148 and are spaced a distance apart along a transverse axis 150 that is perpendicular to the longitudinal axis 148. In the illustrated embodiments, the transverse axis 150 is substantially parallel to the axis of rotation 24 of each wheel 22. The forward member 140 is coupled between the first side member 144 and the second side member 146 to form a front portion 152 of the cradle frame 124. The rear member 142 is coupled between the first side member 144 and the second side member 146, and is spaced a distance from the forward member 140 along the longitudinal axis 148 to form a rear portion 154 of the cradle frame 124.

The first side member 144 and the second side member 146 each include one or more cable access openings 156 that extend through the side members. The cable access opening 156 is sized and shaped to receive a plurality of electrical cables therethrough to allow electrical and communication cables to extend from the electrical inverter devices 108 positioned within the cradle chamber 138 to an area outside the cradle chamber 138. The electrical and communication cables may include, but are not limited to, 3 phase cables, two DC cables, a motor connection cable, and customer interface cable.

A pair of forward mounting flanges 158 extend outwardly from opposite ends of the forward member 140. Each forward mounting flange 158 includes a mounting member 160 and a support arm 162 that is coupled between the mounting member 160 and the forward member 140. The mounting member 160 is spaced a distance outwardly from an outer surface 164 of a corresponding side member 144, 146 as measured along the transverse axis 150. The mounting member 160 includes a planar mounting surface 166 that is configured to engage an outer surface of a corresponding gearbox housing 118. The planar mounting surface 166 is orientated substantially parallel to the outer surface 164 of the corresponding side members 144, 146.

Figure 23:
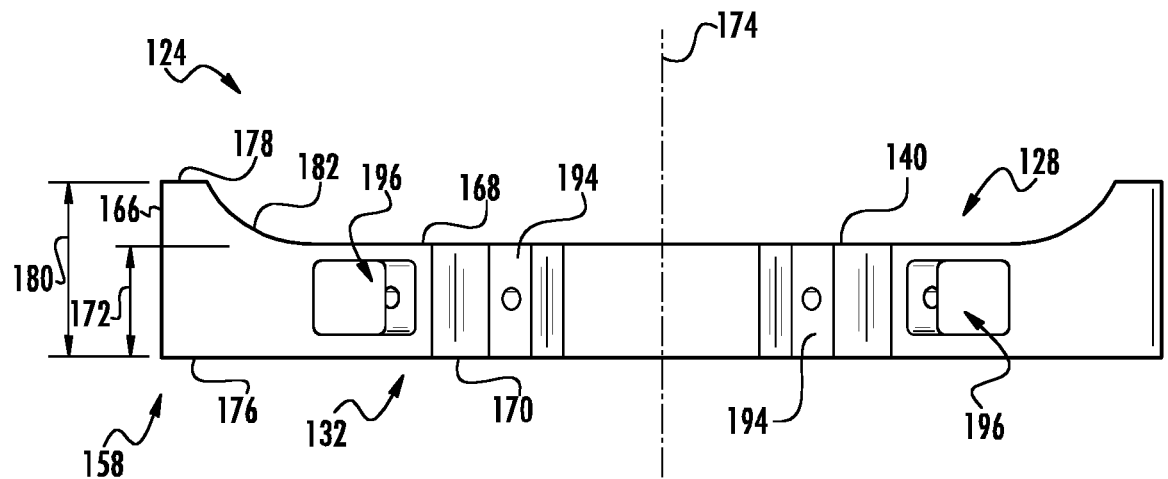
FIG. 23 is an elevation view of a front portion of the cradle assembly shown in FIG. 21.
Figure 24:
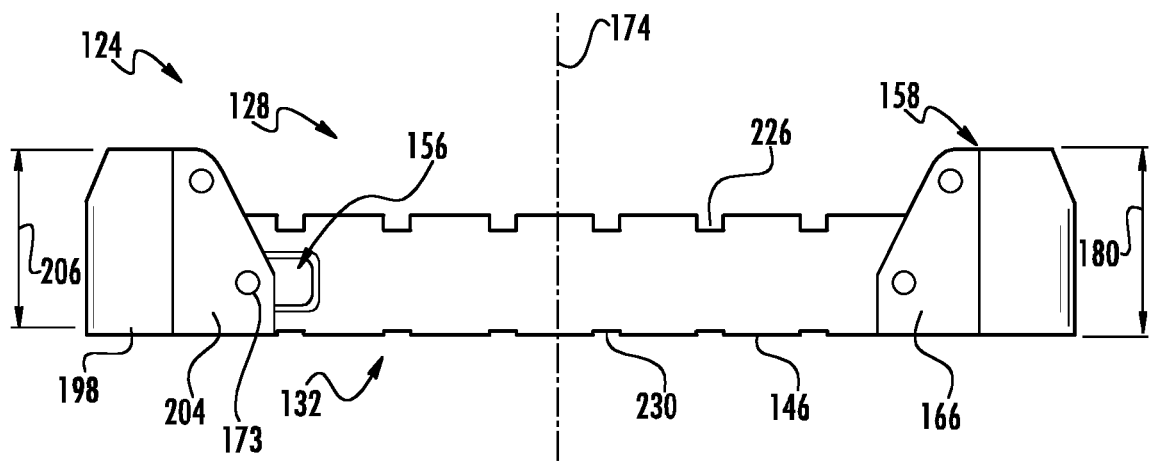
FIG. 24 is an elevation view of a right side of the cradle assembly shown in FIG. 21.
Figure 25:
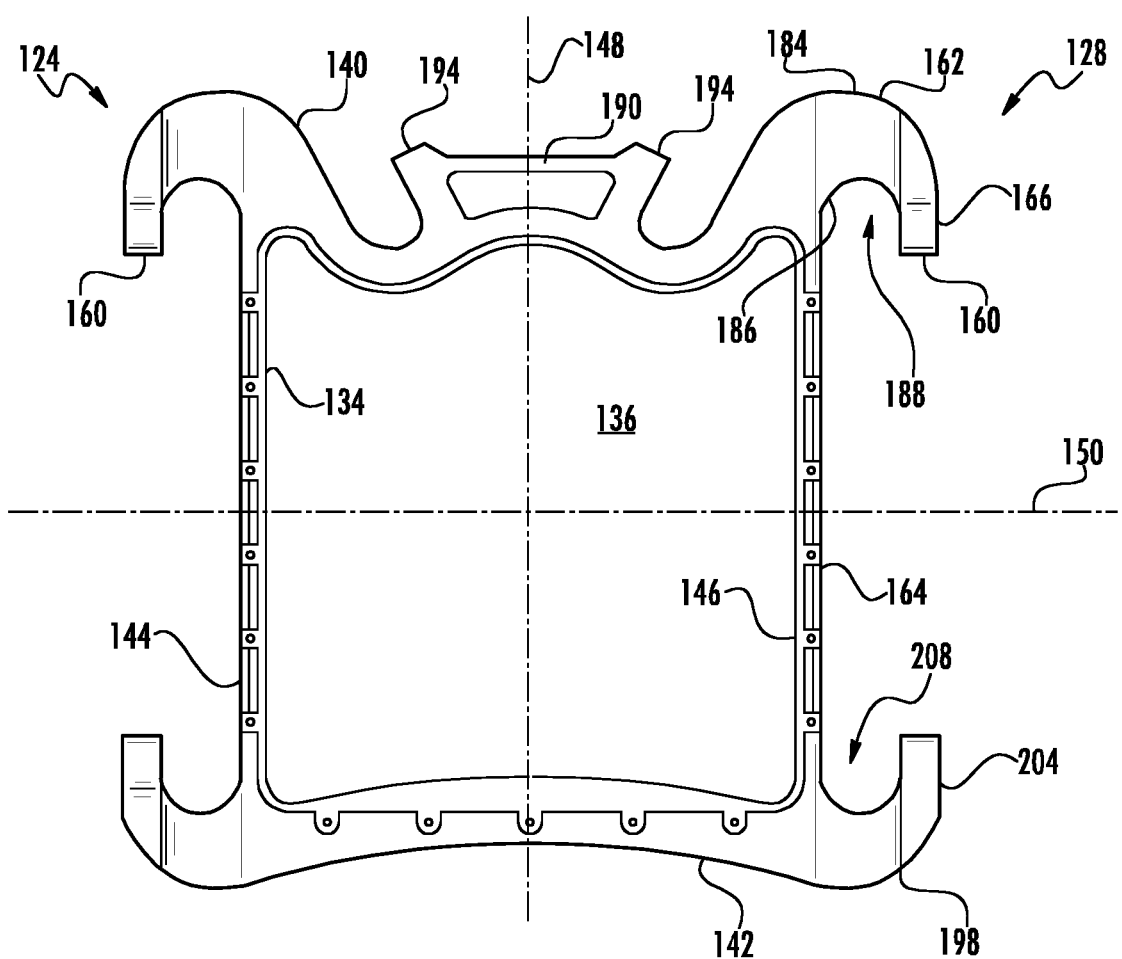
FIG. 25 is a top view of the cradle assembly shown in FIG. 21.
Figure 26:
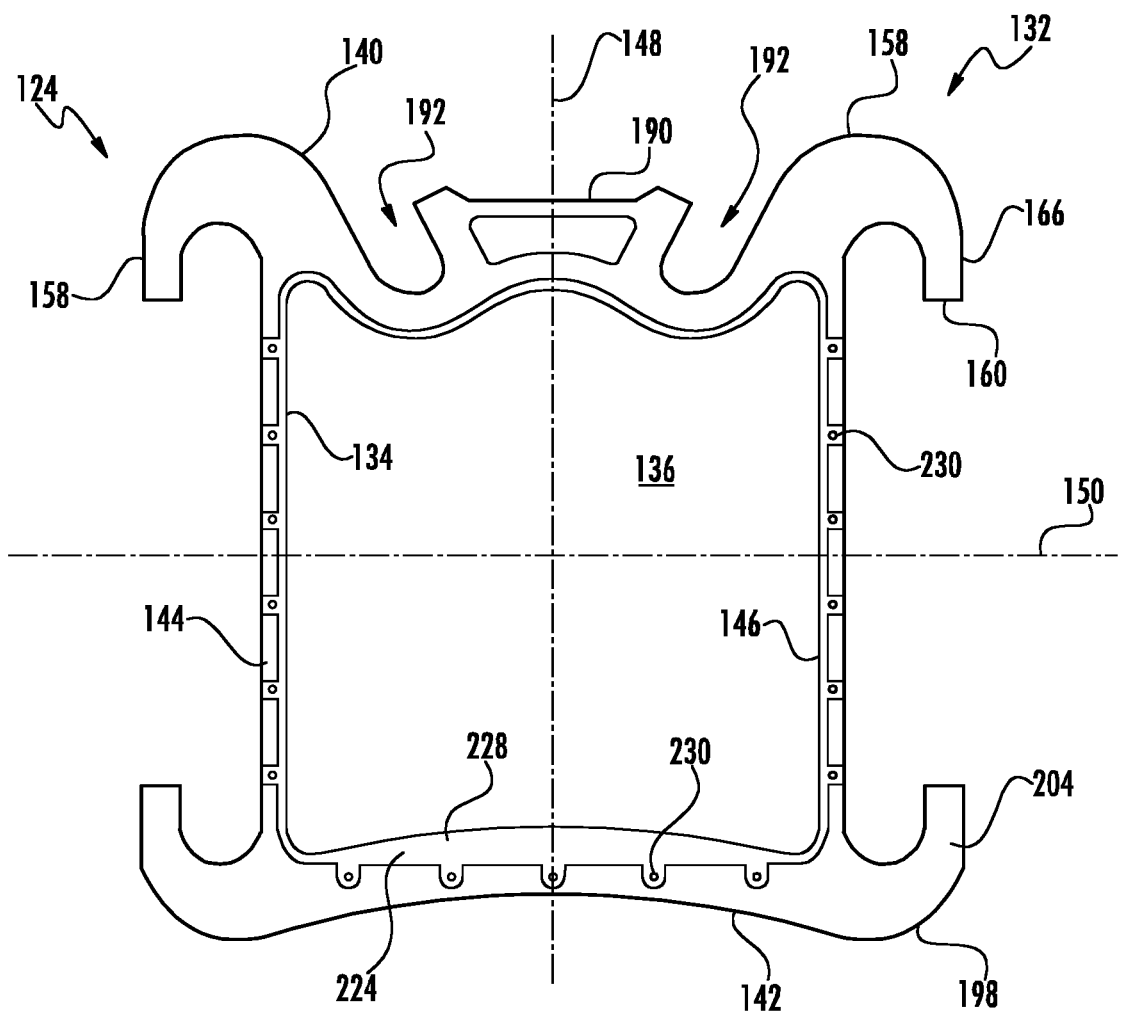
FIG. 26 is a bottom view of the cradle assembly shown in FIG. 21.
Figure 27:
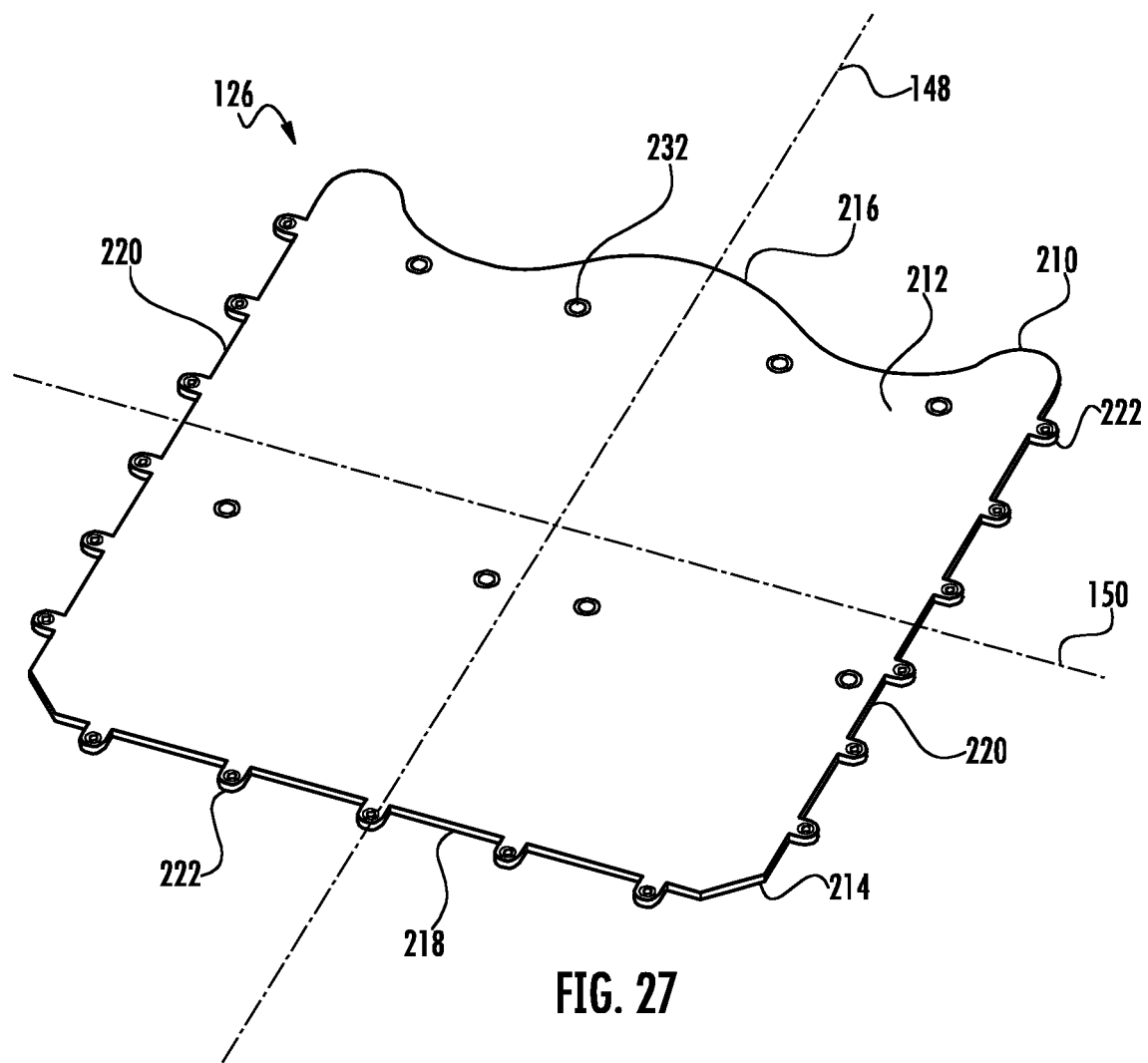
FIG. 27 is a perspective view of a top cover that may be used with the cradle assembly shown in FIGS. 19 and 20.
Figure 31:
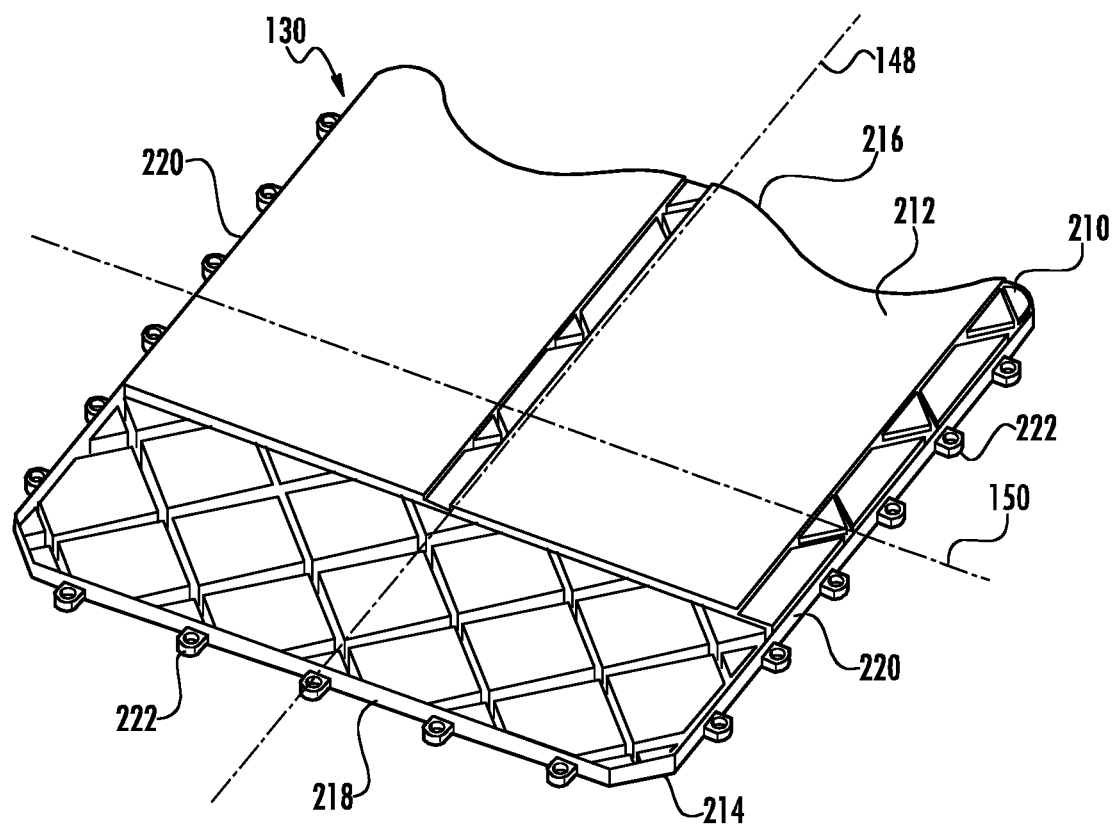
FIG. 31 is a perspective view of a bottom cover that may be used with the cradle assembly shown in FIGS. 19 and 20.
Figure 35:
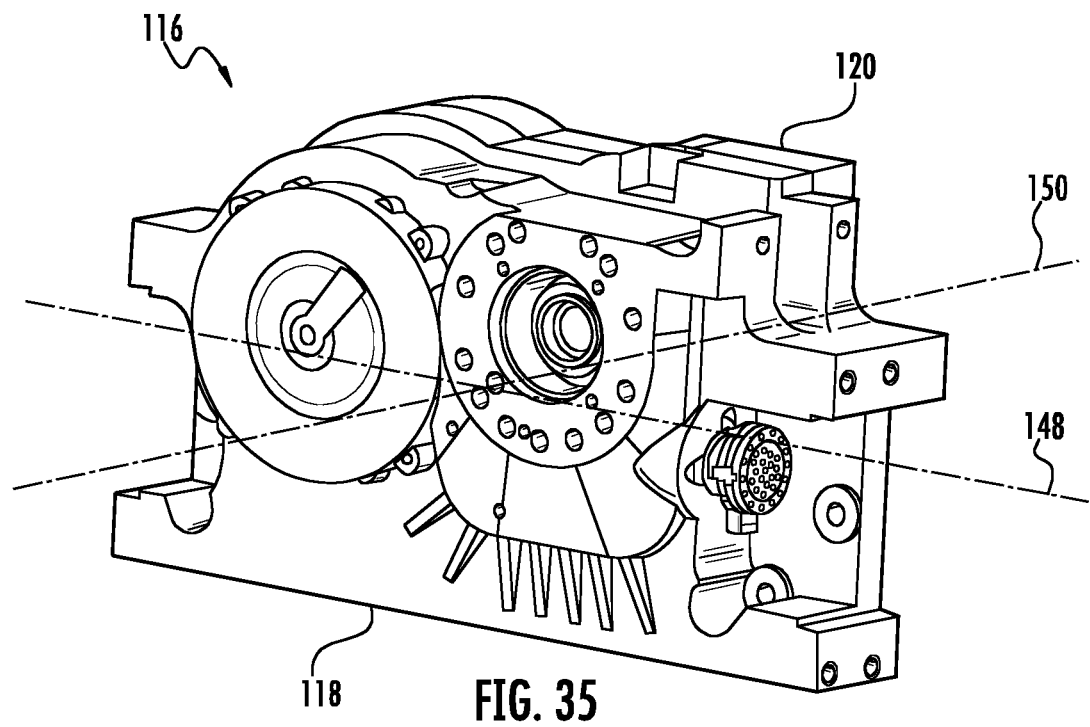
FIGS. 35 and 36 are perspective views of a gearbox that may be used with the axle assembly shown in FIGS. 5-8, according to embodiments of the present disclosure.
Figure 36:
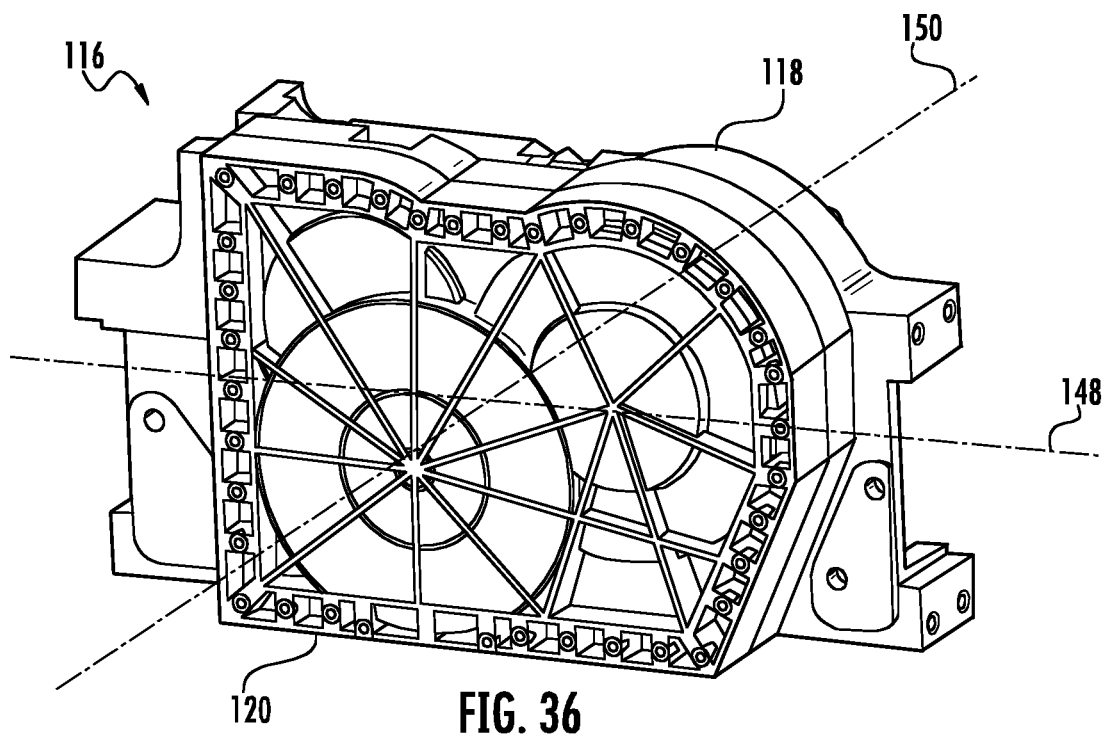

Referring to FIGS. 23 and 24, of the illustrated embodiment, the forward member 140 includes a top surface 168 and a bottom surface 170, and includes a height 172 measured between the top surface 168 and the bottom surface 170 along a vertical axis 174. The mounting member 160 includes a bottom surface 176 and a top surface 178 and the planar mounting surface 166 extending between the bottom surface 176 and the top surface 178. The planar mounting surface 166 includes a height 180 measured between the top surface 178 and the bottom surface 176 of the mounting member 160 along the vertical axis 174. The bottom surface 176 of the mounting member 160 is substantially flush with the bottom surface 170 of the forward member 140. The top surface 178 of the mounting member 160 is spaced a vertical distance from the top surface 168 of the forward member 140 such that the height 180 of the mounting surface 166 is greater than the height 172 of the forward member 140. A plurality of fastener openings 173 extending through the planar mounting surface 166 of the mounting member 160. Each fastener opening 173 is sized and shaped to receive a fastener such as, for example, a bolt to couple the cradle frame 124 to the gearbox housing 118.

In addition, the support arm 162 includes an arcuate top surface 182 that extends between the top surface 178 of the mounting member 160 and the top surface 168 of the forward member 140. The support arm 162 also includes an arcuate outer surface 184 and an arcuate inner surface 186. The arcuate inner surface 186 defines a gap 188 between the mounting member 160 and a side member outer surface 164 of the corresponding side members 144, 146. The gap 188 is sized and shaped to receive a portion of the gearbox housing 118 therein to facilitate coupling the cradle frame 124 to the gearbox housing 118.

Figure 16:
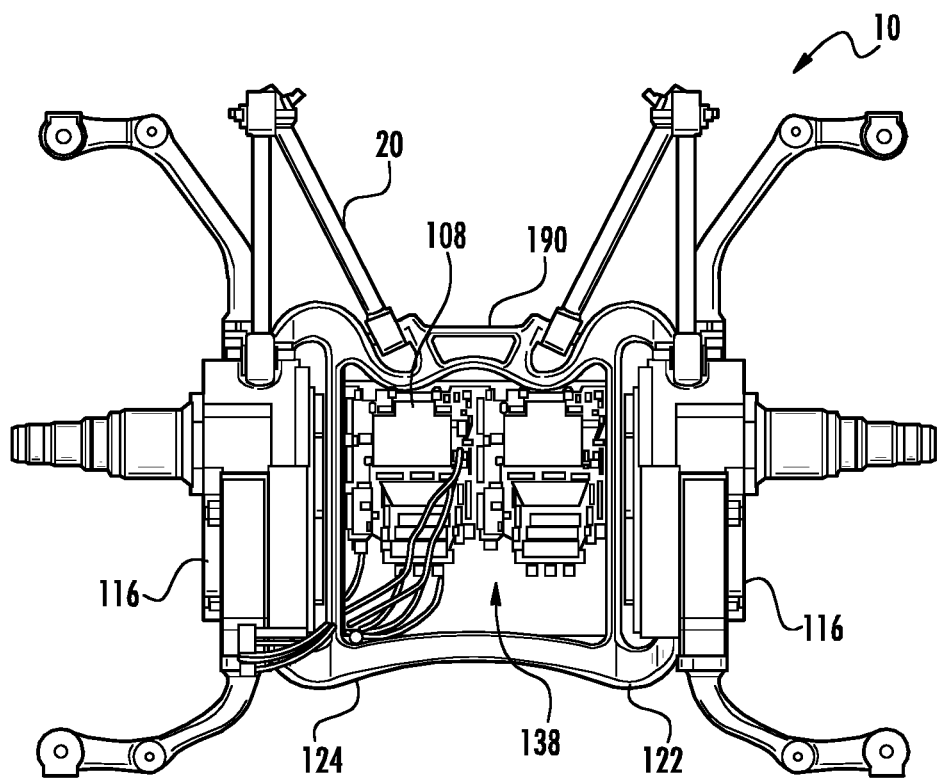
FIG. 16 is a top view of the axle assembly shown in FIG. 15.
Figure 17:
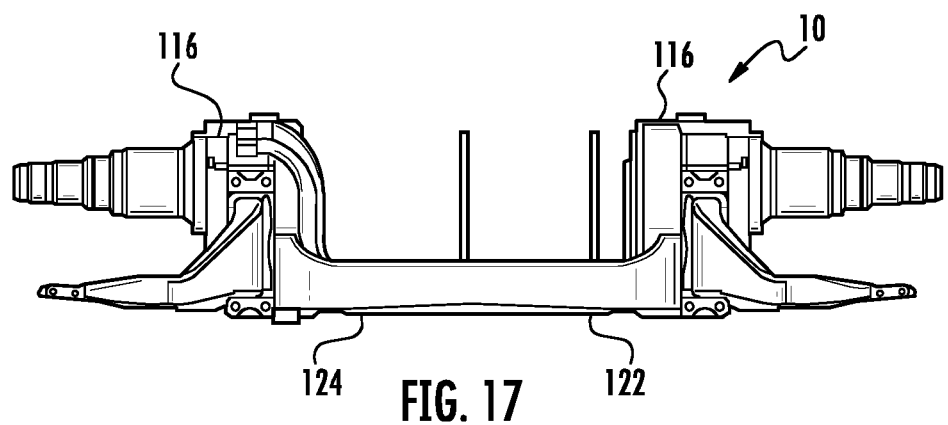
FIG. 17 is an elevation view of a rear portion of the axle assembly shown in FIG. 15.
Figure 18:
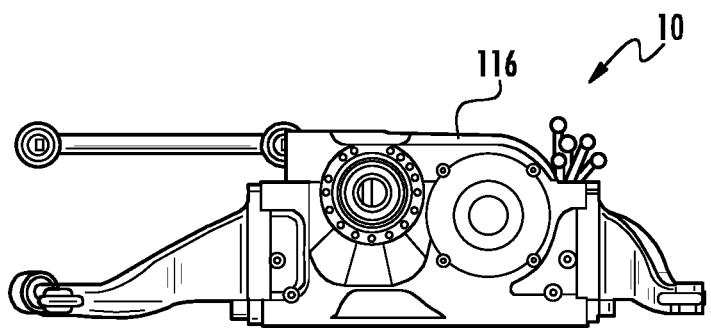
FIG. 18 is an elevation view of a left side of the axle assembly shown in FIG. 15.
Figure 19:
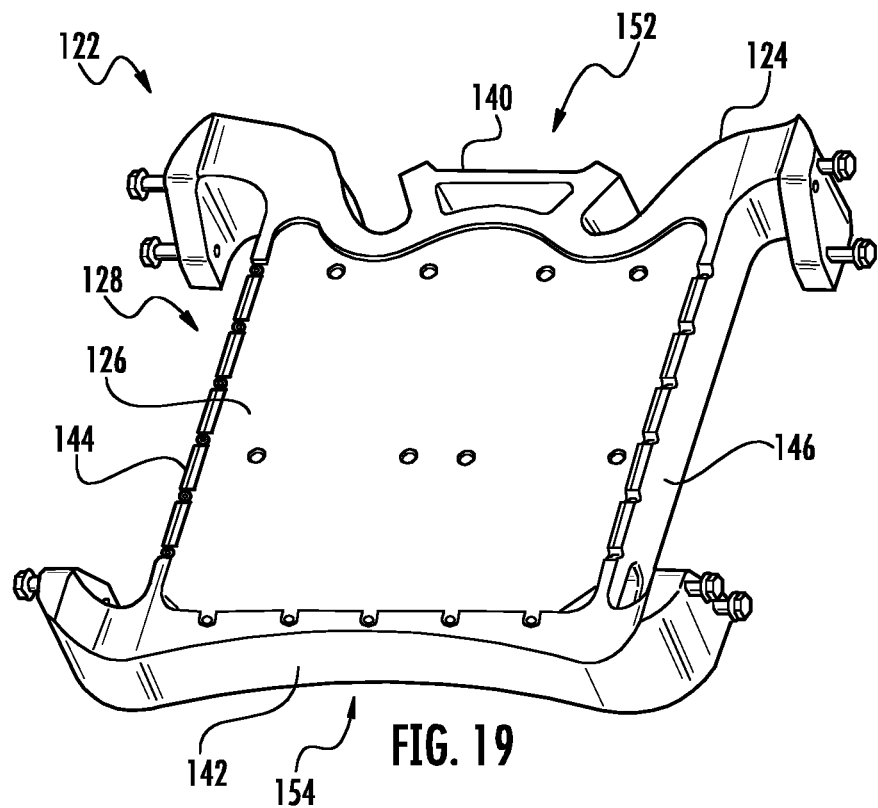
FIGS. 19 and 20 are perspective views of a cradle assembly that may be used with the axle assembly shown in FIGS. 5-8, according to embodiments of the present disclosure.
Figure 20:
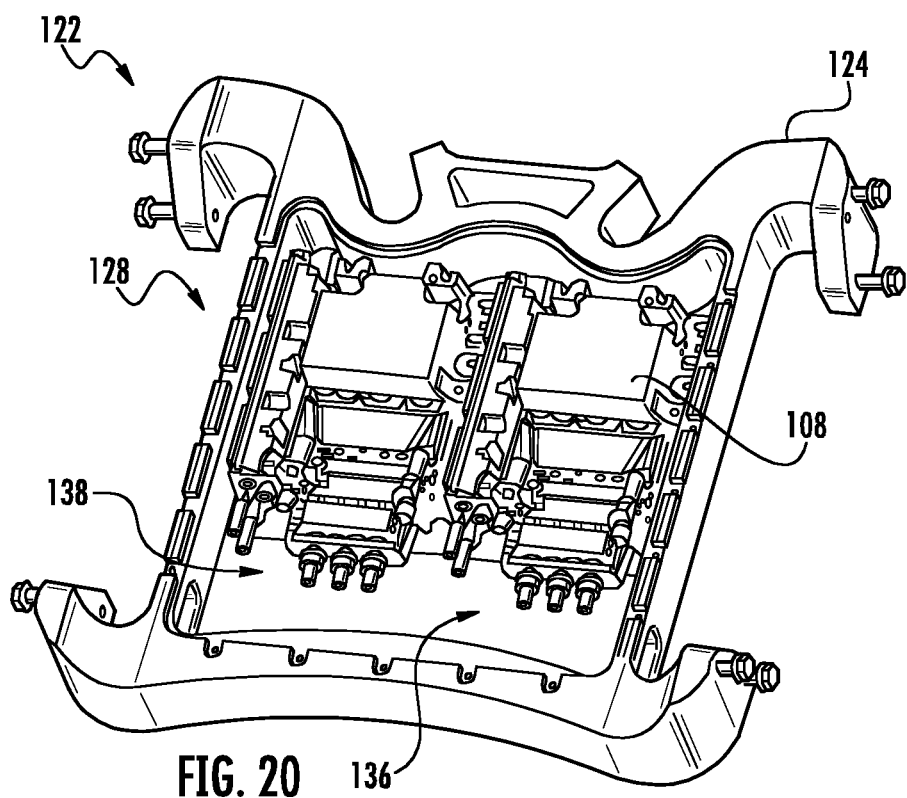
Figure 21:
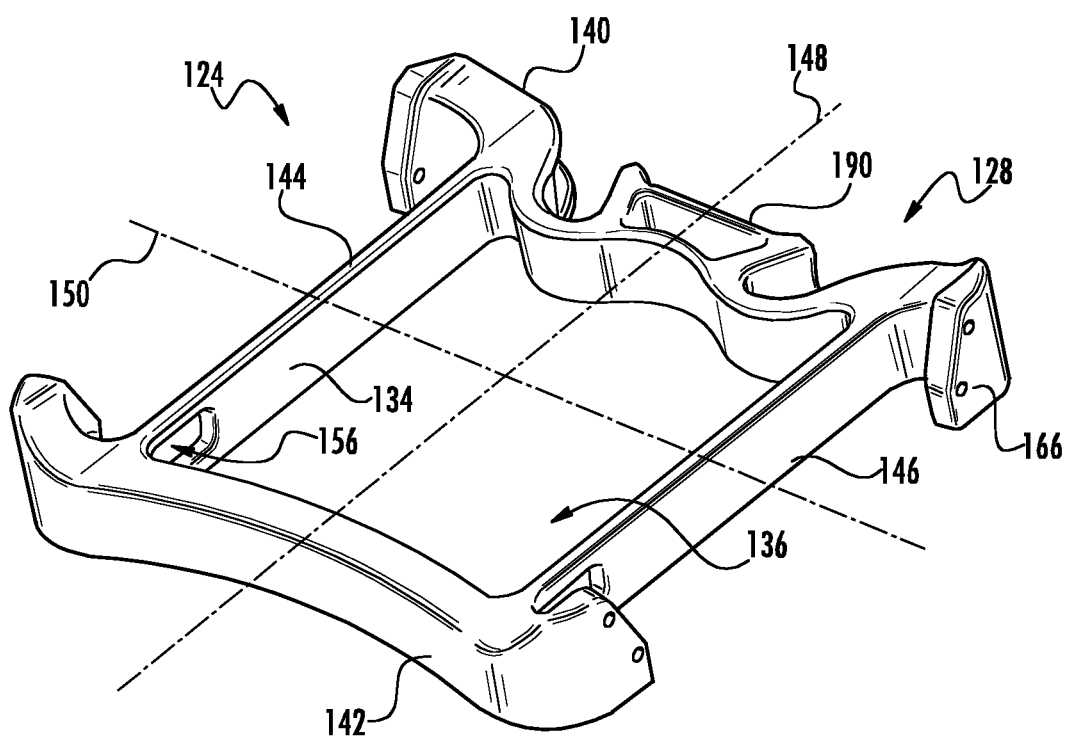
FIGS. 21 and 22 are perspective views of a portion of the cradle assembly shown in FIGS. 19 and 20.
Figure 22:
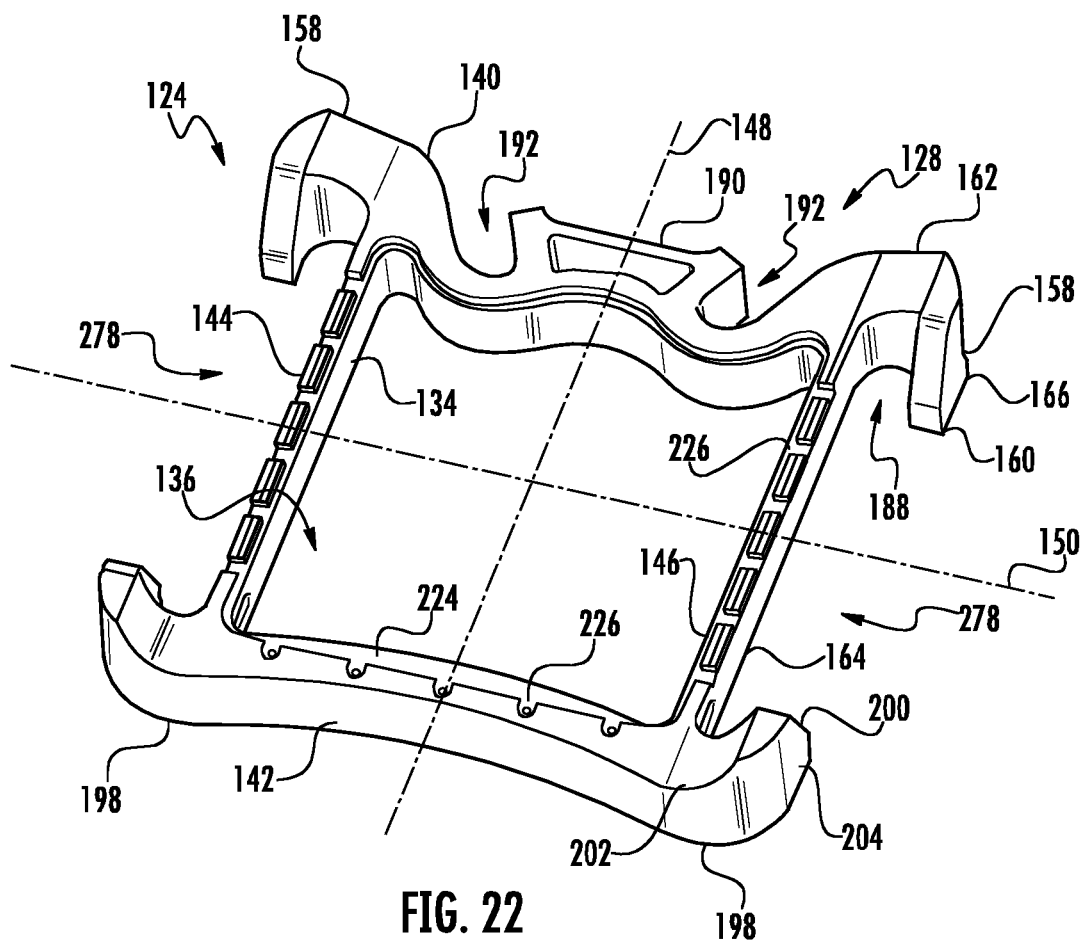

Referring to FIGS. 12-26 and 63-70, of the illustrated embodiment, the forward member 140 also includes a suspension arm support assembly 190 that extends outwardly from the outer surface of the forward member 140. The outer surface of the forward member 140 includes an arcuate shape that defines a pair of slots 192 between opposing ends of the suspension arm support assembly 190 and the forward member outer surface. Each slot 192 is sized and shaped to receive an end of a suspension control arm 20, and a mounting surface 194 is defined at each end of the suspension support arm assembly 190 to facilitate coupling the suspension control arm 20 to the suspension arm support assembly 190, as shown in FIG. 16. The forward member outer surface includes recessed portions 196 that are positioned with respect to at each end of the suspension support arm assembly 190. Each recessed portion 196 is sized and shaped to receive an end of a suspension arm 20 such that each suspension arm 20 extends outwardly from the forward member 140 at an oblique angle.

In the illustrated embodiment, a pair of rear mounting flanges 198 extend outwardly from opposite ends of the rear member 142. Each rear mounting flange 198 includes a rear mounting member 200 and a rear support arm 202 that is coupled between the rear mounting member 200 and the rear member 142. The rear mounting member 200 is spaced a distance outwardly from the corresponding side member outer surface 164 as measured along the transverse axis 150. The rear mounting member 200 also includes a rear planar mounting surface 204 that is configured to engage an outer surface of a corresponding gearbox housing 118, and is orientated substantially parallel to the side member outer surface 164 and the planar mounting surface 166 of the forward mounting member 160.

In the illustrated embodiment, the planar mounting surface 166 of the forward mounting member 160 and the rear planar mounting surface 204 that are positioned on the same side of the cradle frame 124 are orientated within the same plane to facilitate coupling the cradle assembly 122 to the corresponding gearbox housing 118, as shown in FIGS. 23 and 24. In addition, the rear planar mounting surface 204 includes a height 206 measured along the vertical axis 174 that is substantially similar to the height of the corresponding planar mounting surface 166 of the forward mounting member 160. In one embodiment, the forward mounting member 160 includes a length 302 (shown in FIGS. 63-70) defined along the longitudinal axis 148, and the rear mounting member 200 includes a length 304 defined along the longitudinal axis 148 that is longer than the length 302 of the forward mounting member 160.

Each rear mounting member 200 includes a plurality of fastener openings extending through the rear planar mounting surface 204 that are sized and shaped to receive a fastener such as, for example, a bolt to couple the cradle frame 124 to the gearbox housing 118. Similar to the forward mounting member 160, each rear support arm 202 includes an arcuate top surface that extends between a top surface of the rear mounting member 200 and a top surface of the rear member 142. The rear support arm 202 also includes an arcuate outer surface and an arcuate inner surface. The arcuate inner surface of the rear support arm 202 defines a gap 208 between the rear mounting member 200 and the corresponding side member outer surface 164 that sized and shaped to receive a portion of the gearbox housing 118 therein.

Referring to FIGS. 27-34, of the illustrated embodiment the top cover 126 and the bottom cover 130 each include a plate 210 that includes an outer surface 212 and an inner surface 214 that extend between extend between a front endwall 216 and a rear endwall 218 along the longitudinal axis 148, and between opposing side endwalls 220 along the transverse axis 150. Each front endwall 216 includes an arcuate shape that matches the arcuate shape of the inner surface of the forward member 140. The top cover 126 and the bottom cover 130 each include a plurality of fastening tabs 222 extend outwardly from the side endwalls 220 and the rear endwall 218. Each fastening tab 222 includes an opening extending therethrough that is sized and shaped to receive fastener to facilitate coupling the top cover 126 to the cradle frame 124.

The top portion 128 of the cradle frame 124 includes a top groove 224 that is defined along a perimeter of the cavity 136 adjacent the cradle inner surface 134 that is sized and shaped to receive a portion of an outer edge of the top cover 126 such that the outer surface 212 of the top cover 126 is positioned substantially flush with the top surface of the forward member 140, rear member 142, and side members 144, 146 of the cradle frame 124. A plurality of positioning slots 226 are defined along the top surfaces of the rear member 142 and side members 144, 146. Each positioning slot 226 is sized and shaped to receive a corresponding fastening tab 222 therein. The top surfaces of the rear member 142 and side members 144, 146 include an opening defined within each positioning slot 226 to receive a fastener therein to facilitate coupling the top cover 126 to the cradle frame 124.

Similarly, the bottom portion 132 of the cradle frame 124 includes a bottom groove 228 that is defined along a perimeter of the cavity 136 adjacent the cradle inner surface 134 that is sized and shaped to receive a portion of an outer edge of the bottom cover 130 such that the outer surface 212 of the bottom cover 130 is positioned substantially flush with the bottom surface of the forward member 140, rear member 142, and side members 114, 146 of the cradle frame 124. A plurality of positioning slots 230 are defined along the bottom surfaces of the rear member 142 and side members 144, 146 for receiving a corresponding fastening tab 222 therein. An opening is defined within each positioning slot 230 to receive a fastener therein to facilitate coupling the bottom cover 130 to the cradle frame 124.

The top cover 126 also includes a plurality of openings 232 extending through the plate 210 and are sized and shaped to receive fasteners therethrough to facilitate mounting the electrical inverter devices 108 within the cradle chamber 138.

Referring to FIGS. 35-47 and 71-78, of the illustrated embodiment, the gearbox 116 includes the gearbox housing 118 and the gearbox cover 120. The gearbox housing 118 includes a body 234 having an inner surface 236 and an outer surface 238. The inner surface 236 defines a gearbox cavity 240 that is sized and shaped to receive the drive unit 26 therein. The outer surface 238 extends between a front-side portion 242 and a back-side portion 244 along the transverse axis 150, and between a forward portion 246 and a rear portion 248 along the longitudinal axis 148.

Figure 37:
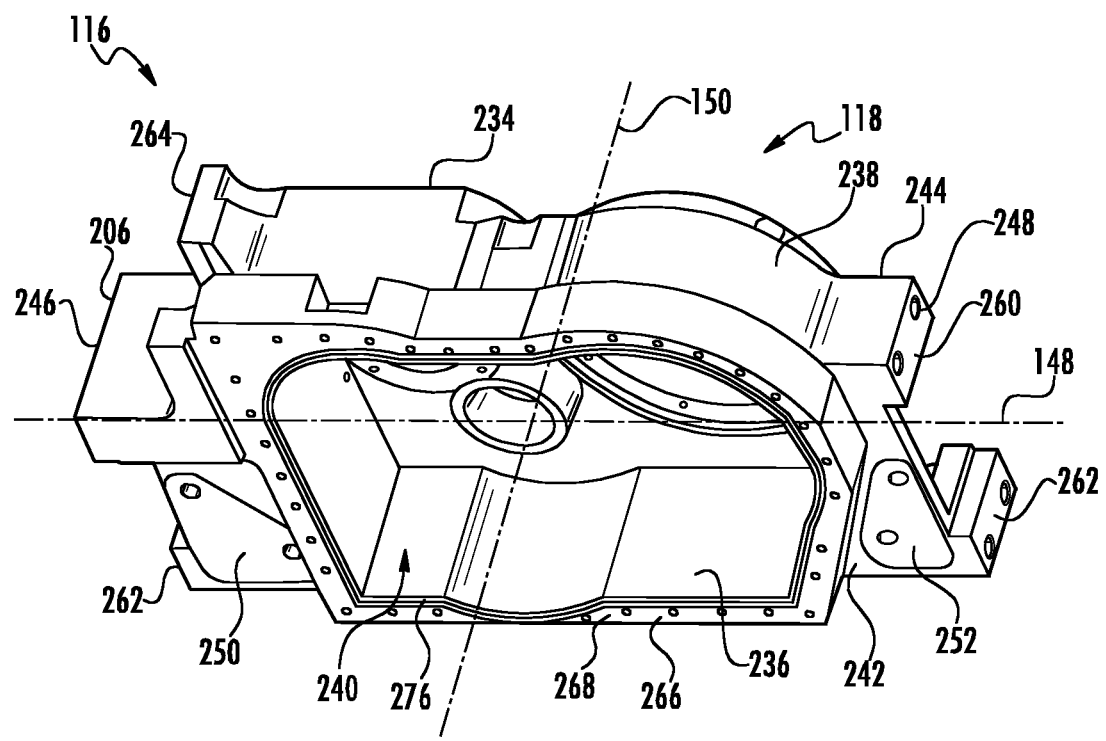
FIG. 37 is a perspective view of a gearbox housing that may be used with the gearbox shown in FIGS. 35 and 36.

The front-side portion 242 of the gearbox housing 118 includes a first mounting surface 250 positioned adjacent to the forward portion 246 and a second mounting surface 252 positioned adjacent to the rear portion 248, as shown in FIG. 37. The first mounting surface 250 is substantially planar that is compatible with the planar mounting surface 166 of the forward mounting flange 158. The second mounting surface 252 is substantially planar that is compatible with the planar mounting surface of the rear mounting flange 204. The first mounting surface 250 and the second mounting surface 252 each include a plurality of fastener openings extending through the gearbox housing 118 and are sized and shaped to receive corresponding fasteners to facilitate coupling the gearbox housing 118 to the cradle frame 124. In the illustrated embodiment, the forward mounting flange 158 is adapted to be coupled to the gearbox housing 118 at the first mounting surface 250 adjacent to the forward portion 246, and the rear mounting flange 198 is adapted to be coupled to the gearbox housing 118 at the second mounting flange 252 adjacent to the rear portion 248.

Figure 39:
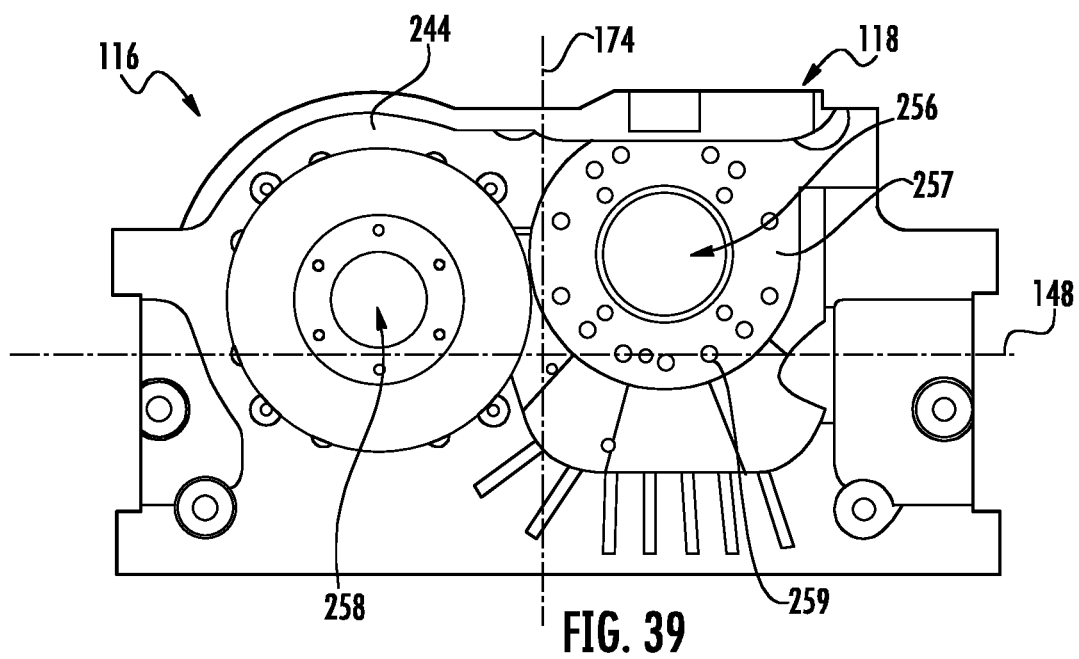
FIG. 39 is an elevation view of a back-side portion of the gearbox housing shown in FIG. 37.
Figure 40:
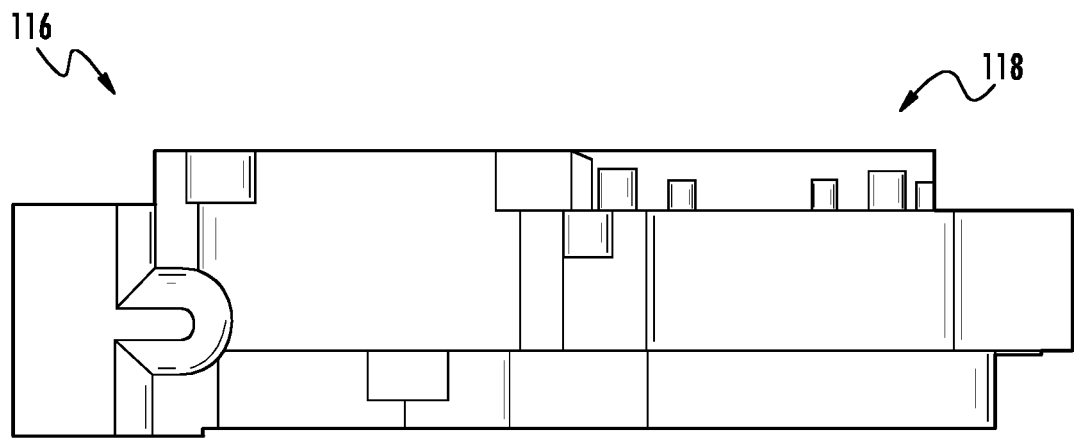
FIG. 40 is a top view of the gearbox housing shown in FIG. 37.
Figure 41:
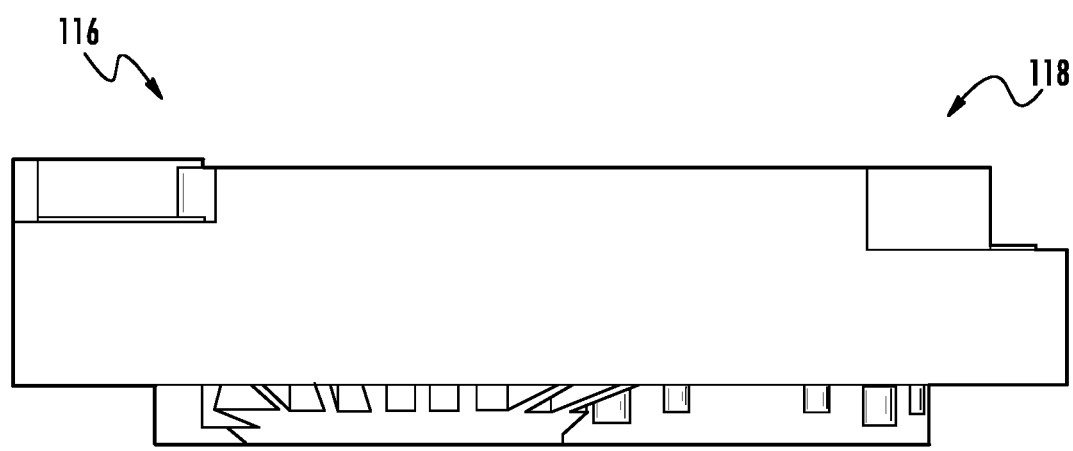
FIG. 41 is a bottom view of the gearbox housing shown in FIG. 37.
Figure 44:
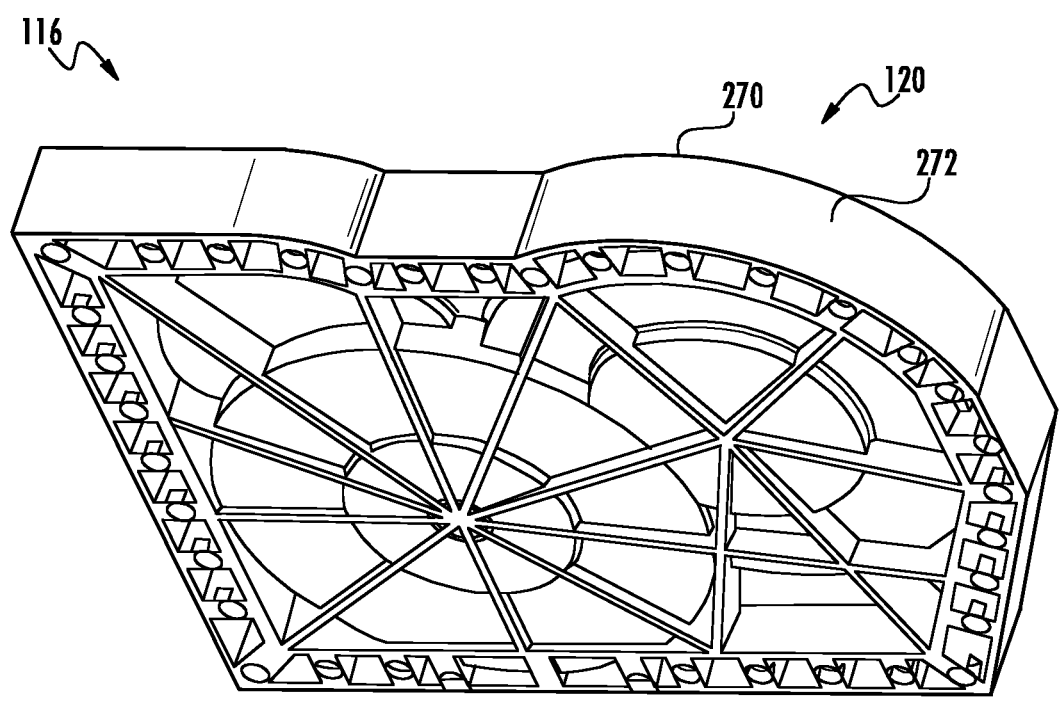
FIG. 44 is a perspective view of a gearbox cover that may be used with the gearbox shown in FIGS. 35 and 36.
Figure 45:
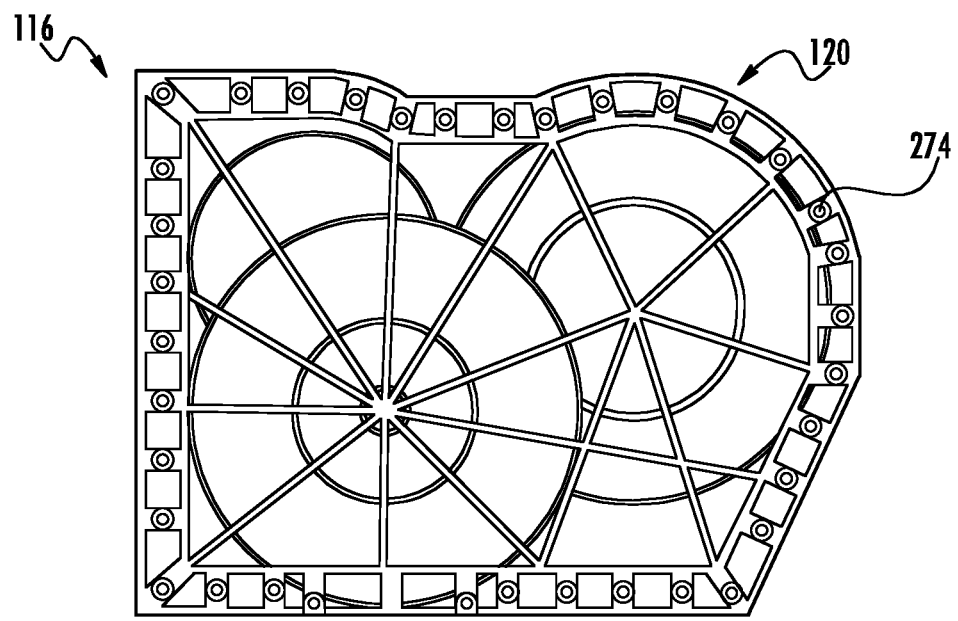
FIG. 45 is a top view of the gearbox cover shown in FIG. 44.
Figure 46:
FIG. 46 is a side view of the gearbox cover shown in FIG. 44.
Figure 47:
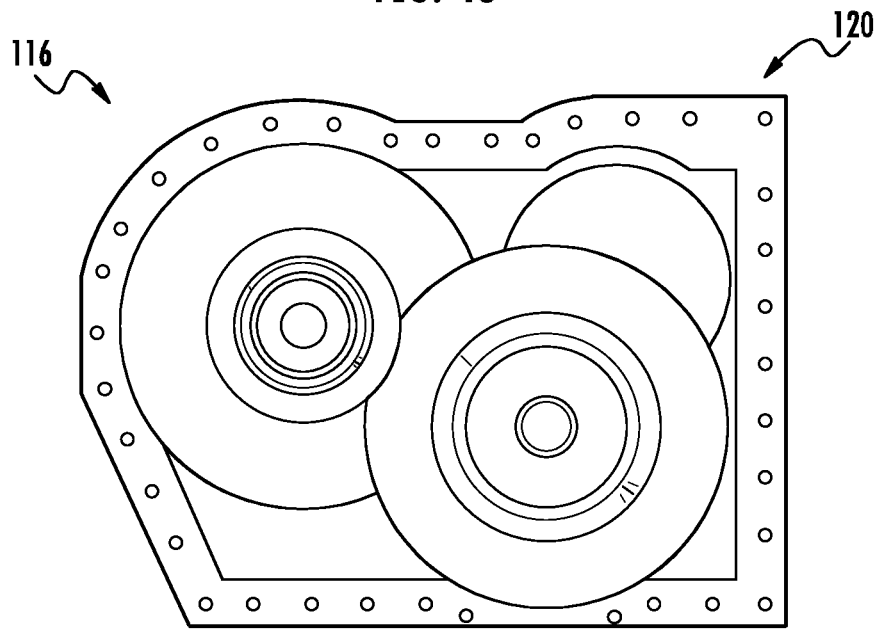
FIG. 47 is a bottom view of the gearbox cover shown in FIG. 44.

A shaft opening 256 extends through the back-side portion 244 and is sized and shaped to receive the axle shaft 36 therethrough and includes a mounting surface 257 having apertures 259, as shown in FIG. 39. Mounting surface 257 is adapted to accept axle support 38 to be secured by fasteners. A motor opening 258 also extends through the back-side portion 244 and is sized and shaped to receive a portion of the electric motor 28.

Figure 38:
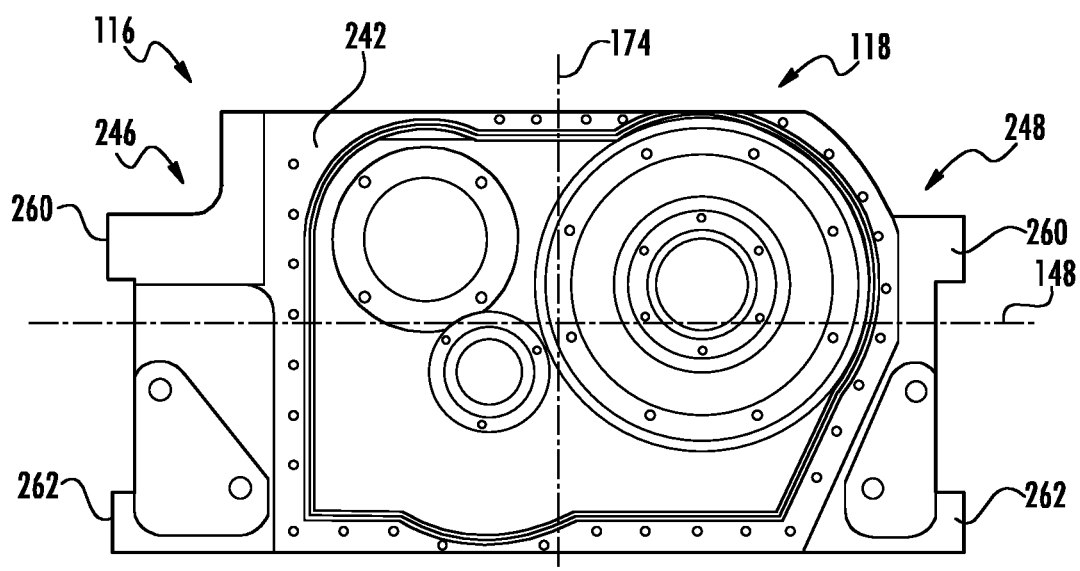
FIG. 38 is an elevation view of a front-side portion of the gearbox housing shown in FIG. 37.

In the illustrated embodiment, the forward portion 246 and the rear portion 248 by the gearbox housing 118 each includes a upper support flange 260 and a lower support flange 262 that is spaced a distance from the upper support flange 260 along the vertical axis 174, as shown in FIG. 38. The upper support flange 260 and the lower support flange 262 are configured to couple the gearbox housing 118 to a mount 18 extending outwardly from the gearbox housing 118 to facilitate coupling the axle assembly 10 to the vehicle. The forward portion 246 includes a suspension arm support flange 264 that is positioned above the upper support flange 260 along the vertical axis 174. The suspension arm support flange 264 is adapted to couple a suspension arm 20 to the gearbox housing 118 and is orientated such that the suspension control arm 20 extends outwardly from the gearbox housing 118 substantially parallel to the longitudinal axis 148.

The front-side portion 242 of the gearbox housing 118 also includes a mounting shoulder 266 extending outwardly from an outer surface of the front-side portion 242. The mounting shoulder 266 extends around a perimeter of the opening and includes a planar front surface 268. A plurality of holes are defined along the front surface 268 for receiving corresponding fasteners therein to facilitate coupling the gearbox cover 120 to the gearbox housing 118.

The gearbox cover 120 includes a body 270 including an outer surface 272 having a shape that substantially matches the shape of the mounting shoulder 266. The gearbox cover 120 includes a plurality of openings 274 extending around a perimeter of the body 270 that are sized and shaped to received fasteners therethrough to facilitate coupling the gearbox cover 120 to the gearbox housing 118. The gearbox cover 120 is adapted to be coupled to the gearbox housing 118 to enclose the drive unit within the gearbox cavity 240. The mounting shoulder 266 includes a positioning groove 276 defined along the front surface 268. The gearbox cover 120 includes a positioning lip that extends outwardly from a surface of the gearbox cover 120 and is configured to engage the positioning groove 276 to facilitate coupling the gearbox cover 120 to the gearbox housing 118.

In the illustrated embodiment, the mounting shoulder 266 extends outwardly a distance from the front-side portion 242 along the transverse axis 150 such that the gearbox cover 120 is positioned within a gap 278 defined between the forward mounting flange 158 and the corresponding rear mounting flange 198 when the gearbox 116 is mounted to the cradle frame 124.

In one embodiment, the axle assembly 10 may include a 700 mm walk through ultra-low floor (ULF) with a 275/70r22.5 Tire, 2 speed: –11.1:1; 19.6:1, Axle Weight Rating of 11,600 kg, and 750,000 mile capable. The axle assembly 10 may also include a 1,000 mm walk through ULF with 445/45r22.5 Tire, 2 speed: 11.1:1; 19.6:1, Axle Weight Rating of 10,500 kg, and 750,000 mile capable. The axle assembly 10 may also include a 580 mm walk through ULF with 305/70r22.5 Tire, 2 speed: 11.1:1; 19.6:1, Axle Weight Rating of 12,600 kg, and 750,000 mile capable. The axle assembly 10 may also include a 700 mm walk through ULF, One Speed, 275/70r22.5 Tire, 1 speed: 15:1, Axle Weight Rating of 11,600 kg, and 750,000 mile capable. The axle assembly 10 may also include a 1,000 mm walk through ULF, One Speed with 275/70r22.5 Tire, 1 speed: 15:1, Axle Weight Rating of 10,500 kg, 750,000 mile capable. The axle assembly 10 may also include a 580 mm walk through ULF, One Speed with 305/70r22.5 Tire, 1 speed: 15:1, Axle Weight Rating of 12,600 kg, and 750,000 mile capable.

Referring to FIGS. 79-83, in another embodiment, the axle assembly 10 utilizes a single electric motor 28 to drive all of the wheels 22 coupled to the axle assembly 10. The axle assembly 10 includes a first wheel drive unit 300 that permits the coupling of a first wheel assembly 302, and a second wheel drive unit 304 that permits the coupling of a second wheel assembly 306. The first wheel drive unit 300 and the second wheel drive unit 304 may include some or all of the components of drive unit 26. In the embodiment shown, the axle assembly 10 is a dual wheel configuration with each wheel assembly 302, 306 including a pair of wheels 22 coupled to each end of the axle assembly 10. The wheels 22 defining axis of rotation 24.

In the illustrated embodiment, the axle assembly 10 includes a portal axle 308 that is coupled between the first wheel drive unit 300 and the second wheel drive unit 304 for transferring torque generated by the first wheel drive unit 300 to the second wheel drive unit 304. The portal axle 308 extends along a centerline axis 310 and is offset from and spaced a distance 312 from the axis of rotation 24 along a vertical axis 314. The portal axle 308 extends through or about the bridge section 14 of the axle housing 12 between the opposing outer sections 16. In the illustrated embodiment, the portal axle 308 is mounted to be rotated by a first drop box 316 that is coupled to the first wheel drive unit 300. The portal axle 308 is adapted to engage a second drop box 318 that is coupled to the second drive unit 304. The first and second drop boxes 316, 318 can be of any suitable configuration with any number of gear reductions. The portal axle 308 includes a shaft rotatably supported within or about the bridge section 14 with the shaft coupled to the first drop box 316 at one end and the second drop box 318 at another end.

Figure 80:
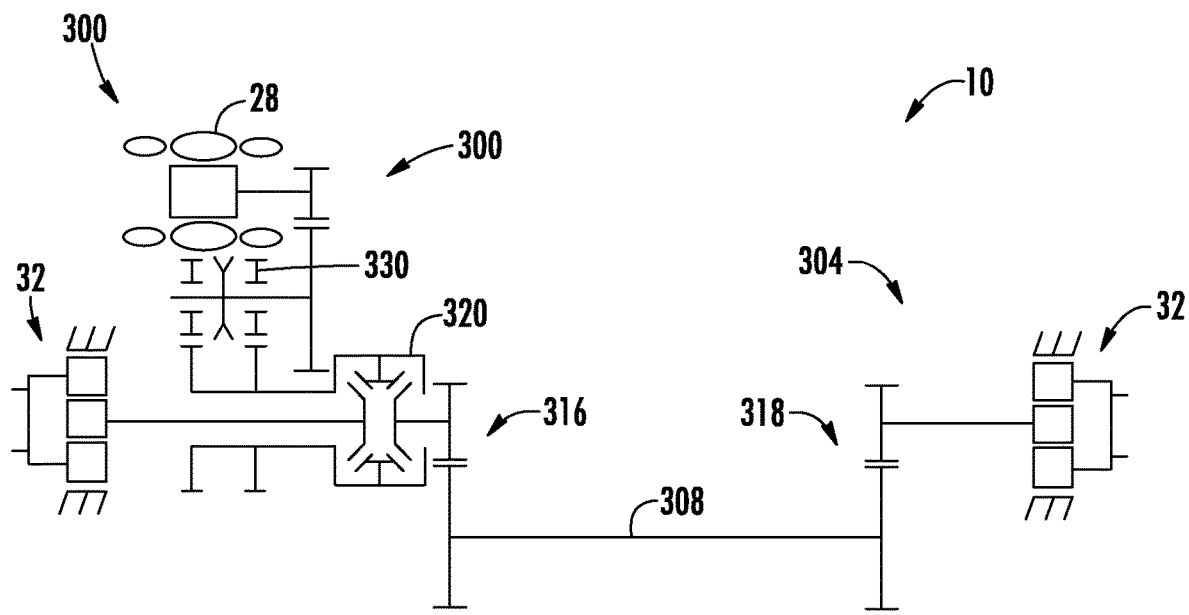
FIGS. 80-83 are schematic diagrams of the axle assembly of FIG. 79, according to embodiments of the present disclosure.
Figure 83:
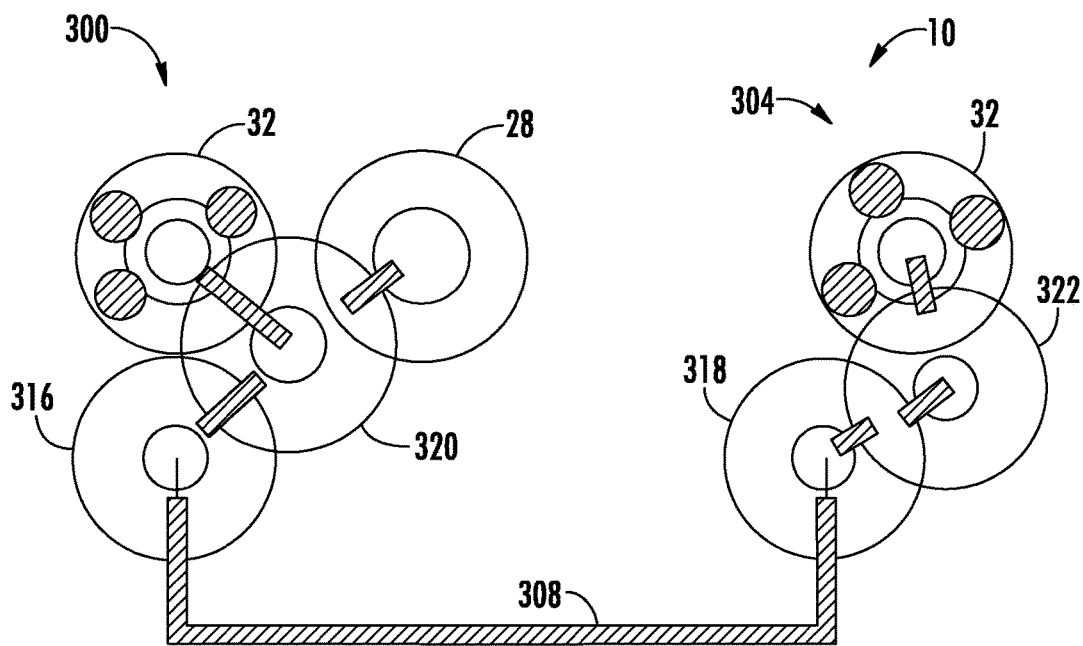
Figure 84:
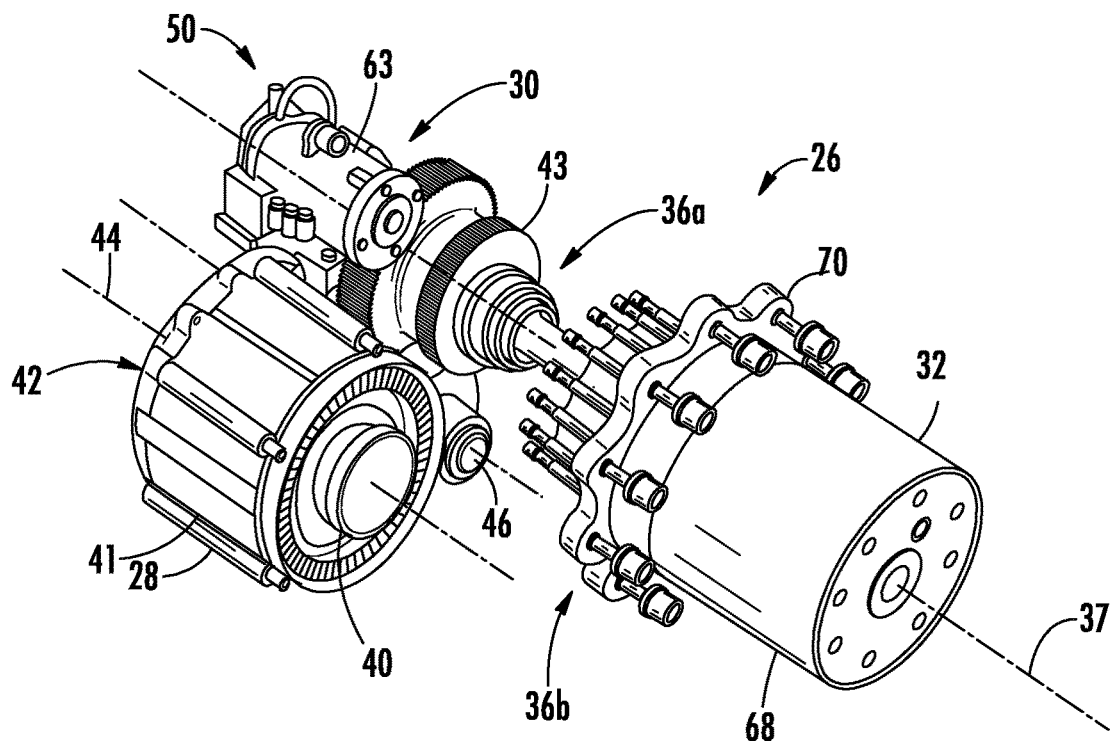
FIGS. 84-94 are perspective views of the wheel drive unit including an electric motor, a transmission and a hub assembly.
Figure 85:
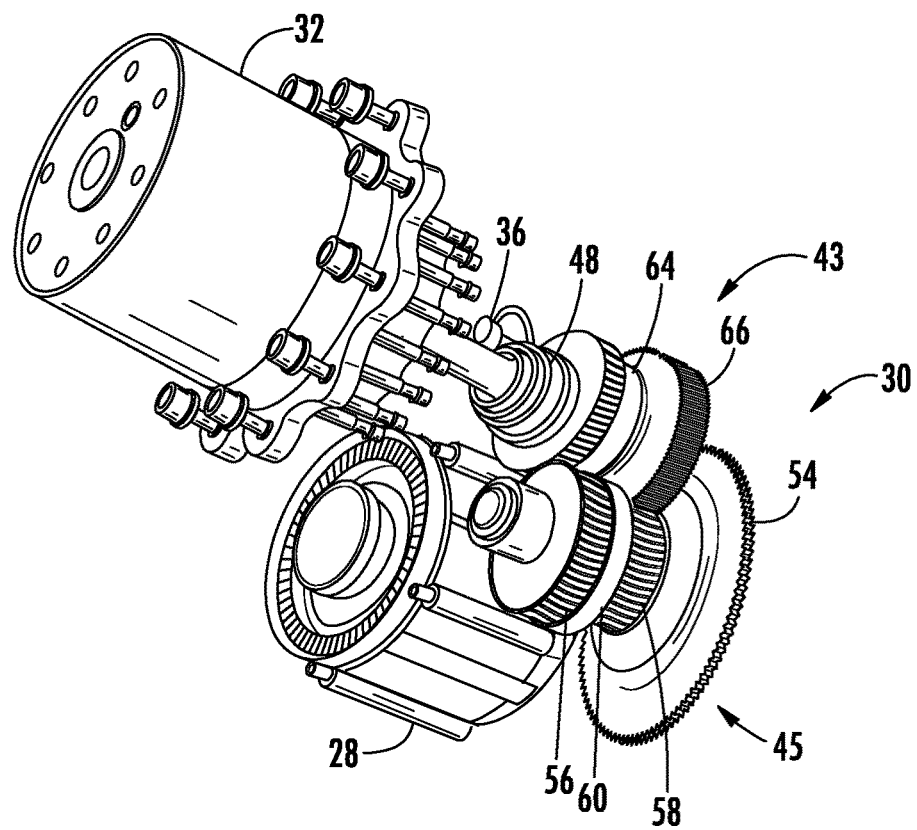
Figure 86:
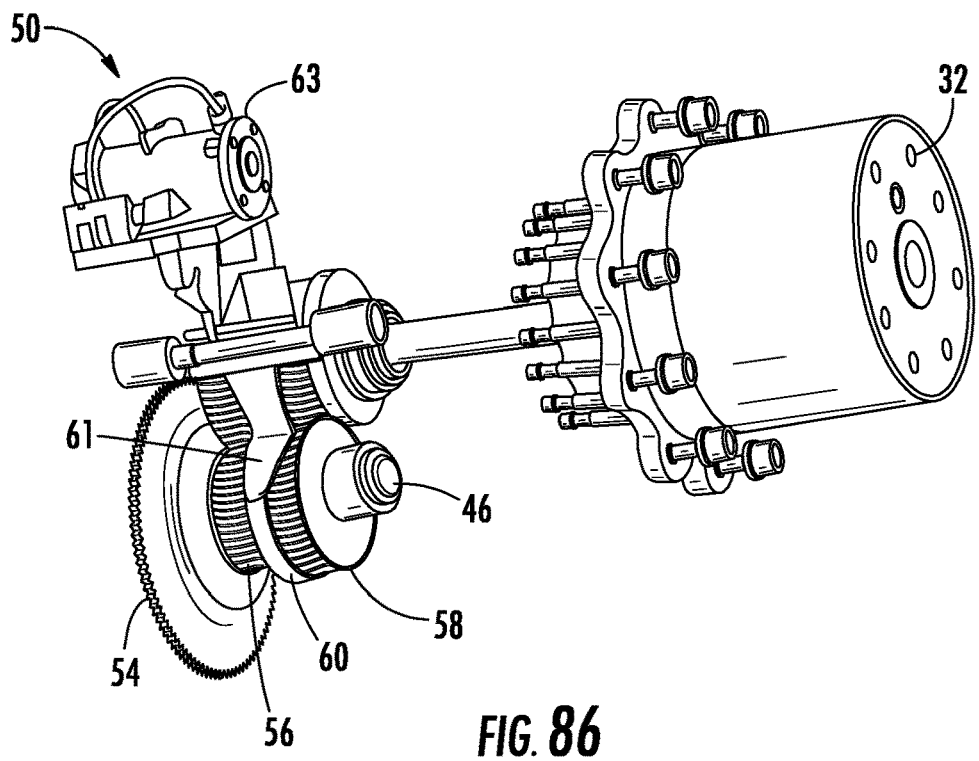
Figure 87:
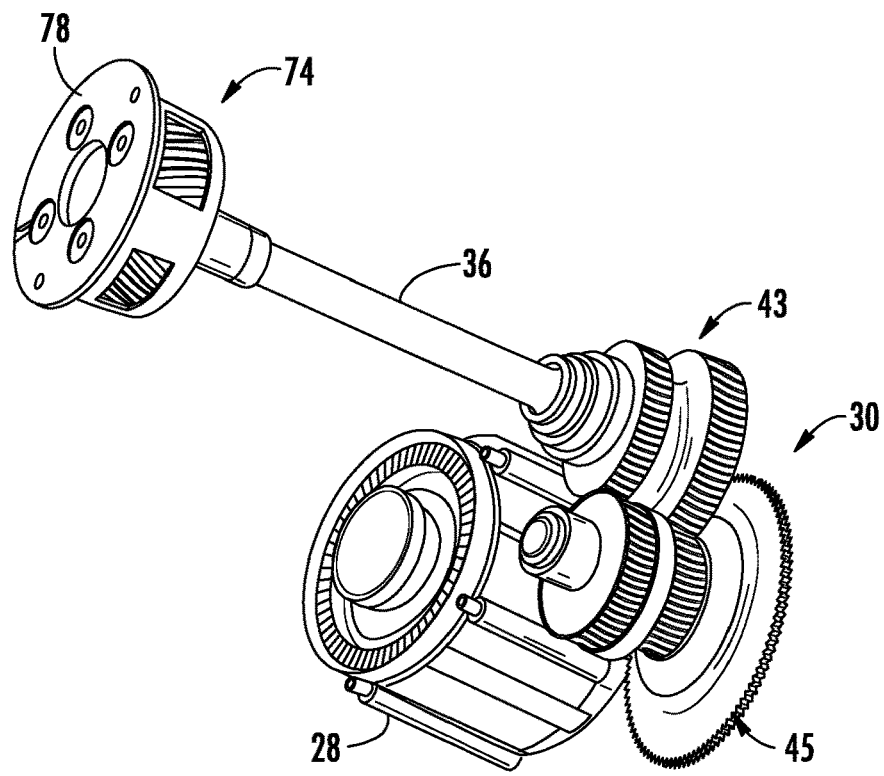
Figure 88:
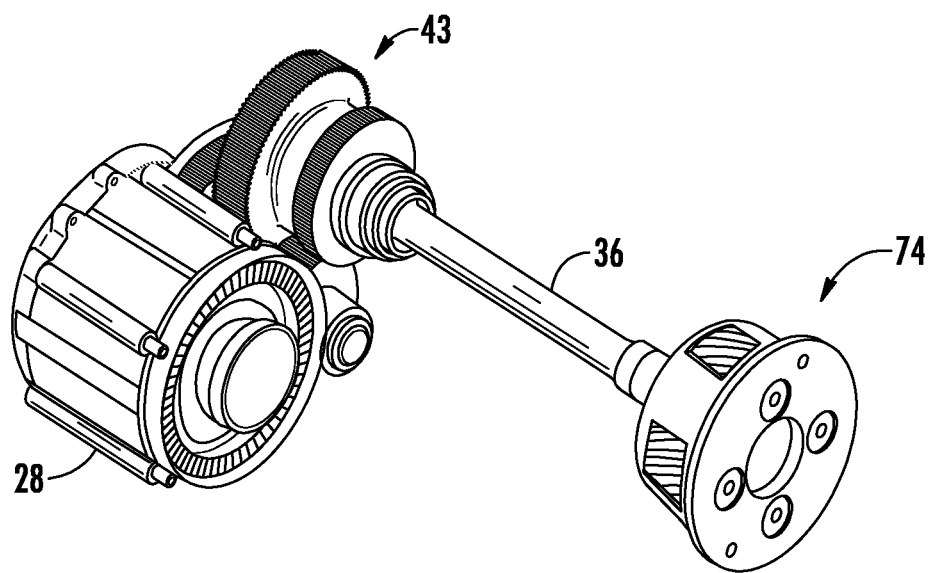
Figure 89:
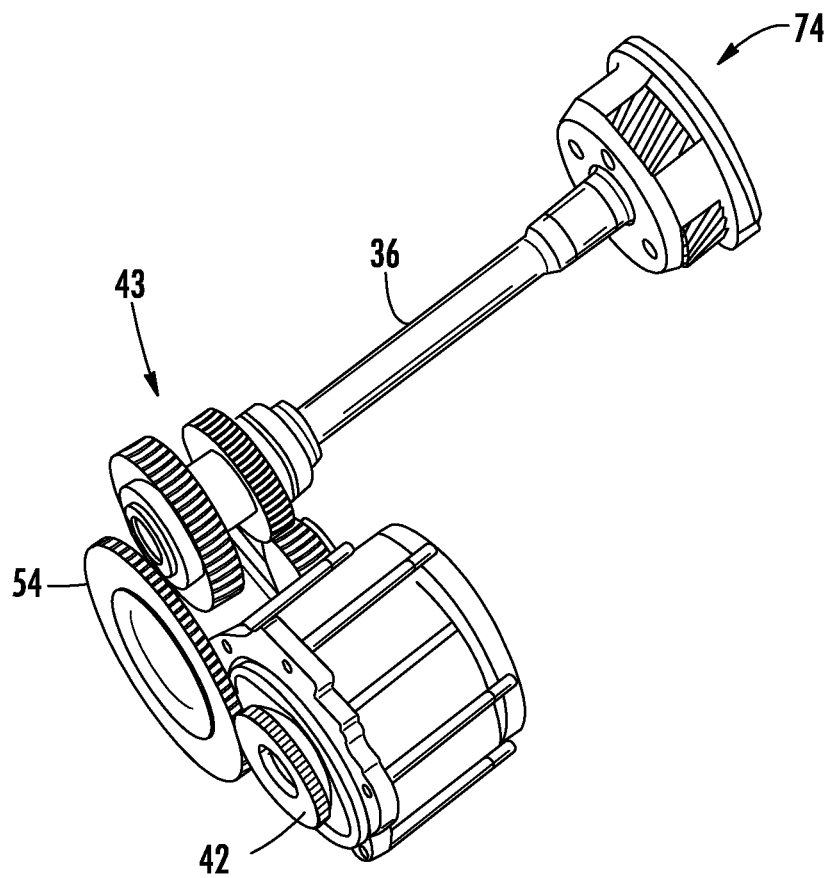
Figure 90:
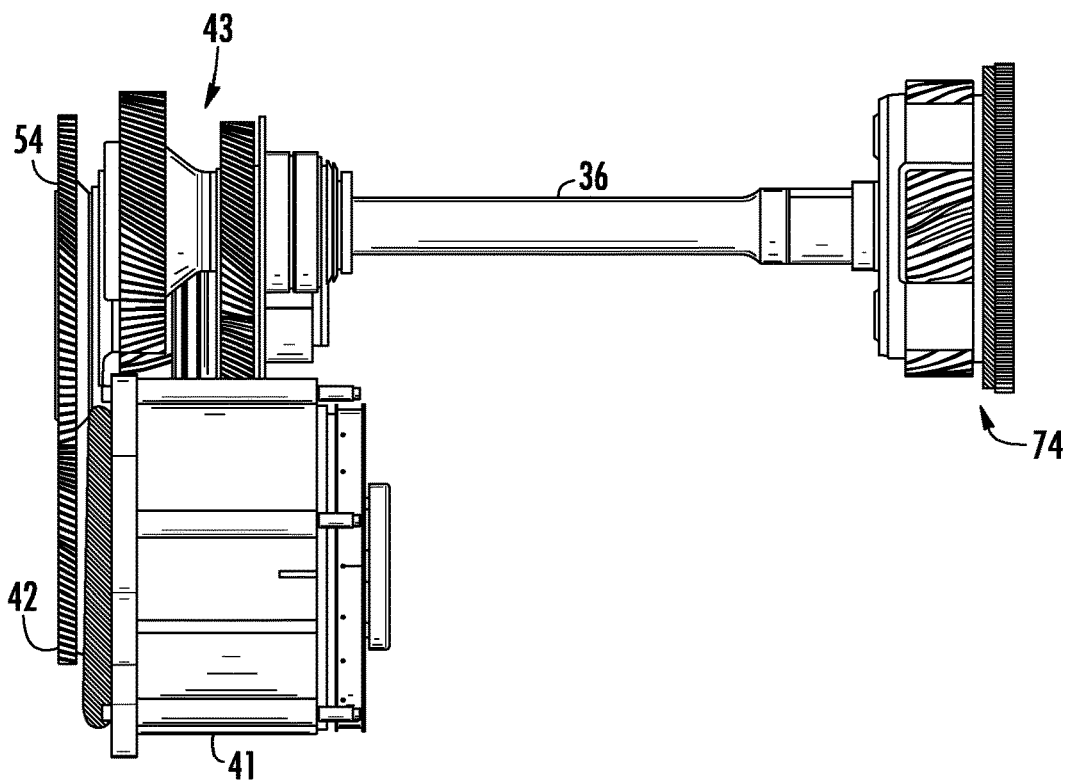
Figure 91:
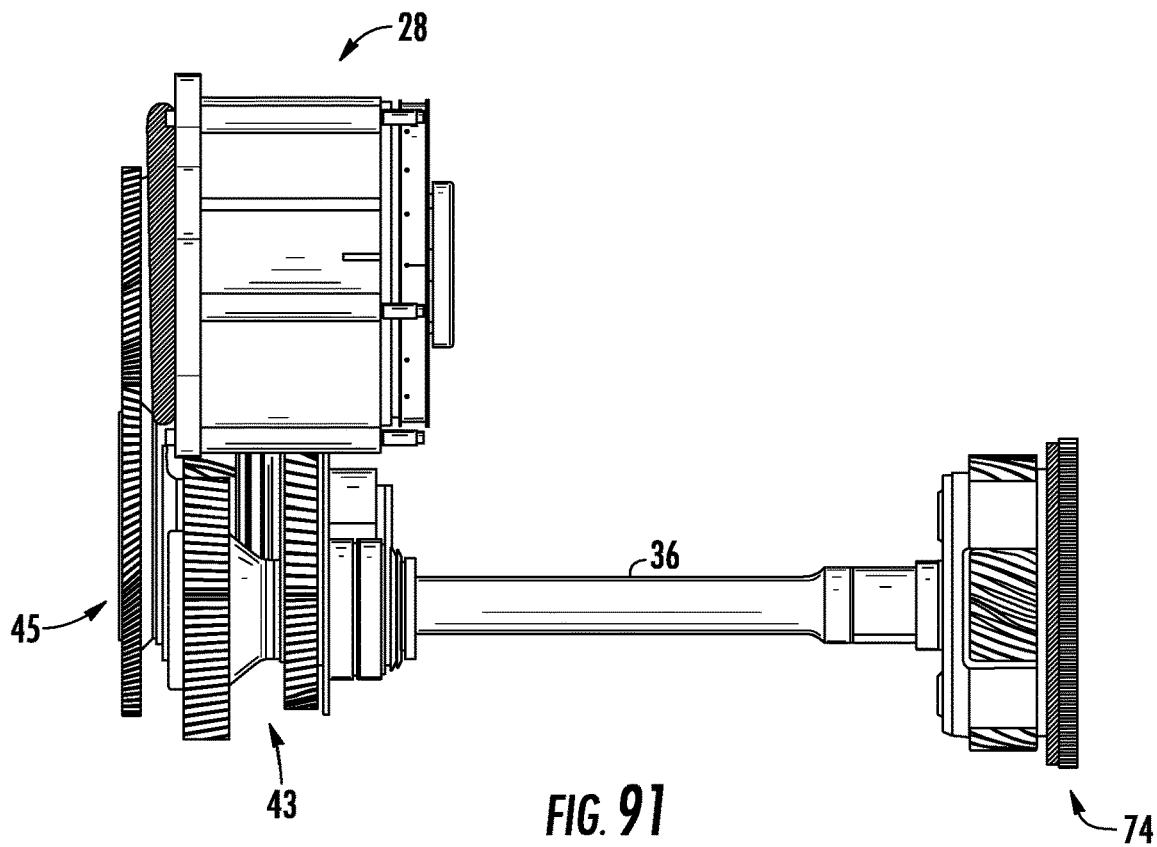
Figure 92:
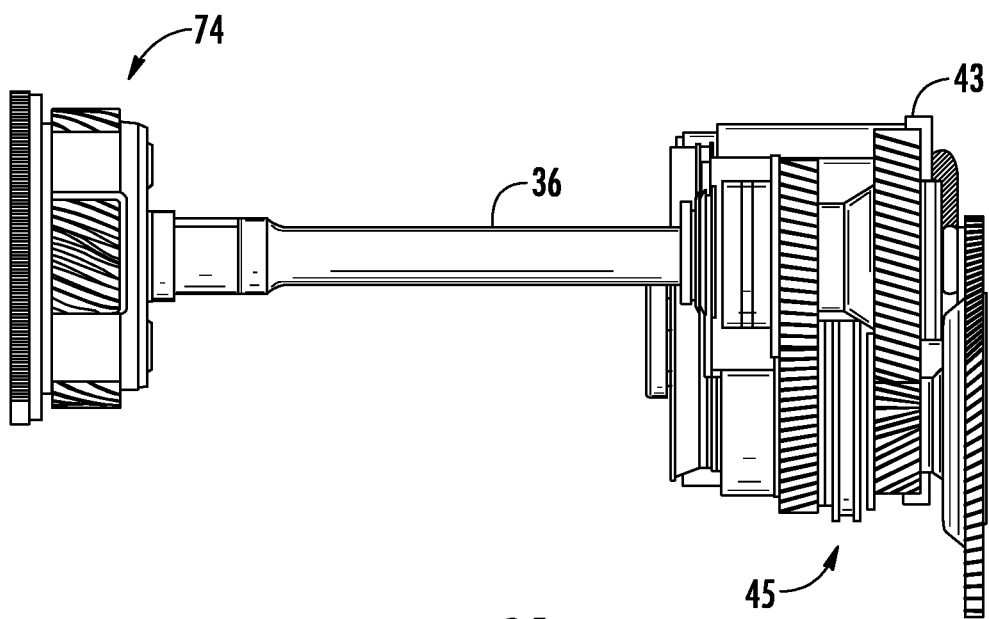
Figure 93:
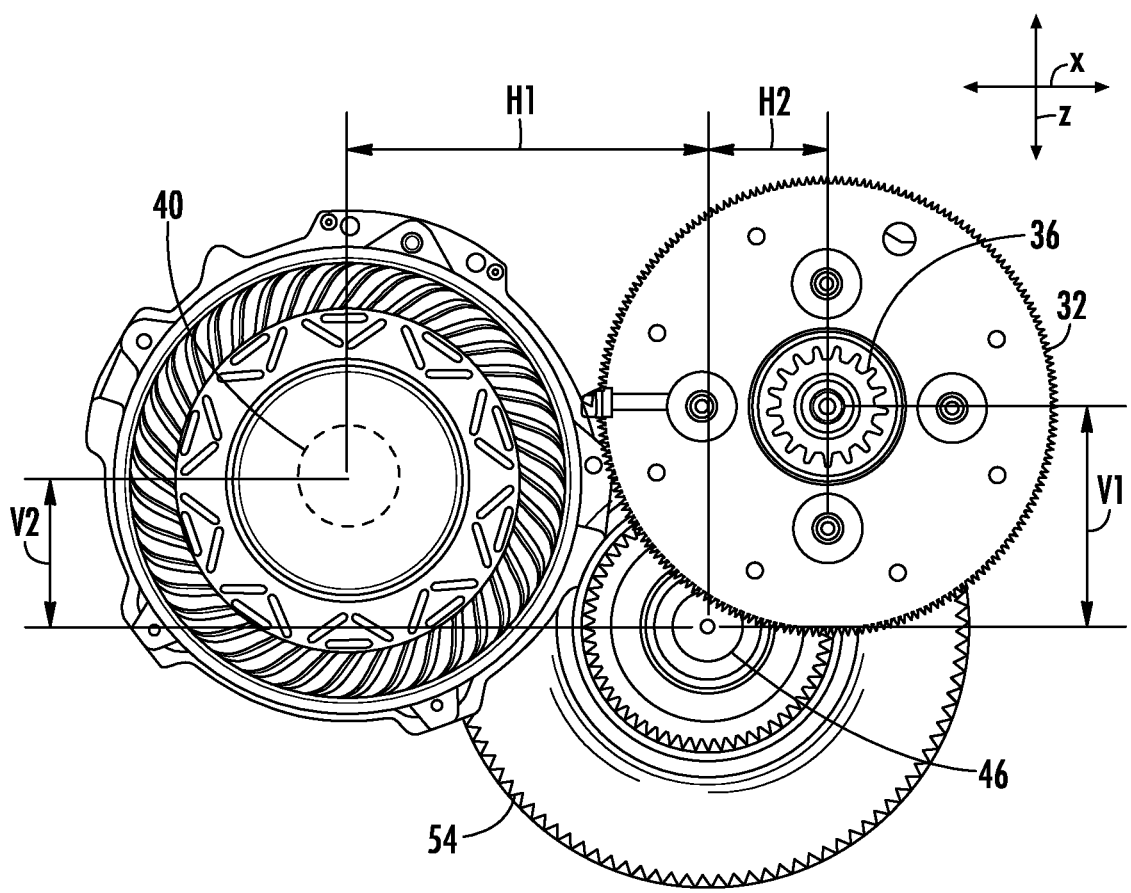
Figure 94:
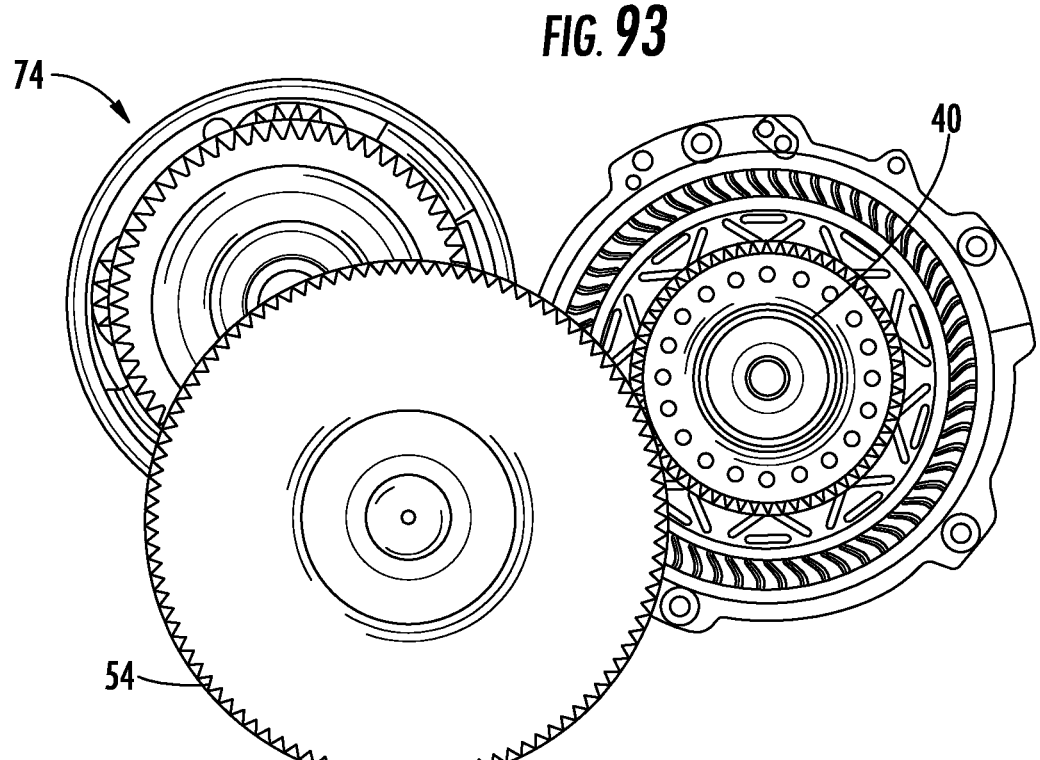

The first wheel drive unit 300 includes the electric motor 28 and a differential 320 coupled to the electric motor 28, as shown in FIG. 80. A gear reduction is provided between the electric motor 28 and the differential 320 in a similar or the same manner as discussed above relative to the drive unit 26. A transmission 330, as described above relative to the drive unit 26, may also be incorporated between the electric motor 28 and the differential 320. The differential 320 transfers torque from the electric motor 28 to the hub assembly 32 of the first wheel drive unit 300 and is also coupled to the portal axle 308 for transferring torque from the electric motor 28 through the portal axle 308 and to the hub assembly 32 of the second wheel drive unit 304. In other words, the portal axle 308 transfers torque from the first wheel drive unit 300 to the second wheel drive unit 304. It is to be appreciated that the differential 320 is illustrated in FIGS. 81 and 83 with certain components removed.

Figure 81:
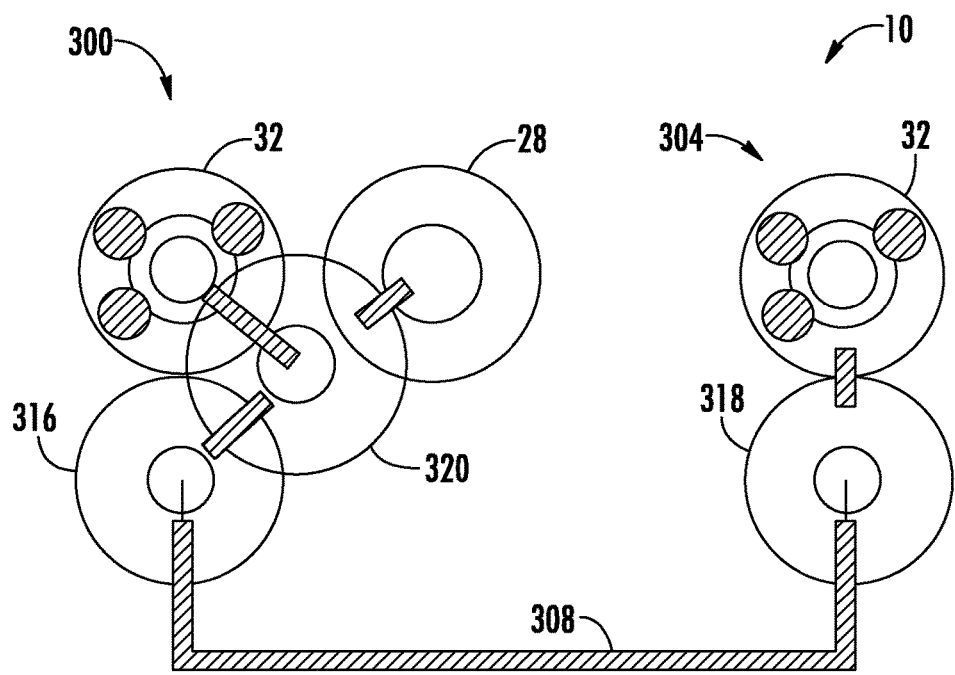
Figure 82:
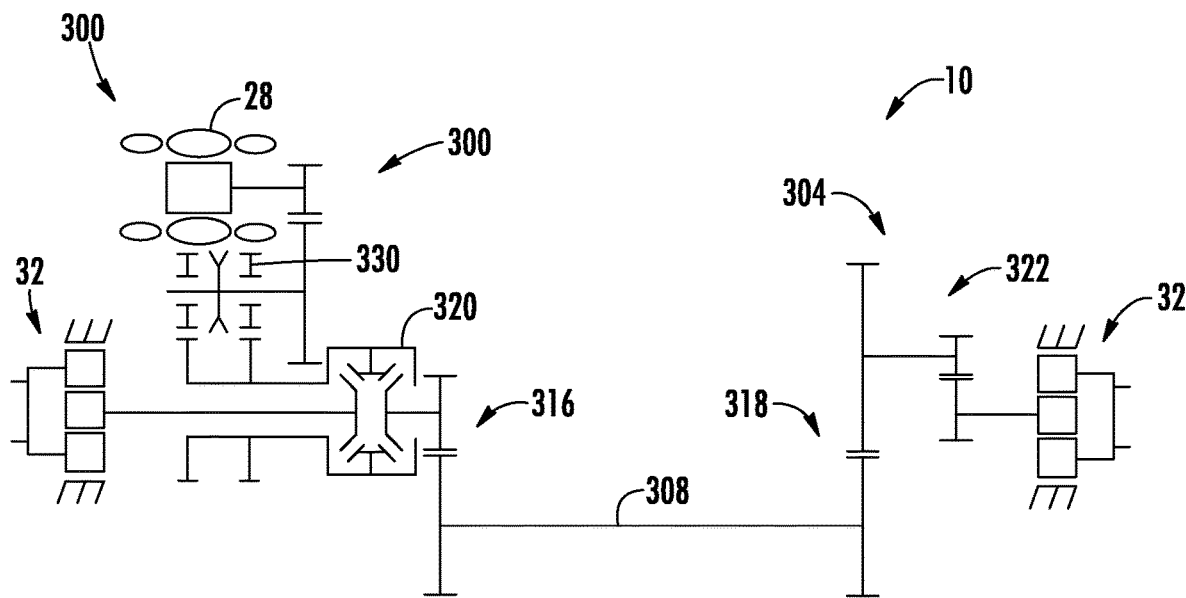

In one embodiment, as shown in FIGS. 80 and 81, each of the first 316 and second 318 drop boxes have a single drop, which can be a gear reduction or can be a 1:1 drop. Preferably, the embodiment shown in FIGS. 80 and 81 does not incorporate a gear reduction across the portal axle 308. In another embodiment, as shown in FIGS. 82 and 83, the first 316 and second 318 drop boxes have different drops, with the first drop box 316 having a single gear drop and the second drop box 318 having a double gear drop. Each drop box 316 and 318 can have the same or a different gear reduction. Preferably, in the embodiment shown in FIGS. 82 and 83, there is a gear reduction across the portal axle 308. Specifically, the second wheel drive unit 304 preferably includes a gear reduction 322 coupled to the second drop box 318 and the hub assembly 32 at the second wheel drive unit 304. Additional details of a drop box and portal axle, components of which may be used in the present disclosure, are described in U.S. patent application Ser. No. 10/389,192 to Groves et al., now U.S. Pat. No. 6,964,317, filed Mar. 14, 2003, titled "Drive Assembly for a High Ground Clearance Vehicle", which is incorporated herein by reference in its entirety. Drop boxes include an input shaft that drives an output shaft through a chain drive. The chain drive of the drop box includes an input sprocket, an intermediate sprocket assembly and an output sprocket. A first chain interconnects the input sprocket and the intermediate sprocket assembly and a second chain interconnects the intermediate sprocket assembly and the output sprocket. While chains and sprockets are illustrated, gears may be used instead to transfer power from the differential 320 to the portal axle 308.

As shown in FIGS. 80-83, the axle assembly 10 may include a single electric motor, two-speed configuration including a portal axle length between 700 mm and 1000 mm, a 1,000 mm or 700 mm walk through, 445/70r22.5 or 275/70r22.5 Tire, 2 speed: 11.1:1; 22:1, Axle Weight Rating of 10,500 kg to 11,600 kg, and 750,000 mile capability. The axle assembly 10 may include a single electric motor, one-speed configuration including a portal axle length between 700 mm and 1000 mm, a 1,000 mm or 700 mm walk through, 445/70r22.5 or 275/70r22.5 Tire, 1 speed: 15:1, Axle Weight Rating of 10,500 kg to 11,600 kg, and 750,000 mile capability.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An axle assembly comprising:
an axle housing including a first gear box, a second gear box and a cradle assembly coupling the first gear box to the second gear box;
a first hub assembly adapted to be rotated by the first gear box and a second hub assembly adapted to be rotated by the second gear box, the hub assemblies forming a first axis of rotation;
the first gearbox including an electric motor having an output shaft, a transmission mounted for rotation with the output shaft, a differential mounted for rotation with the transmission and a first drop box having an input shaft mounted for rotation with the differential and having an output shaft;
a portal axle mounted for rotation by the output shaft, the portal axle adapted to extend from the first gearbox to the second gear box, the portal axle forming a second axis of rotation that is offset from the first axis of rotation of the hub assemblies; and
a second drop box having an input shaft mounted for rotation with the portal axle and an output shaft adapted to drive the second hub assembly.

2. The axle assembly of claim 1, wherein the first gearbox includes an axle shaft that is mounted for rotation with the differential.

3. The axle assembly of claim 2, wherein each hub assembly includes a planetary gear set mounted for rotation with the axle shaft, wherein the planetary gear set increases torque to drive wheels coupled to the hub assemblies.

4. The axle assembly of claim 3, wherein the planetary gear set includes a planetary gear, a sun gear of the planetary gear is coupled to the axle shaft, a planet carrier of the planetary gear is coupled to a wheel hub, a ring gear of the planetary gear is coupled to a hub axle support and is held stationary with respect to the planet carrier and the sun gear.

5. The axle assembly of claim 1, further comprising an inverter assembly positioned within the axle housing and coupled to the electric motor for providing electrical power to the electric motor.

6. The axle assembly of claim 1, wherein the cradle assembly is offset from the first axis of rotation of the hub assemblies.

7. The axle assembly of claim 6, wherein the cradle assembly is formed to include an inner cavity.

8. The axle assembly of claim 7, further comprising an inverter assembly positioned within the inner cavity of the cradle assembly and coupled to the electric motor for providing electrical power to the electric motor.

9. The axle assembly of claim 7, further comprising a cover member adapted to cover the inner cavity of the cradle assembly.

10. The axle assembly of claim 1, wherein the first gearbox includes a gearbox housing and a gearbox cover removably coupled to the gearbox housing, the cradle assembly is adapted to be removably coupled to the gearbox housing.

11. The axle assembly of claim 10, wherein the second gear box includes a second gearbox housing and a second gearbox cover removably coupled to the gearbox housing, the cradle assembly is adapted to be removably coupled to the second gearbox housing.

12. The axle assembly of claim 1, wherein the portal axle extends from the first gearbox through the cradle assembly to the second gearbox.

* * * * *